US008577825B2

(12) United States Patent
Gillespie

(10) Patent No.: US 8,577,825 B2
(45) Date of Patent: Nov. 5, 2013

(54) SYSTEM, METHOD AND DEVICE FOR SOLVING PROBLEMS IN NP WITHOUT HYPER-POLYNOMIAL COST

(76) Inventor: Clayton Gillespie, Vienna, VA (US)

( * ) Notice: Subject to any disclaimer, the term of this patent is extended or adjusted under 35 U.S.C. 154(b) by 728 days.

(21) Appl. No.: 12/823,652

(22) Filed: Jun. 25, 2010

(65) Prior Publication Data

US 2011/0161266 A1   Jun. 30, 2011

Related U.S. Application Data

(63) Continuation-in-part of application No. PCT/US2009/032153, filed on Jan. 27, 2009.

(60) Provisional application No. 61/062,646, filed on Jan. 29, 2008.

(51) Int. Cl.
*G06F 17/00* (2006.01)
*G06N 5/02* (2006.01)

(52) U.S. Cl.
USPC .......................................................... 706/46

(58) Field of Classification Search
USPC ...................................................... 706/45–46
See application file for complete search history.

(56) References Cited

U.S. PATENT DOCUMENTS

| 5,228,115 A * | 7/1993 | Natarajan ........................ 706/46 |
| 5,576,965 A * | 11/1996 | Akasaka et al. ................ 700/97 |
| 5,636,328 A * | 6/1997 | Kautz et al. ..................... 706/45 |
| 7,187,672 B1 * | 3/2007 | Vishnu .......................... 370/360 |
| 8,291,319 B2 * | 10/2012 | Li et al. .......................... 706/45 |
| 2002/0143754 A1 * | 10/2002 | Paulley et al. .................... 707/3 |
| 2002/0157009 A1 * | 10/2002 | Yamamoto et al. ............ 713/189 |
| 2004/0103108 A1 * | 5/2004 | Andreev et al. ................. 706/45 |
| 2006/0121493 A1 * | 6/2006 | Sasagawa ......................... 435/6 |
| 2006/0173661 A1 * | 8/2006 | Kohn et al. ....................... 703/2 |

OTHER PUBLICATIONS

Davidson, M. "Proximal point mappings and constraint aggregation principle." Working Paker No. WP-96-102. International Institute for Applied Systems Analysis. Aug. 1996. 20 pages.*
Russell, S.J. et al. "Artificial Intelligence: A Modern Approach: Second Edition—Chapter 5: Constraint Satisfaction Problems." 2003.*
Schiex, T. et al. "Valued constraint satisfaction problems: Hard and easy problems." International Joint Conference on Artificial Intelligence, vol. 14, pp. 631-639. Lawrence Erlbaum Associates Ltd, Aug. 1995.*
Kölln, M.E. "The role of user models for conflicts in a constraint-based model of generation." GWAI-92: Advances in Artificial Intelligence, Lecture Notes in Computer Science, vol. 671, 1993, pp. 334-346.*

(Continued)

*Primary Examiner* — Jeffrey A Gaffin
*Assistant Examiner* — Benjamin Buss
(74) *Attorney, Agent, or Firm* — Jennifer Meredith, Esq.; Meredith & Keyhani, PLLC

(57) ABSTRACT

System, method and device for reducing the time required for solution of problems in the NP complexity class to polynomial time. Within satisfaction problems or problems reducible to a satisfaction problem, the invention tracks the sources of implications and identifies proximal parameterizations of conditional contradictions and subsequently avoids those contradictory conditions. The action is completed in less time than is incurred by existing methods and thus provides a performance improvement to the devices, software, or processes which address such problems.

22 Claims, 35 Drawing Sheets

(56) References Cited

OTHER PUBLICATIONS

Van Hentenryck, P. et al. "Constraint satisfaction using constraint logic programming." Artificial intelligence, vol. 58, No. 1, 1992. pp. 113-159.*

Kolaitis, P.G. et al. "Conjunctive-query containment and constraint satisfaction." Proceedings of the seventeenth ACM SIGACT-SIGMOD-SIGART symposium on Principles of database systems, pp. 205-213. ACM, 1998.*

Munawar, A. et al. "Hybrid of genetic algorithm and local search to solve max-sat problem using nvidia cuda framework." Genetic Programming and Evolvable Machines, vol. 10, No. 4, Published online Oct. 20, 2009. pp. 391-415. DOI 10.1007/s10710-009-9091-4.*

Nemer-Preece, N. et al. "Parallel genetic algorithm to solve the satisfiability problem." Proceedings of the 1998 ACM symposium on Applied Computing, pp. 23-28. ACM, 1998.*

Folino, G. et al. "Solving the satisfiability problem by a parallel cellular genetic algorithm." Proceedings of the 24th Euromicro Conference 1998, vol. 2, pp. 715-722. IEEE, 1998.*

Bertsekas, D.P. et al. "Partial Proximal Minimization Algorithms for Convex Programming." SIAM Journal on Optimization, vol. 4, No. 3. Aug. 1994. pp. 551-572.*

* cited by examiner

Figure 1

|     | A | B | C | D | U | V6 | V7 | V8 | V9 | V10 | V11 | V12 | V13 | V14 | V15 | V16 | V17 |
|-----|---|---|---|---|---|----|----|----|----|-----|-----|-----|-----|-----|-----|-----|-----|
| C1  |   |   |   |   | o | X  |    |    |    |     |     |     |     |     |     |     |     |
| C2  |   |   | o |   | o |    |    |    | X  |     |     |     |     |     |     |     |     |
| C3  | o |   |   |   |   |    | X  |    |    |     |     |     |     |     |     |     |     |
| C4  | o |   |   |   |   |    | o  | X  |    |     |     |     |     |     |     |     |     |
| C5  |   | o | o |   |   |    |    |    | X  |     |     |     |     |     |     |     |     |
| C6  |   |   |   | o |   |    | o  |    |    | X   |     |     |     |     |     |     |     |
| C7  |   |   |   |   | o |    |    |    |    | o   | X   |     |     |     |     |     |     |
| C8  |   |   |   |   |   |    |    | o  |    |     | o   | X   |     |     |     |     |     |
| C9  |   |   |   |   |   |    |    | o  |    |     | o   |     |     | X   |     |     |     |
| C10 |   |   |   |   |   |    |    |    | o  |     |     |     | o   | o   |     |     |     |
| C11 |   |   |   |   |   | o  |    |    |    |     |     |     | X   | o   |     |     |     |
| C12 |   |   |   |   | X |    |    |    |    |     |     |     |     |     |     |     |     |
| C13 |   |   |   |   |   |    |    |    |    |     |     |     | o   |     | X   |     |     |
| C14 |   |   |   |   |   |    |    |    |    |     |     |     |     |     | o   | X   |     |
| C15 |   |   |   |   |   |    |    |    |    |     |     |     | o   |     |     |     | X   |
| C16 |   |   |   |   |   |    |    |    | o  |     |     |     |     |     | o   |     | o   |

310 a      b      c      d

320

SYSTEM, METHOD AND DEVICE FOR SOLVING PROBLEMS IN NP WITHOUT HYPER-POLYNOMIAL COST

CROSS-REFERENCE TO RELATED APPLICATIONS

This application claims priority to and the benefit of U.S. Provisional Patent Application No. 61/062,646 filed in the United States Patent and Trademark Office on Jan. 29, 2008, the entire content of which is incorporated by this reference.

This application is a continuation in part of International Application No. PCT/US2009/032153 that was filed on Jan. 27, 2009, in the United States Patent and Trademark Office as the receiving office and published as WO/2009/097290 on Jun. 8, 2009 which designates the US.

BACKGROUND OF THE INVENTION

1. Field of the Invention

The present invention pertains generally to the field of computational complexity and, more particularly, to the solving of problems in the complexity class NP. The field of computational complexity is tied to the use of computers and machines.

2. Description of Related Art

Computational complexity theory is a branch of computer science that focuses on classifying computational problems according to their inherent difficulty. Computational complexity theory determines the practical limits on what computers can and cannot do.

In the context of computational complexity issues, a computational problem is understood to be a task that is in principle amenable to being solved by a computer. For example, primality testing is the problem of determining whether a given number is prime or not. The instances of this problem are natural numbers, and the solution to an instance is yes or no based on whether the number is prime or not.

A problem is regarded as inherently difficult if solving the problem requires a large amount of resources, irrespective of the algorithm used for solving it. The computational complexity theory formalizes this intuition, by introducing mathematical models of computation to study the problems and quantifying the amount of resources, such as computational time and computer storage, needed to solve them. Other complexity measures are also used, such as the amount of communication (used in communication complexity), the number of gates in a circuit (used in circuit complexity) and the number of processors (used in parallel computing).

Closely related fields in theoretical computer science are analysis of algorithms and computability theory. A distinction between computational complexity theory and analysis of algorithms is that the analysis of algorithms is devoted to analyzing the amount of resources needed by a particular algorithm to solve a problem, whereas computational complexity asks a more general question about all possible algorithms that could be used to solve the same problem. More precisely, computational complexity tries to classify problems that can or cannot be solved with appropriately restricted resources. In turn, imposing restrictions on the available computer-related resources is what distinguishes computational complexity from computability theory: the computability theory asks what kind of problems can be solved in principle algorithmically. Computational complexity theory and computability theory are both computer dependent. However, computational complexity theory additionally depends on the storage capacity, the processor speed and the other particulars of the computers that are available at a point in history.

Related to computational theory, a Turing machine is a mathematical model of a general computing machine. It is a theoretical device that manipulates symbols contained on a strip of tape. Turing machines are not intended as a practical computing technology, but rather as a thought experiment representing a computing machine. It is believed that if a problem can be solved by an algorithm, there exists a Turing machine which solves the problem. Because Turing machines are easy to analyze mathematically, and are believed to be as powerful as any other model of computation, the Turing machine is the most commonly used model in complexity theory. Many types of Turing machines are used to define complexity classes; these include deterministic Turing machines, probabilistic Turing machines, and non-deterministic Turing machines. They are all equally powerful in principle, but when resources (such as time or space) are bounded, some of these may be more powerful than others. A deterministic Turing machine is the most basic Turing machine, which uses a fixed set of rules to determine its future actions. A probabilistic Turing machine is a deterministic Turing machine with an extra supply of random bits. The ability to make probabilistic decisions often helps algorithms solve problems more efficiently. For a precise definition of what it means to solve a problem using a given amount of time and space, a computational model such as the deterministic Turing machine is used.

The time required by a deterministic Turing machine M on input x is the total number of state transitions, or steps, the machine makes before it halts and outputs the answer ("yes" or "no"). A Turing machine M is said to operate within time $f(n)$, if the time required by M on each input of length n is at most $f(n)$. A decision problem A can be solved in time $f(n)$ if there exists a Turing machine operating in time $f(n)$ which solves the problem. Because complexity theory is interested in classifying problems based on their difficulty, one defines sets of problems based on some criteria.

A complexity class is a set of problems of related complexity. Simpler complexity classes are defined by the type of computational problem, the model of computation, or the resources that are being bounded and the bounds. Thus, a typical complexity class has a definition like the following: The set of decision problems solvable by a deterministic Turing machine within time $f(n)$.

The time complexity of an algorithm quantifies the amount of time taken by an algorithm to run as a function of the size of the input to the problem. Time complexity is commonly estimated by counting the number of elementary operations performed by the algorithm, where an elementary operation takes a fixed amount of time to perform. Thus the amount of time taken and the number of elementary operations performed by the algorithm differ by at most a constant factor.

Because an algorithm may take a different amount of time even on inputs of the same size, the most commonly used measure of time complexity, the worst-case time complexity of an algorithm, denoted as $T(n)$, is the maximum amount of time taken on any input of size n. Time complexities are classified by the nature of the function $T(n)$. For instance, an algorithm with $T(n)=O(n)$, O being a notation for the order of magnitude of the required time, is called a linear time algorithm, and an algorithm with $T(n)=O(2^n)$ is said to be an exponential time algorithm.

An algorithm is said to be polynomial time if its running time is upper bounded by a polynomial function of the size of the input for the algorithm, i.e., $T(n)=O(n^k)$ for some constant k. The concept of polynomial time leads to several complexity classes in computational complexity theory. Some important classes that are defined using polynomial time are the P and NP classes. P is the complexity class of decision problems that can be solved on a deterministic Turing machine in polynomial time. NP is the complexity class of decision problems that can be solved on a non-deterministic Turing machine in polynomial time.

Thus, the complexity class referred to as P, standing for polynomial, consists of all those decision problems that can be solved on a deterministic sequential machine in an amount of time that is a polynomial of the size of the input. The complexity class NP, standing for non-deterministic polynomial, consists of all those decision problems whose positive solutions can be verified in polynomial time given the right information, or equivalently, whose solution can be found in polynomial time on a non-deterministic machine.

The complexity class P is often seen as a mathematical abstraction modeling those computational tasks that admit an efficient algorithm. Polynomial time is a synonym for "tractable", "feasible", "efficient", or "fast". All the basic arithmetic operations, addition, subtraction, multiplication, division, and comparison, can be done in polynomial time.

The complexity class NP, on the other hand, contains many problems that people would like to solve efficiently, but for which no efficient algorithm is known, such as the Boolean satisfiability problem, the Hamiltonian path problem and the vertex cover problem. Because deterministic Turing machines are a subclass of nondeterministic Turing machines, it is easily observed that each problem in P is also a member of the class NP.

Many complexity classes are defined using the concept of a reduction. A reduction is a transformation of one problem into another problem. It captures the informal notion of a problem being at least as difficult as another problem. For instance, if a problem X can be solved using an algorithm for solving problem Y, then problem X is no more difficult than problem Y, and X reduces to Y. There are many different types of reductions based on the method of reduction and the bound on the complexity of reductions.

The most commonly used reduction is a polynomial-time reduction. This means that the reduction process takes polynomial time. For example, the problem of squaring an integer can be reduced to the problem of multiplying two integers. This means an algorithm for multiplying two integers can be used to square an integer. This can be done by providing the same input to both inputs of the multiplication algorithm. Thus, squaring is not more difficult than multiplication, because squaring can be reduced to multiplication.

A problem X is "hard" for a class of problems C if every problem in C can be reduced to X. Then, no problem in C is harder than X, since an algorithm for X allows us to solve any problem in C. The notion of hard problems depends on the type of reduction being used. For complexity classes larger than P, polynomial-time reductions are commonly used. In particular, the set of problems that are hard for NP is the set of NP-hard problems.

If a problem X is in C and hard for C, then X is said to be complete for C. This means that X is the hardest problem in C and because there could be many problems which are equally hard, it could be said that X is one of the hardest problems in C. The most difficult problems in NP are called the class of NP-complete problems.

SUMMARY OF THE INVENTION

Aspects of the present invention address the issues associated with solution of NP problems in polynomial time.

Aspects of the present invention provide a method for solving a problem in NP in polynomial time and a system for implementing this method. The method includes converting a given problem definition into an expression composed of one or more constraints, selecting assumed values for the variables of the expression, tracking the paths of implications resulting from the selected assumptions by recording or extracting any of causes, reasons, or common reasons, and by recording or extracting prevailing implications, resolving conditional contradictions by identifying a proximal parameterization of the contradiction, treating the parameterization effectively as a constraint, and then deselecting one or more assumptions that include the condition for contradiction, and iteratively applying the selection, tracking, and resolving steps until either all variables have determined values and no contradictions are apparent or else an unconditional contradiction is found.

Aspects of the present invention provide a method for improving time requirement of solving of an expression by avoiding conditional contradictions arising during the solving of the expression. The expression is formed of constraints that each include one or more variables. Solving of the expression includes determination of whether the expression is satisfiable by a set of variable values or unsatisfiable when there are no sets of variable values that satisfy the expression. The expression is usually a logical expression in conjunct-disjunct form such that it is a conjunction of a set of constraints where the constraints are each a disjunction of several variables. The method is a method in computational complexity and is implemented by a computing machine. The method includes receiving, as part of the expression being input to the computer, unconditional assertions regarding values of zero or more of the variables, making assumptions regarding values of one or more of the variables that are not subject of the unconditional assertions, using the assumptions and the unconditional assertions to make assertions of terms regarding values for other variables of the expression. A constraint is forced to assert a term when as a result of existing assumptions and assertions, the values of all but one of its terms are negated. Then, for the constraint to be satisfied, the one remaining term cannot be negated and the value of the single non-negated term becomes determined. At this point, the constraint also becomes determined. The method continues with setting values for the variables as determined values responsive to the unconditional assertions, the assumptions or the assertions. The variables not having a determined value are called free variables. The iteration of the making of assumptions, the making of assertions, and the setting of values for the variables as determined, forms the process of implication. The method continues repeating the process of implication as long as a count of the free variables is not zero. In the meanwhile, the method maintains and keeps track of cause, reason and common reason of each asserting inference that is asserting a term. The method further includes determining whether a contradiction is a conditional contradiction, by using the maintained data. A conditional contradiction is conditioned on the assumptions and arises when the determined values for a variable are contradictory and result in the variable becoming an over-determined variable. The method precipitates an inference from the conditional contradiction to arrive at a precipitated inference such that the precipitated inference is a constraint in addition to the constraints of the expression. From the precipitated inference, the method can avoid or de-assert assumptions that do not satisfy the precipitated inference to prevent the process of implication from reaching a dead end resulting from the conditional contradiction from which the precipitated inference is precipitated. For the precipitated inference to be satisfied, value of at least one variable of variables in the precipitated inference must not be negated. The method continues with reporting that the expression is satisfied if the count of the free variables is zero and all of the variables of the expression have a determined value, or reporting that the expression is unsatisfiable if an unconditional contradiction is encountered regarding one of the variables of the expression when an unconditional contradiction is a contradiction not resulting from the assumptions that can be undone.

When the contradiction arises between a first contradicting assertion asserting a first value for a first variable and a second contradicting assertion asserting a second value for the first variable, the precipitating of the inference includes: identifying a first common reason of the first contradicting assertion, identifying a second common reason of the second contradicting assertion, identifying intersection terms present in both the first common reason and the second common reason, identifying a most recent term of the intersection terms, the most recent term including an intersection variable having an intersection value, identifying a precipitant value for the contradiction, the precipitant value being a complementary value of the intersection value, identifying a set of teardrop constraints from among the constraints of the expression, identifying a set of teardrop values to include the precipitant value and values of teardrop variables, the teardrop variables being variables in the teardrop constraints which are negated by prevailing assertions that are forced by assumptions other than the latest assumption, and forming the precipitated inference from the teardrop values. The teardrop constraints start with a first set consisting of constraints present in the first reason and the second reason that have been determined after the constraint that is in the intersection terms and has been most recently determined, and remove from the first set prevailing constraints that were determined before the intersection value, non-determined constraints, non-prevailing constraints, constraints asserting unconditionally, and conditional prevailing constraints which were determined after the prevailing assertion that disagrees with the precipitant value but the assertions of which are not in reasons of the constraints of the contradicted assertions.

In the above summary, a term is a value of a variable in context of a particular constraint. A term of a first constraint is asserted when a value is dictated for the variable of the term in the first constraint. A second constraint asserts a term in the first constraint when values for the variables that are common between the first constraint and the second constraint are negated by the values asserted by the second constraint. The cause of an asserting inference consists only of assumptions that forced the inference to assert an asserted term. The cause of an assumption is the assumption itself. Unconditional assertions are not forced by assumptions and have an empty cause. The reason of an asserting inference consists of the most recent assumption and assertions that formed a prevailing path from the most recent assumption to the term asserted by the asserting inference. Assumptions and unconditional assertions have an empty reason. A prevailing path is the path initiating at a prevailing inference. The prevailing inference being the inference selected to assert its term from among inferences competing for asserting terms at a same point during the process of implication. The prevailing inference is selected to be the inference with a lesser cause in an ordering and the lesser cause is the cause having fewer assumptions and earlier assumptions. An inference, or a constraint, is determined when all but one of the values for all of its variables are negated such that the one remaining variable value may be determined responsive to the negations. An asserting inference that is determined has a common reason. The common reason of an assumption consists of the assumption. The common reason of an asserting inference forced by a most recent assumption consists of the assumption and the assertion of the asserting inference. The common reason of an asserting inference forced by an initiating assumption and a number of ensuing assertions made by inferences other than assumptions consists of the initiating assumption and the common reasons of the ensuing assertions. The ensuing assertions being assertions found to be prevailing among assertions that occur at a same point during the process of implication. Order of priority which decides which assertion becomes a prevailing assertion among a number of competing assertions asserting a value for the same variable is determined responsive to the reason of the asserting inferences making the competing assertions. A term is unconditionally contradicted no assumptions contributed to the assertion of the term and the cause phrase of the term is empty. A contradiction is determined to be a conditional contradiction when the contradiction is dependent on some assumptions and the union of the causes of the two prevailing assertions leading to the contradiction is not empty.

BRIEF DESCRIPTION OF THE DRAWINGS

FIG. 1 shows a matrix presenting an exemplary problem, according to aspects of the present invention.

FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30 show the stages of making assumptions and asserting terms.

FIGS. 31 and FIG. 32 show the stages of precipitating an inference for solving the problem shown in FIG. 1 and FIG. 2, according to aspects of the present invention.

FIG. 33, FIG. 34, and FIG. 35 show an alternate teardrop that might have been precipitated in order to demonstrate the purpose, usefulness, and necessary features of the cause, reason, common reason, and orderings.

DETAILED DESCRIPTION OF THE INVENTION

Figure 2:
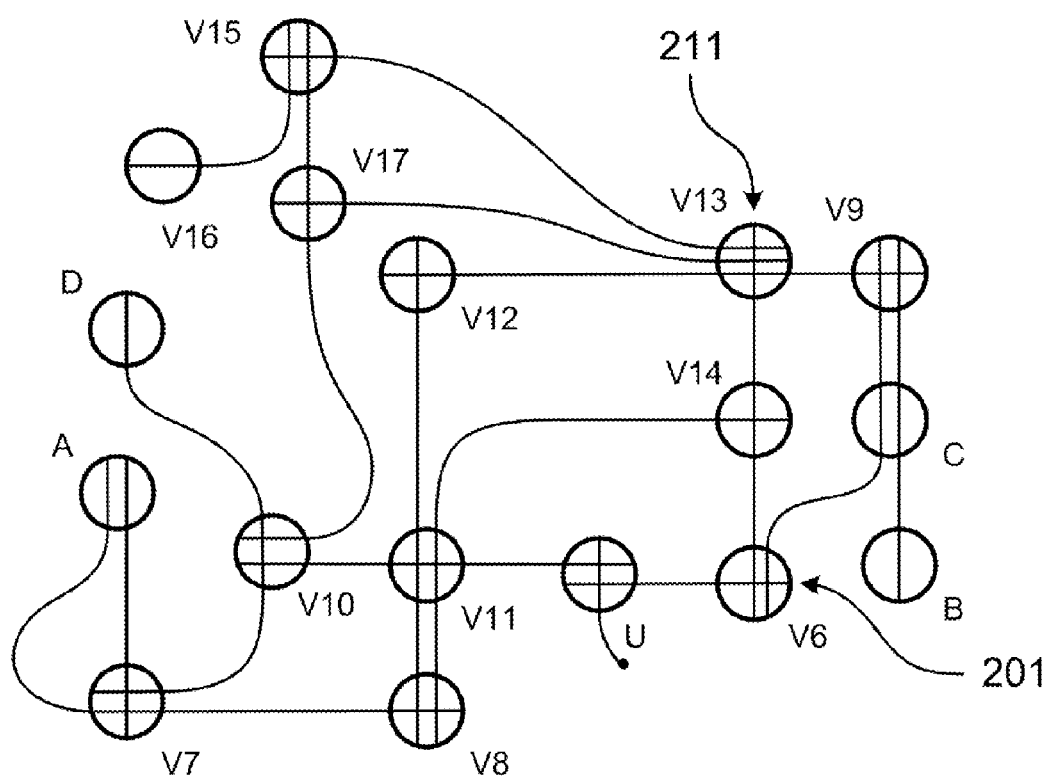
FIG. 2 shows a variable and constraint diagram representation of the matrix of FIG. 1, according to aspects of the present invention.

Aspects of the present invention provide systems, methods and devices for improving the performance of machines that solve problems in the complexity class called "NP".

"P" is a class of problems that can be solved by a deterministic Turing machine in polynomial time. A deterministic Turing machine engages in serial, random-access, or limited parallel-processing. "NP" is a class of problems that can be solved by a non-deterministic Turing machine in polynomial time. A non-deterministic Turing machine is capable of unlimited parallel-processing. "NP-complete" is a subset of hard problems in NP whose membership in P is doubted. Examples of NP-complete problems are The Traveling Salesman Problem and the Satisfiability or satisfaction (SAT) problem. NP-complete problems pertain to a number of technical fields.

The Travelling Salesman Problem (TSP) is a problem in combinatorial optimization studied in operations research and theoretical computer science. Given a list of cities and their pairwise distances, the task is to find a shortest possible tour that visits each city exactly once. The problem is used as a benchmark for many optimization methods. Even though the problem is computationally difficult, a large number of heuristics and exact methods are known, so that some instances with tens of thousands of cities can be solved. The TSP has several applications such as planning, logistics, and the manufacture of microchips. Slightly modified, it appears as a sub-problem in many areas, such as DNA sequencing. In these applications, the concept city represents, for example, customers, soldering points, or DNA fragments, and the concept distance represents travelling times or cost, or a similarity measure between DNA fragments. In the theory of computational complexity, the decision version of TSP belongs to the class of NP-complete problems. Thus, it is assumed that there is no efficient algorithm for solving TSPs. In other words, it is likely that the worst case running time for any algorithm for TSP increases exponentially with the number of cities, so even some instances with only hundreds of cities will take many CPU years to solve exactly.

Solution of a typical SAT includes determining whether a given logical expression can be true for some value assignment on the variables of the expression (the expression is satisfiable) or whether the given logical expression can never be true for any value assignment on the variables (the expression is unsatisfiable). One version of SAT is 3-SAT which represents a logical expression in conjunct-disjunct form where each constraint has exactly three terms.

The conjunct-disjunct form represents an expression as a list of conjunct ("ANDed") constraints where each constraint is composed of one or more disjunct ("ORed") logical terms. A "term" is a particular instance of a value assignment (usually "true" or "false") for a particular variable where the particular value assignment occurs in the context of a particular constraint. Therefore, a term is a variable in the context of the particular constraint that includes the variable. The same variable in a different constraint presents a different term. It is known that the representation of any problem which is in NP has a conversion to a logical expression in conjunct-disjunct form which does not incur a hyper-polynomial cost.

Computationally speaking, space and time are polynomially exchangeable; so we talk generally about polynomial cost rather than specifically about polynomial time. Being able to determine the satisfiability of arbitrary conjunct-disjunct expressions in polynomial time with a deterministic machine is therefore equivalent to being able to solve any NP-complete or simpler problem without hyper-polynomial cost.

Prior to the present invention, solutions to NP-complete problems and many other problems in NP, such as Integer Factoring, have either required an exhaustive search of possible value assignments for the variables represented in the problem, or otherwise required hyper-polynomial costs, such as N! or $3^N$, rather than polynomial costs such as $N^3$, where N is the size of the input to the problem.

In one aspect of the present invention, a data processing system is provided which solves given NP problems using a deterministic machine in polynomial time. The given problem definition is converted into an expression composed of logical or otherwise deterministic constraints. Next, a process of assuming values for the constraint variables one-at-a-time, tracking the paths of implications resulting from the value assumptions, resolving any over-determination of a variable by identifying a proximal parameterization of the apparent contradiction, treating the parameterization effectively as a constraint, and then de-assuming one or more of the chosen values that caused the over-determination, is iteratively applied to the expression until either each variable obtains a single value and every constraint contains at least one term which is not counter-asserted, or else a necessary contradiction is found. The number of iterations of each portion of this process is bounded by a polynomial of the size attributes of the expression.

Existing processes solve many NP problems in hyper-polynomial time. Aspects of the present invention, on the other hand, improve the performance of existing and future processes. The magnitude of the performance improvement is such that some processes which have heretofore been considered infeasible on the basis of cost become feasible by using the aspects of the present invention.

One aspect of the present invention addresses the operation called "precipitating an inference", where conditional contradictions are localized and parameterized. This operation is necessarily supported by the state-keeping activities of the other operations. Accordingly, aspects of the present invention also address state-keeping, particularly with regard to tracking prevailing inferences.

The concepts that help identify a state include variable, term, phrase, constraint, assumption, orderings, implication, inference, pools, and inference database that are each further elaborated below.

The concepts that help identify a change in the state include initializing the inference database, asserting terms, de-asserting terms, precipitating an inference, and assuming a value that are each further elaborated below.

State

The state-maintaining concepts that pertain to this invention are the inferences, variables, and pools. A number of supporting and related concepts are also described below.

Variable

Each "variable" is a locale of variability. For example, each variable is the name of a logical predicate which appears in the given expression. In application, a variable could be a numeric register, a string, or any data structure that represents one (or no) value at a time and can represent more than one value over time. In this respect, a variable here is similar to a variable in the domain of software engineering.

The values of a variable are practically enumerable. Problems that contain variable values that are not practically enumerable might not be in NP. By definition, the values of logical variables are practically enumerable.

Variables are represented as being either "free", "determined", or "over-determined." Variables are also either "non-assumptive" or "assumptive." Initially, all variables are free and non-assumptive.

In one aspect of the invention, each variable has a unique determinant number which represents the order in which the variables became determined.

Term

A "term" is primarily composed of a reference to, or a reproduction of, a variable in addition to an indication of the value of this term for that variable. For example, in two-valued logic, the value of a term is an indication of whether the term indicates or counter-indicates its predicate.

The exemplary aspect of the present invention that is provided below uses two-valued logical terms. Consequently, in this exemplary aspect, there are two mutually exclusive kinds of term for every variable. Regardless of whether an embodiment uses two-valued logic, many-valued logic, numeric variables, or any other kind of variable representation, there may be many terms of each value of each variable in the expression.

Disagreement and Contradiction

Terms of similar kind are said to "agree." Terms of the same variable which are not of similar kind are said to "disagree."

Within a single variable, the value of one conjunct set of terms is "complementary" to another if there are no disagreeing terms in either set, the first set disagrees with the second set, and every atomic value of the variable is in either one set or the other. In two-valued logic, each variable value is complementary to the only other possible value for that variable.

A term is said to be "negated" when it disagrees with the determined value of the term's variable. The concept of "determined" is further described below.

If, for one term in a constraint, there is a disagreeing term in another constraint, then the variable of those terms is said to be "controversial".

When a term and a disagreeing term are both asserted, each is said to be "contradicted." Terms may be unconditionally or conditionally contradicted, depending on whether their cause phrases are empty or not. An expression is unsatisfiable when any of its terms are unconditionally contradicted.

Phrase

A "phrase" is an addressable set of terms. An array is an example of a phrase. A phrase contains any number of terms, but for each variable value represented in the phrase, there may be no other similar value represented in the phrase.

In some cases, a phrase may represent a set of terms over which an associative and commutative transformation operates. In particular, in the given exemplary aspect of the present invention, there can be at most one term representing a variable per conjunct or disjunct phrase.

Constraint

In the provided exemplary aspect of the invention, a "constraint" is represented by a non-empty disjunct logical phrase. Any disjunct phrase is satisfied when one or more of its terms agrees with the determined value of a variable. An explanation of "determined" is provided below.

In other aspects of the present invention, a constraint could be any satisfiable-or-mutually-mapped expression (SOMME).

A SOMME is an expression which represents a relationship among variables such that determining the values of all but one of the variables in the expression either satisfies the expression or else implies a value for the one variable which was not previously determined, regardless of which variable is the one not previously determined, and regardless of the specific determined values. For example, if Q is the set of rational numbers, and x,y,z$\in$Q, then "x+y=z" is a SOMME, but "x*y=z" is not because if, for example, x=0 and z=0 the value of y could be any number and remains unknown. However, "x=0 OR y=0 OR x*y=z" is a SOMME because it removes the possibility of one of the factors being 0.

Assumption

If a specific value of a variable is determined without being required by any known implications, then that variable value is called an "assumptive" value or simply an "assumption".

In the provided exemplary aspect of the invention, assumptions are represented as inferences, and one assumption is considered to be the "latest".

Orderings

An ordering of elements allows us to speak of "lesser" or "greater" elements, meaning elements that are respectively closer to or further from the ordering's beginning. A complete ordering called the "general" ordering is imposed upon the variables. The general ordering allows us to speak of lesser or greater variables.

The general ordering also allows us to speak of lesser or greater phrases. However, the manner of making that comparison needs to be explained. One method of making such a comparison includes creating a pair of numeric registers with as many digits as there are variables. Maintaining the order of digits according to the order of variables, and arbitrarily assigning "first" and "other" labels to the values creates an order. For each phrase, the value of each digit in the register is assigned according to whether a term that represents the "first" value ("1") of that variable appears in the phrase, or a term representing an "other" value ("2" or greater) of that variable appears, or no term ("0") of that variable appears in the phrase. Speaking in the context of two-valued logic, it is then said that "this" phrase is greater than "that" phrase if the base-three number generated from the digits of "this" phrase is greater than the number generated from "that" phrase.

The above method for determining which phrase is greater than the other gives empty phrases the least value. The phrases are considered as being the "same" if all their terms represent the same values, even if both phrases are empty. However, particular terms are not considered similar if a term of the same variable does not appear in one of the phrases being compared.

Other methods of determining "lesser" and "greater" are possible. The method described above is believed to be one of the more efficient methods because it generally prefers causes with fewer variables and where it happens to prefer causes with a greater number of values, those values are in some sense "near" to the earliest assumptions, and thus have a greater likelihood of forcing the reversal of those assumptions sooner than other considered methods of preference. The main objective of the ordering being to steer the flow of implication toward producing unconditional assertions as quickly as possible.

An arbitrary and complete ordering called the "assumptional" ordering is also imposed upon the set of variables. This ordering designates the "least" variable among free variables which will be next assumed.

Arbitrary and complete orderings are also imposed on the inferences. These are called the "implicational" and "priority" orderings. The implicational ordering is used to decide which implications are implicated before the others. The priority ordering is used to decide which inference is prevailing among all inferences implicating the same phrase.

There are many valid orderings for processing implications, but the more efficient implementations of this invention probably have implicational and priority orderings which are the same and are conservative. Examples include the ordering used in the given exemplary aspect, which prefers inferences with lesser causes and, among inferences with equal causes, prefers inferences with lesser reasons. In this aspect of the present invention, the implicational and priority orderings are dependent on the general ordering.

Note that it is not necessary to predetermine these orderings. Because these orderings are arbitrary, they may be constructed on an as-needed basis and may be changed during processing, as long as the then-current ordering is effected systematically.

Implication

A disjunct phrase may be said to be "implied" when asserting a conjunction of values that disagrees with the values of the terms in the phrase would be logically inconsistent with the combination of the expression and the current set of assumptive values. A subset of the terms in a constraint is "implicated" when assuming a conjunction of disagreeing values for those terms would leave the constraint without unnegated or non-negated terms. Every constraint is both implicated and implied.

We use this general definition of what it means for a phrase to be implicated in order to describe the range of states represented in the inference data structure (see below) of this aspect of the present invention, but we are especially interested in the case where there is only one term in the implicated phrase of the inference. In this case, we refer to the single unnegated term as being "asserted".

Inference

In one aspect of the present invention, the representation of an "inference" is primarily composed of five phrases: the implicated phrase, the negated phrase, the cause phrase, the reason phrase, and the common reason phrase.

Initially, every constraint is represented as an inference containing the constraint's terms in its implicated phrase. The "implicated" phrase is disjunct and contains constraint terms that have not been negated. The "negated" phrase is also disjunct and contains a set of constraint terms that has been negated. As variable values become determined in each inference, terms which disagree are moved from the implicated phrase into the negated phrase of that same inference. Further, as value determinations are removed, terms move in the reverse direction.

The "cause" phrase may be empty until the inference asserts a term. The cause phrase may also be empty when all the terms in the negated phrase are negated by unconditional assertions. When the cause phrase is non-empty, it is conjunct and contains terms representing the apparent least set of assumptive values that is sufficient to implicate the implicated phrase.

The "reason" phrase may be empty until the inference asserts a term. In this aspect of the present invention, the reason is also empty when the inference represents an assumption. In the given aspect of the invention, when the reason is non-empty, it is conjunct and contains assertions that represent the apparent path of prevailing assertions that conveys a spirit of implication between the conjunct values of the cause and the disjunct values of the implicated phrase.

In this aspect of the present invention, the reason of an inference is a superset of the cause, except in the case where the inference represents an assumption. In this aspect of the present invention, the reason is also a superset of the set of prevailing assertions each of which disagrees with a term in the negated phrase.

The "common reason" phrase may be empty until the inference becomes determined (see below). In the provided exemplary aspect of the invention, when the common reason is non-empty, it is conjunct and contains the values of asserted terms which form a chain such that:

(1) if the latest assumption was not made, but all previous assumptions were made, then assuming one of the terms of the current common reason would force the assertion of all the other terms of the current common reason that have variables which have determinant numbers that are greater than the current determinant number of the variable of the hypothetically assumed term of the common reason;

and conversely, (2) if the latest assumption was not made, but all previous assumptions were made, then assuming a value which disagrees with one of the terms of the current common reason would logically imply (but not necessarily force the assertion of) the complement of each of the other terms of the current common reason which have determinant numbers that are less than the current determinant number of the variable of the term for which a disagreeing value is hypothetically assumed.

In the given exemplary aspect of the present invention, the common reason of an assertion of a newly determined variable always has the latest assumptive value as well as the value of the newly determined variable as terms.

An implicated phrase may be said to be "unconditionally" or "conditionally" implicated. Whether an implication is unconditional or conditional is represented by whether the cause phrase of the inference is empty or not. Similarly, terms may be said to be unconditionally or conditionally asserted.

The representation of each inference should also include an indication of its determination status: either "determined", or "enqueued", or else "non-asserting."

In this aspect of the present invention, at the time a term is asserted, its inference is enqueued into the implication queue, and the determination status of that inference becomes "enqueued." Initially, most inferences are non-asserting, but any inference that initially contains a single term in its implicated phrase is immediately enqueued because it asserts that term. When an enqueued inference is processed in the Asserting Terms operation below, it changes from being "enqueued" to being "determined," and that inference then may be called a "determination."

Determining variable values could negate terms in an implicated phrase so that all but one of the terms is negated. Consequently, the inference of that implicated phrase would change from being non-asserting to being enqueued.

In addition to the five phrases and the determination status, an inference also represents itself as either a "prevailing" or "non-prevailing" determination, or else as being "non-determined." Initially, all inferences are non-determined.

When an inference becomes determined, it is also marked as either "prevailing" or "non-prevailing." Among multiple determined inferences, which assert terms that agree, the priority ordering is used to select one inference to become the prevailing determination for the shared asserted value. All other agreeing assertions are considered non-prevailing after that selection is made, and all these assertions become determined at the same time.

After a prevailing determination is chosen, the variable of the prevailing assertion becomes either over-determined or determined, depending on whether the variable is both already determined and asserts a disagreeing value or not. Note that a variable becomes determined shortly after an inference that asserts a value of that variable becomes determined.

The cause phrase of an inference is populated by the union of the cause phrases of the prevailing determinations which assert terms that disagree with the terms in the negated phrase of this inference. The reason phrase of an inference is populated by the union of the reason phrases of the prevailing assertions that disagree with the terms in the negated phrase of this inference, which is then unioned with the values of those assertions themselves.

Cause, reason, and common reason phrases need not be represented as such. However, maintaining a representation of these phrases is probably less computationally expensive than extracting the same information from the prevailing determinations that implicate phrases that disagree with the negated terms of a given inference. Therefore, the provided exemplary aspect of the invention is worded as if the cause, reason, and common reason phrases are explicitly represented.

Similarly, the implicated phrase and negated phrase need not be separately represented. Instead, for example, a single phrase containing the terms of both could be supplemented with a flag for each term to indicate whether it is negated or not. However, it is convenient for description of the present invention to speak as if the implicated terms and negated terms are in separate phrases, regardless of their actual representation in any specific embodiment of the invention.

If an alternate conceptualization of the invention allows prevailing determinations to be replaced, making a determination prevalent forces the formerly prevalent determination to become non-prevailing. If this happens, the change in the prevailing causes, reasons, and common reasons must be propagated to the inferences which have terms that were negated by the determined implication in question. Note that prevailing determinations are not replaced in the provided exemplary aspect of the invention.

Pools

A "pool" is an addressable set to which elements can be added and subsequently removed. As a pool per se, elements may be added to or removed from the pool in any order. Pools may also incorporate specific rules for the order in which added elements are removed. For example, non-prioritized queues incorporate a "first-in-first-out" (FIFO) rule, and stacks incorporate a "first-in-last-out" (FILO) rule. Stacks and queues are specific kinds of pools.

In the provided exemplary aspect of the invention, there is an "implication queue" which is a prioritized queue that contains inferences awaiting processing. In this aspect of the present invention, the implicational ordering determines which enqueued inference is next to be processed.

In the provided exemplary aspect of the invention, there is a "de-implication pool" which contains implicated phrases that are to be de-implicated. Despite the fact that it is unnecessary to incorporate a particular rule that determines the order in which phrases are added to and removed from this pool, the specification speaks of phrases being added to and removed from this pool as being "enqueued" into and "dequeued" from the pool, respectively, in order to avoid coining new words.

Inference Database

An "inference database" is primarily composed of an addressable set of inferences, as well as an addressable set of variables, the pools, and a register containing the master determinant number.

In this aspect of the present invention, the inference database associates the value of each variable with prevailing cause and prevailing reason phrases. These phrases may be referenced by referring to the cause and reason of the "prevailing assertion" for that value.

The more efficient implementations of this invention probably maintain indices which, for each kind of term, locate each inference record that contains that kind of term in its cause, reason, negated phrase, or implicated phrase.

In this aspect of the present invention, the collection of information needed by the operations is called an "inference database." However, it need not be stored as a database per se in any particular embodiment. Instead, the information might be recorded in any accessible physical medium or the information might remain embedded in the structure or behavior of the device, program, or process.

Concepts of Change

In this aspect of the present invention, there are five major operations: initializing, implicating, de-asserting, precipitating, and assuming.

Note that the step labels in the processing descriptions below never contain the letters 'i', 'l', or 'o' in order to avoid confusion with graphically similar glyphs.

Main Procedure

The following is a list of the specific steps involved in the main procedure of the provided exemplary aspect of the present invention, presented in the recommended order of processing:

[1] Perform the operation of initializing the inference database.
[2] Loop 1:
[2a] Loop 2:
  [2a1] Perform the operation of asserting terms.
  [2a2] If there is at least one over-determined variable:
    [2a2a] Perform the operation of precipitating an inference.
    [2a2b] For each assumption T (which is distinct from the assumption W in 13F1a) in reverse assumptional order:
      [2a2b1] Perform the operation of de-asserting terms, passing T as the input value.
  [2a3] Otherwise:
    [2a3a] Exit loop 2.
[2b] If the count of free variables is zero:
  [2b1] Report that the expression is satisfied.
  [2b2] Exit loop 1. Namely, halt all further processing.
[2c] Otherwise:
  [2c1] Perform the operation of assuming a value, passing the assigned value of the free variable which is least in the assumptional ordering as the input value. Note that default values are assigned to the variables in step 5a, which is encountered before this step, but is described further below.

Besides the exit point in step 2b2, the operation of precipitating an inference also causes all further processing to halt if it finds an unconditional contradiction.

Initializing the Inference Database

"Initializing" is an operation that includes setting indicators in the inference database and populating it with constraints. This operation accepts a formal problem representation as input.

The operation of initializing the inference database usually occurs at the beginning of processing and must occur prior to assuming any values.

The following is a list of the steps involved in initializing the inference database according to the provided exemplary aspect of the invention, presented in the recommended order of processing. The following steps expand upon step [1] in the main procedure set forth above:

[3] Let the pools and the sets of inferences and variables be empty.
[4] Convert the input problem representation into a conjunct-disjunct form.
[5] For each variable in the conjunct-disjunct expression:
  [5a] Record an arbitrary value assignment for this variable. This arbitrary value assignment is not the result of any assumptions by the algorithm or assertions by the constraints. More efficient implementations might ensure that the value assignment agrees with this variable's uncontroversial term, if any.
  [5b] Record an indication that this variable is free and non-assumptive.
  [5c] Record a null determinant number for this variable.
[6] Sort the terms of each constraint according to the general ordering of variables. As part of the process of sorting, any term of a constraint which constitutes a superset of the value of another term in the constraint is eliminated, and any constraint that contains a complementary set of terms is eliminated. This is done because such constraints are tautological and therefore superfluous.

[7] For each post-elimination constraint:
  [7a] If zero is the count of inferences which have an implicated phrase which only contains terms that agree with the terms of this constraint:
    [7a1] Create a non-determined inference S which has the terms of the constraint in its implicated phrase and which has empty cause, reason, common reason, and negated phrases.
    [7a2] If the new inference (S) contains exactly one term in its implicated phrase:
      [7a2a] Enqueue S into the implication queue.
    [7a3] Otherwise:
      [7a3a] Record an indication that S is non-asserting.
[8] Index the inferences in the inference database.
[9] Let the master determinant number be zero. The master determinant number shows the order of determination of values of all of the variables. No variable values have been determined at this point and the determinant numbers are uniformly zero.

Step 7a normalizes the set of inferences. Some embodiments of the invention might extend this normalization by, for example, eliminating the single disagreeing term (if any) from one constraint that otherwise contains a superset of the terms of another constraint. Other normalization extensions are possible, but in many cases, the computational cost/benefit ratio exceeds the limits of practicality.

Asserting Terms

"Implicating" is an operation that propagates the effects of assumptions or other sources of new implications. In this aspect of the present invention, implicating includes moving terms from implicated phrases into negated phrases and setting the values of indicators in the inference database in a way that is consistent with the introduction of a new assertion. As conceptualized above, the process appears as a purely logical process. However, in application, the terms implicated may be derived by performing almost any lossless deterministic function, for example, a linear algebraic transformation, as described in Constraints above. In any case, the record-keeping exemplified in this written description would still be necessary in order to support the operation of precipitating an inference.

The operation of asserting terms works directly on the inference database without additional input parameters, and this operation is invoked immediately after normalizing the expression, assuming a value, or precipitating an inference. This process uses the implication queue which generally contains implicating inferences but which contains only asserting inferences in the provided exemplary aspect of the invention.

In the provided exemplary aspect of the invention, the operation of asserting terms halts after encountering an over-determined variable. Other embodiments might allow processing to continue in the hope of finding another contradiction which is a more ideal candidate for immediate resolution. Similarly, other embodiments might tweak the implicational ordering in hope that the first contradiction found is more ideal. Many performance modifications are possible.

The following is a list of the specific steps involved in asserting terms according to the provided exemplary aspect of the invention, presented in the recommended order of processing. This process corresponds to step [2a1] of the main procedure:

[10] For each inference X which has been enqueued into the implication queue and is handled in implicational order, regardless of whether the inference was enqueued prior to the beginning of this step or becomes enqueued during the execution of this step, perform the following:
  [10a] Dequeue X.
  [10b] Record an indication that X is determined.
  [10c] If the reason of X does not contain a term that agrees or disagrees with the assertion of X, then X is not redundant or otherwise unproductive, perform the following:
    [10c1] If the variable for the assertion of X is determined:
      [10c1a] If the value of the variable for the assertion of X disagrees with the assertion of X:
        <[10c1a1] Record an indication that X is a prevailing determination.
        [10c1a2] Record an indication that the variable for the assertion of X is over-determined.
        [10c1a3] Let the prevailing cause and prevailing reason for the value of the assertion of X become the same as the cause and reason of X.
        [10c1a4] Halt the operation of asserting terms, and exit back to the calling process in step 2a1.>
      [10c1b] Otherwise:
        [10c1b1] Record an indication that X is non-prevailing.
    [10c2] Otherwise:
      [10c2a] If the variable (V) for the assertion of X is free:
        <[10c2a1] Record an indication that V is determined.
        [10c2a2] Let the value of V become the same as the value of the assertion of X.
        [10c2a3] Increment the master determinant number and assign its value as the determinant number of V.
        [10c2a4] Record an indication that X is a prevailing determination.
        [10c2a5] Let the common reason of X become the assertion of X unioned with the intersection of the common reasons of the prevailing inferences where each asserts a term that disagrees with a negated term (if any) of X and has the latest assumptive value (if any) in its cause.
        [10c2a6] For each non-asserting inference (Z) which has a term in its implicated phrase which disagrees with the term asserted by X:
          [10c2a6a] Move the term which disagrees with the assertion of X from the implicated phrase of Z into the negated phrase of Z.
          [10c2a6b] If the count of terms in the implicated phrase of Z is one:
            <<[10c2a6b1] Let the cause of Z become the union of the prevailing causes for the values that disagree with the terms in the negated phrase of Z.
            [10c2a6b2] Let the reason of Z become the prevailing assertions that negate the subset of values in the negated phrase of Z where the prevailing cause of each value contains the latest assumption, unioned with the prevailing reasons for those same prevailing assertions.
            [10c2a6b3] Enqueue Z into the implication queue.>>>
      [10c2b] Otherwise, if the variable for the assertion of X is over-determined, then:
        <[10c2b1] If any determined inference other than X asserts a term that agrees with the assertion of X:
          [10c2b1a] Record an indication that X is non-prevailing.
        [10c2b2] Otherwise:
          [10c2b2a] Record an indication that X is prevailing.>

De-asserting Terms

"De-asserting" is an operation that reverses the effects of the operation of asserting terms. In this aspect of the present invention, de-asserting includes moving terms from negated phrases into implicated phrases and setting the values of indicators in the inference database in a way that is consistent with the removal of an assumption. The operation of de-asserting terms accepts an input value that represents an assumption which is to be made free. This process uses the de-implication pool which generally contains implicated phrases but which contains only assertions in the provided exemplary aspect of the invention.

The operation of de-asserting terms occurs when the value of a variable is overturned or when alternate sets of assumptions are being tested. These conditions might be met during the execution of alternate conceptualizations of many of the other operations of this invention. However, in the exemplary aspect of the invention that is presented above, only the operation of precipitating an inference explicitly invokes this operation.

In the provided exemplary aspect of the invention, the operation of asserting terms halts immediately after encountering an over-determined variable, and all assumptions are de-asserted in reverse assumptional order. Consequently, there are no cases where de-assertion occurs in a context where recently asserted values are affected by an increase in the number of the prevailing cause or reason. The number of the prevailing cause or reason is discussed above under the heading Ordering. Other conceptualizations of the invention might be affected by such increases in the prevailing numbers, and the process of de-asserting would have to be restructured accordingly.

The following is a list of the steps involved in de-asserting terms according to the provided exemplary aspect of the invention, presented in the recommended order of processing. This process corresponds to step [2a2b1] of the main procedure:

[11] Initialize the de-implication pool as empty.
[12] Enqueue the value of the input term into the de-implication pool.
[13] For each value (VAL) in the de-implication pool, regardless of whether the value was enqueued at the beginning of this step or becomes enqueued during the execution of this step, perform the following:
  [13a] Dequeue VAL.
  [13b] For every inference XX with a negated phrase which contains a term that disagrees with VAL:
    [13b1] If XX is a prevailing determination:
      [13b1a] Enqueue the value of the assertion of XX into the de-implication pool.
      [13b2] Record an indication that XX is non-asserting and non-determined.
      [13b3] Move the term which disagrees with VAL from the negated phrase of XX into the implicated phrase of XX.
      [13b4] Let the cause of XX be replaced with the union of the prevailing causes of the assertions which disagree with the terms (if any) in the negated phrase of XX.
      [13b5] Let the reason of XX be replaced with the union of the prevailing reasons for the assertions which disagree with the terms (if any) in the negated phrase of XX as well as those assertions themselves.
      [13b6] Let the common reason of XX become empty.
  [13c] If the variable of VAL is over-determined:
    [13c1] Find the prevailing inference (YY) that asserts a term which disagrees with the assertion of XX.
    [13c2] Enqueue YY into the implication queue.
    [13c3] Record an indication that the variable of VAL is determined.
  [13d] Otherwise:
    [13d1] Record an indication that the variable of VAL is free.
    [13d2] Record a null determinant number for the variable of VAL.
  [13e] Let the prevailing cause and reason for VAL both become empty.
  [13f] If VAL agrees with the value asserted by an assumption:
    [13f1] If the assumption that agrees with VAL is the latest assumption:
      [13f1a] Find the assumption (W) other than VAL which is greatest in the assumptional ordering.
      [13f1b] If W exists:
        [13f1b1] Let W become the latest assumption.
      [13f1c] Otherwise:
        [13f1c1] There is no latest assumption.
    [13f2] Delete the inference which asserts the same value as VAL.
    [13f3] Record an indication that the variable of VAL is non-assumptive.

Precipitating an Inference

"Precipitating" is an operation that resolves a conditional contradiction. This operation identifies a proximal parameterization of the contradiction (called a "teardrop"), renders that parameterization as a "precipitated" inference, and returns the system consisting in the set of inferences and the set of assumptions to a consistent state, primarily by de-asserting assumptive values.

The set of disjunct values that comprise the constraint-like quality of the precipitated inference is called the "body" of the teardrop. One term of the body is called the "precipitant." The complements of potential precipitants are such that, if one is assumed in combination with the assumptions prior to the latest assumption, the contradiction is rendered. The chosen actual precipitant is one of the potential precipitants nearer to the over-determined variable. The body of the teardrop derives from a set called the "frame" of the teardrop, which is itself derived from information associated with the precipitant and both the contradicted terms. The frame and body of a teardrop are mutually exclusive sets of values.

The operation of precipitating an inference works directly on the inference database without additional input parameters, and this operation is invoked immediately after asserting terms if one or more contradictions exist.

The following is a list of the steps involved in resolving a contradiction according to the provided exemplary aspect of the invention, presented in the recommended order of processing. In one aspect of the present invention, the following corresponds to step [2a2a] of the main procedure:

[14] If there is no latest assumption:
  [14a] Report that the expression is unsatisfiable.
  [14b] Halt all further processing.
[15] Otherwise:
  [15a] Among the over-determined variables, find the variables where the union of the prevailing causes for the two values of each variable is least, and among those, find any one variable (VV).
  [15b] Create a precipitant term and let it have the complementary value of the prevailing assertion with the greatest determinant number among terms which are in the intersection of the common reasons of the prevailing inferences which assert the two values of VV.
  [15c] Create a phrase (PHRASEX) which contains the union of the values of VV and the prevailing reasons for those values. This phrase is called the "frame."

[15d] Remove values from PHRASEX that have determinant numbers less than or equal to the determinant number of the precipitant variable.

[15e] Create a phrase (PHRASEY) which contains the union of the negated phrases of the prevailing inferences which assert the terms in PHRASEX. This phrase is called the "body."

[15f] Remove values from PHRASEY that have negating assertions with determinant numbers greater than or equal to the determinant number of the latest assumption.

[15g] (Optional) Remove values from PHRASEY that have negating assertions that are unconditional.

[15h] Add the precipitant term to PHRASEY.

[15j] Create a non-determined inference ZZ which has the terms of PHRASEY in its implicated phrase and has empty cause, reason, common reason, and negated phrases.

[15k] Index ZZ.

[15m] If the implicated phrase of ZZ contains exactly one term:

[15m1] Enqueue ZZ into the implication queue.

[15n] Otherwise:

[15n1] Record an indication that ZZ is non-asserting.

[15p] (Optional) Alter the assumptional ordering so that the variable of the precipitant term is least and the ordering is otherwise unchanged.

Step 15g is optional and merely summarizes the imperative effect of the unconditional assertions by omitting them and thus making the body smaller and therefore more efficient to process without changing the meaning of the body.

The optional step 15p is unnecessary for solving simpler problems, like Integer Factoring, in polynomial time. However, retaining an initially chosen assumptional ordering is probably insufficient for solving an arbitrary NP-complete problem in polynomial time. Step 15p provides an exponential order of improvement relative to bit count for the Integer Factoring problem and probably improves the efficiency of other applications.

If step 15p is not executed, then it might be unnecessary to de-assert all the current assumptions before a consistent state of the system is returned (see step 2a2b). However, in that case, the proper population of the cause, reason, and common reason phrases of the newly precipitated inference would be different than is represented above, as those of skill in the art will understand.

The given example embodiment of the invention finds a teardrop that is effectively minimized with respect to constraints, but does not find a teardrop that is minimized with respect to term values. This lack of complete minimization is thought to be the best mode of the invention for implementation as software on a semiconductor computer. Applications of the invention which are especially sensitive to the cost of creating new inferences might extend the normalization of the teardrop to minimize the set of body terms or the set of frame terms, thus reducing the number of inferences precipitated by the application at the cost of additional computation during the operation of precipitating.

One such extension of the normalization might include de-asserting all assumptions, determining the prevailing assertions that disagree with the body terms without implicating them, preventing the operation of asserting terms from enqueueing assertions of the precipitant variable, and testing each of the non-contradicted frame terms to determine if assuming that term could render a contradiction which includes neither the current precipitant nor any non-frame terms in the frame of that hypothetical teardrop nor any new terms in the body.

Another possible extension of the normalization might include de-asserting all assumptions, making the complement of the precipitant least in the assumptional ordering, and proceeding with a process of repeatedly assuming and implicating until a contradiction is detected. This might identify variables of the teardrop that could be rendered as frame terms rather than body terms, thus reducing the precipitated inference to a subset of the values it would otherwise have contained.

Yet other normalization extensions are possible, but they are all believed to incur computational costs that are comparable to, if not greater than, the cost of not further minimizing the number of terms in the precipitated inference.

Other aspects of the present invention may partition the variable space, for example as separate integrated circuit chips, and enjoy the same qualitative difference in computational cost, namely have polynomial rather than hyper polynomial cost. However, the reduction of computational cost occurs as long as the partitioning provides a teardrop that contains a number of inferences that is bounded by a polynomial multiplier on the number of inferences contained in the completely minimized teardrop.

Assuming a Value

"Assuming" is an operation that includes introducing an assertion into the inference database. This operation accepts an input variable value.

In the given example embodiment of the invention, the operation of assuming a value occurs immediately after asserting terms if no contradictions were found during the latest iteration of that operation.

The following is a list of the specific steps involved in assuming a value according to the provided exemplary aspect of the invention, presented in the recommended order of processing. The following correspond to [2c1] in the main procedure:

[16] Create a non-determined inference in the inference database which (1) contains the input variable value in its cause, common reason, and implicated phrases, and contains no other terms in those phrases, (2) has the complement of the input variable value in its negated phrase, and no other terms in that phrase, and (3) has an empty reason.

[17] Enqueue this new inference into the implication queue.

[18] Record an indication that the input variable value is assumptive.

[19] The assumptive value which is considered to be the latest (if any) is no longer considered the latest, and this new assumptive value is the latest.

Aspects of the present invention discuss the manner of selecting which contradiction to precipitate as an inference, the concepts of initialization, asserting terms, and de-asserting terms including tracking causes, reasons, common reasons, and prevailing inferences. The manner of state-keeping is dependent on the arbitrary choice of how states are represented, which might be limited by logical or physical qualities intrinsic to the surrounding system.

The disclosed exemplary embodiment of the present invention may be implemented as software on a semiconductor computer. Other implementations are also possible. The implementation of a particular embodiment depends on the economies inherent in the physical medium in which the embodiment is implemented. Some of these economies were discussed in the context of step 15p, for example. Where the inventor has contemplated alternative modes that could result in better performance in some circumstances, these alternatives have been explicitly noted in the disclosure.

Other embodiments of the present invention may omit some steps or reorder the sequence of processing without affecting the utility of the invention.

Aspects of the present invention provide systems, methods and devices for improving the performance of machines that solve problems in the NP complexity class. Solution of NP problems has applicability in a wide variety of technical fields, including image compression, image analysis, cryptanalysis, telecommunications routing, generic control systems for data processing, structural design of data processing systems, design and analysis of circuits or semiconductor masks, artificial intelligence, logistic scheduling and routing, and design and analysis of proteins.

Aspects of the present invention provide performance improvement for a wide variety of industrial design, routing, scheduling, and decision-making processes. Many of these applications are apparent from the lists of NP-complete problems.

One example of application of the present invention is in the field of analyzing proteins and designing protein-based pharmaceuticals. Interpreting most variables as particular monomers from a DNA sequence, and making the assumptional ordering the same as the sequence ordering, the values of the monomer-variables can be interpreted as relative positions in a grid. Constraints are then created that reflect the rules which restrict the placement of adjacent monomers in the grid, adding variables to represent any intermediate states that the constraints might imply. Using such a model, aspects of the invention can determine in days what otherwise takes CPU-years to compute: a least-energy physical configuration of a protein; or, with reversal of the roles of variables and values, a monomer sequence that produces a given physical configuration, thus rendering a proto-formula for a bio-engineered pharmaceutical.

An exemplary aspect of the present invention was described above. The exemplary aspect is meant to be illustrative rather than restrictive. Because the aspects of the present invention may be utilized in a wide variety of devices, manufacturing systems, and data-processing systems, the grouping of functional components and subsequent naming of the groups is arbitrary and varies according to the naming conventions of the system in which the innovation is used. However, while the wording of the following example may vary according to industry, the terminology that is used below is well-defined and conventional. The conventional terminology is recognizable to those of skill in the art of software engineering for technical supercomputing.

Example of Precipitating an Inference

An example of precipitating an inference according to aspects of the present invention is provided in the following paragraphs for demonstrative purposes.

An expression of the exemplary problem is provided in matrix format and also in a constraint-variable (C&V) diagram format.

FIG. 1 shows a matrix presenting an exemplary problem, according to aspects of the present invention.

In the matrix format, the variables are presented along the top corresponding to columns of the matrix and the constraints are presented along the side of the matrix and correspond to the rows of the matrix. The example includes 17 variables and 16 constraints. The variables are shown as A, B, C, D, U and V6 through V17. The notation changes to separate the variables that are determined by assumptions and unconditional assertions, namely A, B, C, D, and U, from the remaining variables, namely V6 through V14, that are determined by the process of implication resulting from the assumptions and original unconditional assertions. In the matrix format, an o indicates the presence of the positive value of that variable in the constraint, and an X indicates the presence of the negative value of that variable in the constraint. For example, C1=(+u OR –v6), C11=(+v6 OR –v13 OR +v14), and C12=(–u).

What matters for understanding the structure of a conjunct-disjunct expression is an appreciation of where the terms of constraints agree and disagree. The alphabet soup of the labeling in an algebraic representation can distract from what is important. Consequently, it is convenient to have a notation that is less about labels and more about relationships. The table of FIG. 1 is shown in the Amanda notation. The Amanda notation makes cross-referencing the agreement and disagreement between constraints easier by representing the system of constraints as a matrix. For each variable, there is a column. For each constraint, there is a row. Each term in each constraint is represented by a hug ("o") or a kiss ("X") in the appropriate cross-referenced position. Whether the affect of the variable in that constraint is a hug or a kiss depends on the value indicated by the term. These affect symbols are intentionally devoid of reference to truth or falsehood. They exist simply to represent agreement or disagreement in a readily legible way. Consequently, one can arbitrarily adopt any value assignment of choice to underlie these symbols. Further, while the variables, or predicates, are labeled at the top and the constraints are numbered down the side of this table, none of that matters to the structure such that the labels may be omitted. A convention is selected where a hug ("o") represents the affect of the first value to be negated for a variable, and a kiss ("X") represents the complementary affect. The corresponding conventional algebraic representations of hugs and kisses are positive and negated lower case variable letters, for example "b" and "–b", respectively. In other words, a hug ("o") means the constraint includes the variable value +v and a kiss ("X") means that the constraint includes –v.

FIG. 2 shows a variable and constraint diagram representation of the matrix of FIG. 1, according to aspects of the present invention.

In a variable and constraint (V&C) diagram, the circles are variables as labeled and the lines, which transect one or more circles, are the constraints. When two lines cross inside a circle, their corresponding constraints have disagreeing terms for the variable that is shown by the circle. For example, in FIG. 2, the bottom horizontal line 201 shows the constraint C1 and C1=(+u OR –v6). The line 201 crosses the two circles corresponding to U and V6. The sign of the variables is shown by relative disagreement of terms between constraints. In other words, the diagram does not care about the absolute truth or falsity of a variable. Rather, it cares whether two constraints, such as C1 and C10, have agreeing or disagreeing terms. The line 211 corresponding to C11 crosses the line 201 in the variable V6 indicating that the value "o" of the variable V6, or the term of V6, in C1 disagrees with the term representing V6 in C11. This disagreement of terms is shown in the matrix of FIG. 1 where V6 is represented by an "X" in the first row corresponding to C1 and by an "o" in the eleventh row corresponding to C11.

Figure 3:
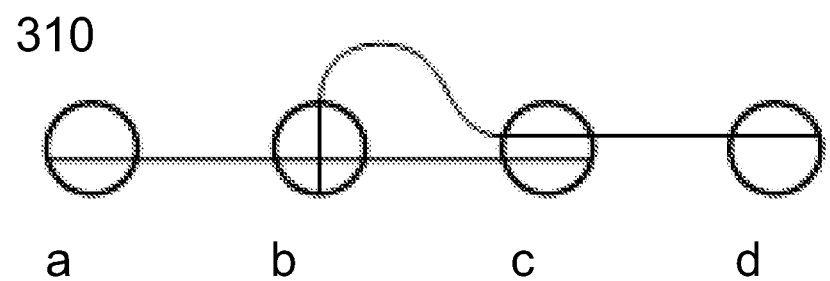
FIG. 3 shows an example of a general format for variable and constraint diagramming.
Figure 3:
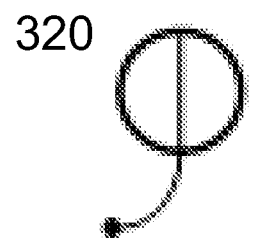

FIG. 3 shows an example of a general format for variable and constraint diagramming.

Variable and constraint diagrams or V&C diagramming makes the commonality of variables between constraints even more obvious than the Amanda notation that was used in FIG. 1. This is achieved by using a pictorial representation. Variables are represented by non-overlapping circles. Constraints are represented by lines that pass through one or more of these circles. If two constraint lines pass through the same variable circle, then the lines traversing the circle either cross one another or not, depending on whether the corresponding terms of the constraints disagree or agree, respectively.

For example, the algebraic expression "(−b OR −c OR +d) AND (+a OR +b OR −c)" could look like 310 in FIG. 3.

Obviously, a diagram where three constraint lines cross each other within the same variable circle is an ill-formed diagram as is a diagram where two or more lines cross one another inside a circle and other lines which traverse the same circle do not cross any lines.

Further, in order to keep constraints that contain a single term from being almost invisible in this notation, a convention is adopted to represent such constraints with an eye-catcher.

An example of an eye-catcher notation for a single variable constraint is shown as 320.

V&C diagrams are useful for visualizing the structure of small, diffuse, or highly regular systems of constraints, and this notation is inherently normalized to a limited extent.

Figure 31:
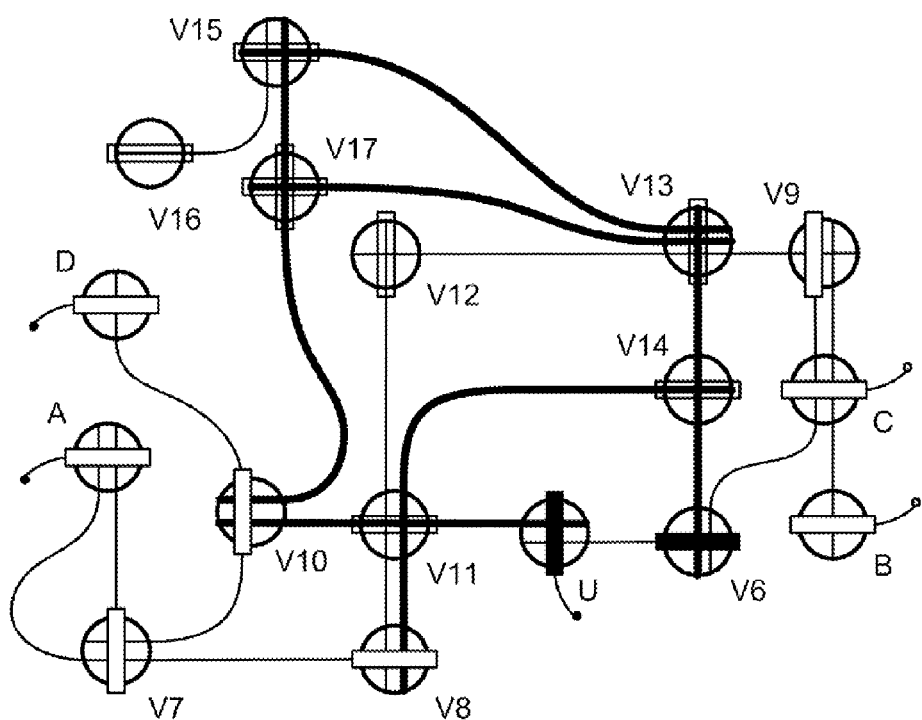
Figure 32:
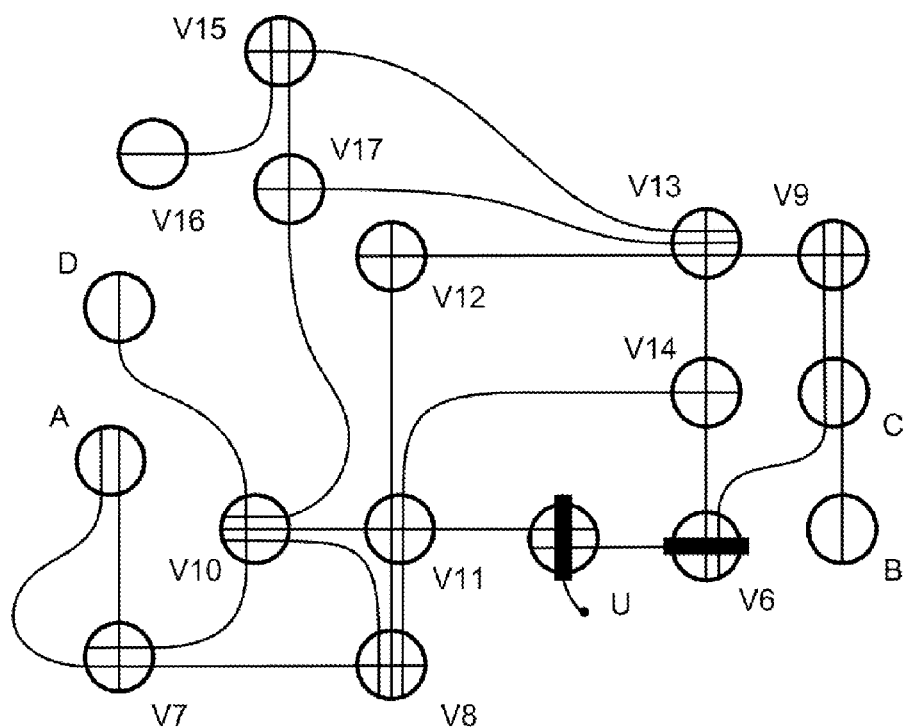
Figure 33:
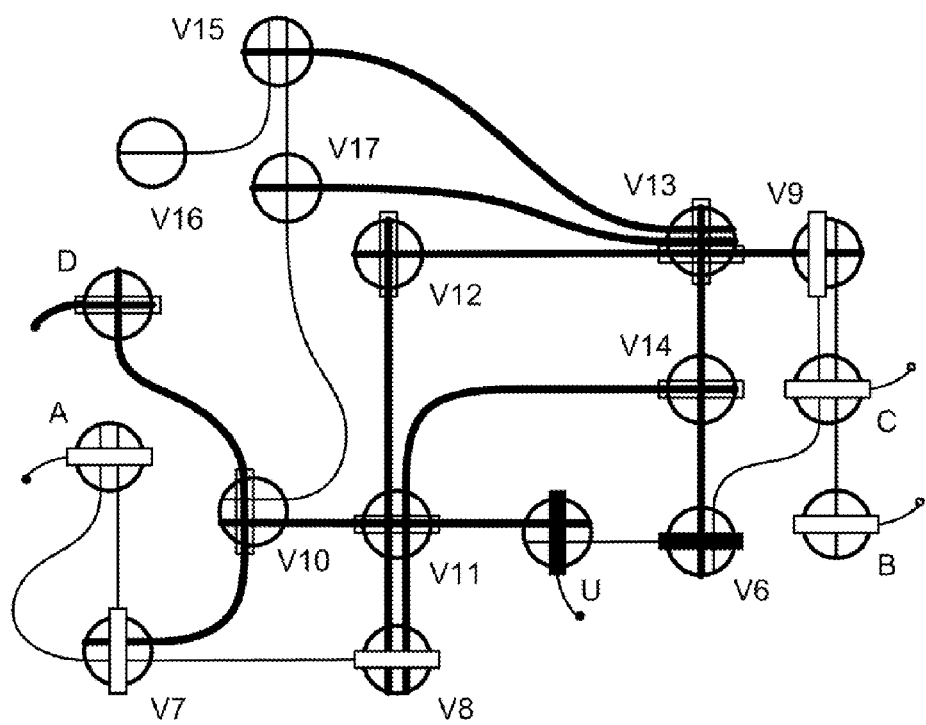
Figure 34:
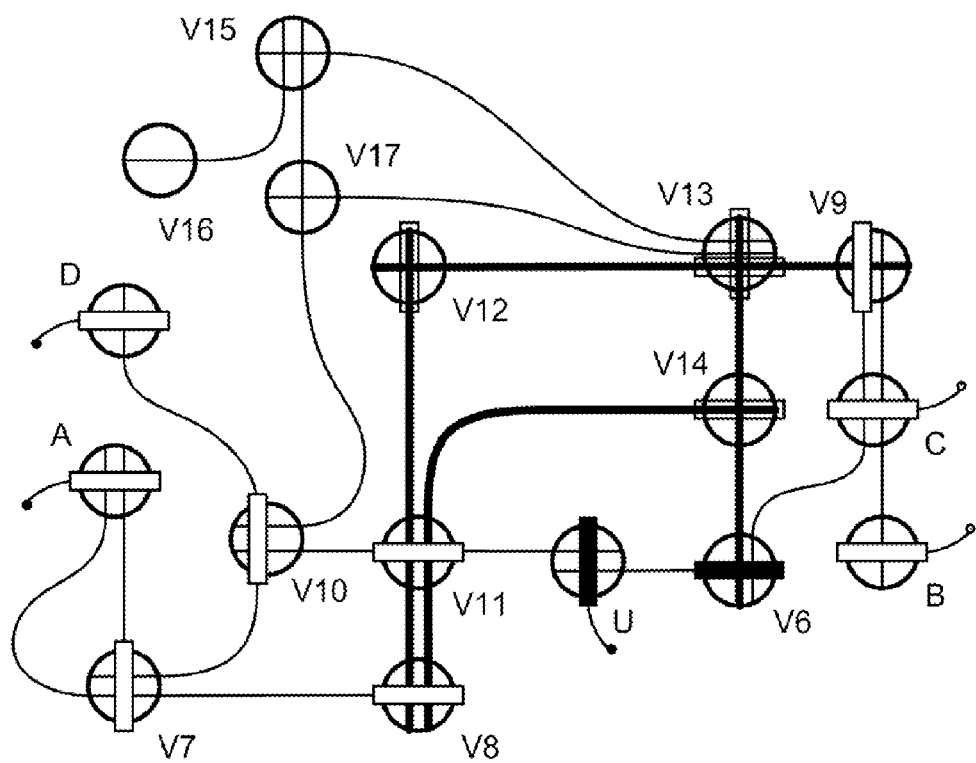
Figure 35:
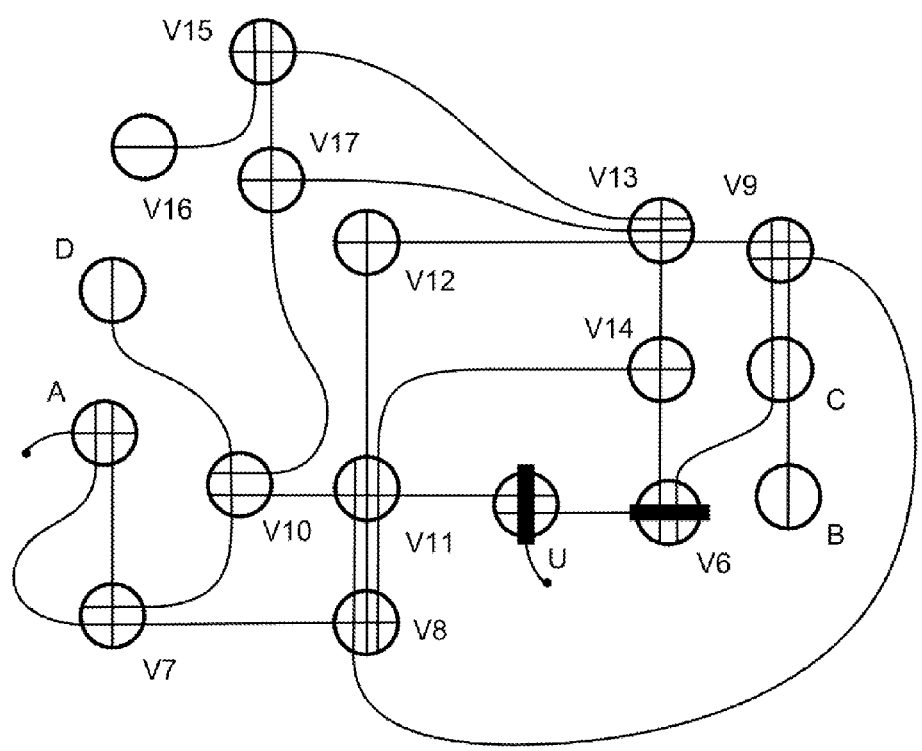

FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30 show the stages of making assumptions and asserting terms. FIGS. 31 and 32 show the stages of precipitating an inference for solving the problem shown in FIG. 1 and FIG. 2, according to aspects of the present invention. FIG. 33, FIG. 34, and FIG. 35 show an alternate teardrop that might have been precipitated in order to demonstrate the purpose, usefulness, and necessary features of the cause, reason, common reason, and orderings.

In the notation of the above drawings, the format of the lines helps show the flow of implication and what constitutes "proximity." Thin black lines indicate the basic constraints. Thick lines represent the constraints which have been forced to assert terms because of the latest assumption or original unconditional assertion. Circles with thin lines indicate the variables, and circles with thick bars crossing them represent the variables having a determined variable value. When the value of a variable is determined because it is a member of a certain constraint, then a bar aligned with the direction of the constraint is placed across the variable. Opaque thick black bars show unconditional assertions, transparent thick bars show assertions forced by the latest assumption, and opaque thick white bars show assertions that were forced by previous assumptions.

FIG. 2 shows the expression just before the end of the initialization process. At this point, all constraints are non-asserting and have empty causes, reasons, and common reasons.

Figure 4:
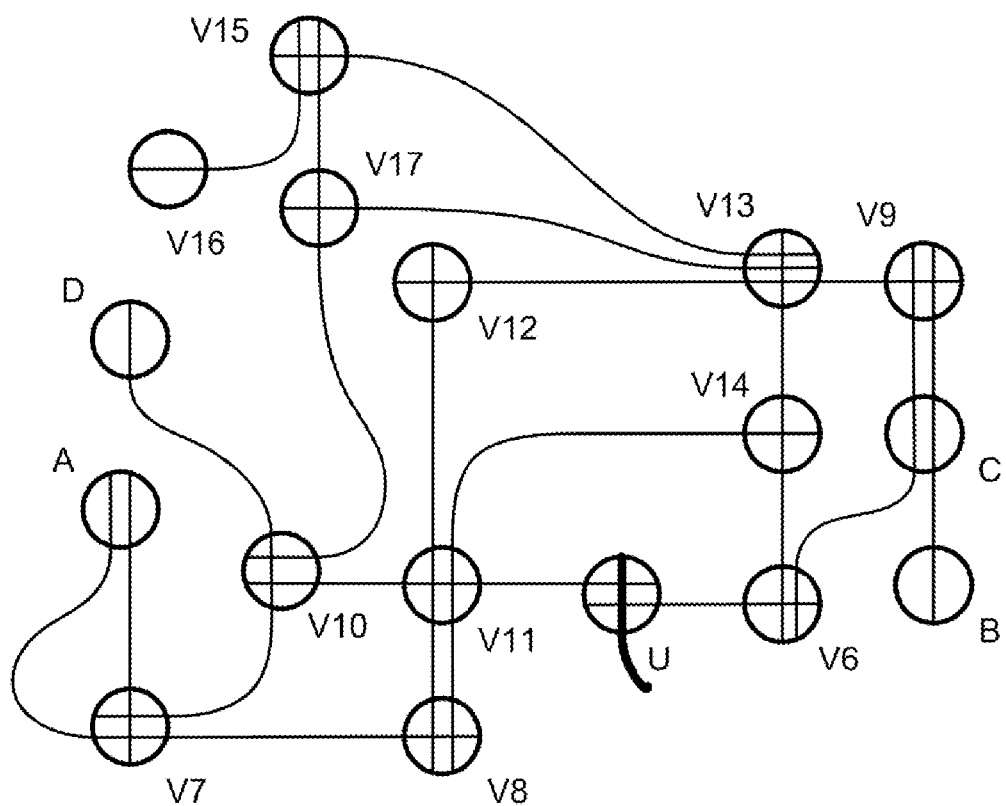
FIGS. 4-35 show the stages of precipitating an inference for solving the problem shown in FIG. 1 and FIG. 2, according to aspects of the present invention.

FIG. 4 shows constraint C12 becoming an asserting constraint because it contains only one term, and that term represents −u. This happens at the very end of the initialization process. No terms are negated in C12 in order for it to assert its term; so the cause and reason of C12 remain empty and thus [−u, C12] is unconditionally asserted. Once a term is asserted, the constraint that contains it becomes enqueued. So C12 becomes enqueued.

Figure 5:
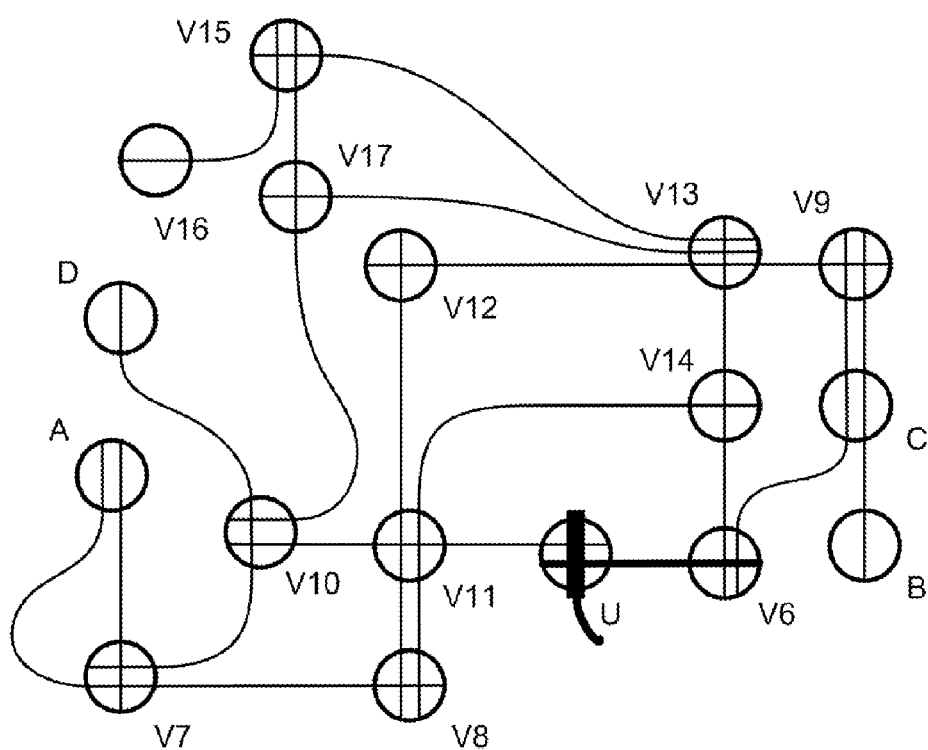

FIG. 5 shows the asserted term of C12, representing −u, determining the value of its variable U. For example not-U=True. As presented above, the relative value of the terms with respect to one another is of interest, not the actual value. So, whether U is True or False is not material to the solution of the problem. Namely, the value of the variable represented by the asserted term of C12 may be determined by the unconditional assertion to be either True or False and it is only for the sake of demonstration, that the value of −u is determined as True.

The variable value +u, appears in two other constraints, C1 and C7 and can help determine the value of the variables in these two constraints. C1=(+u OR −v6) and C7=(+u OR +v10 OR −v11).

If −u=True, then +u=False and for C1 to be True, then −v6 has to be True. Thus, the unconditional assertion shown in FIG. 4 implies that −v6=True and +v6=False.

By one unconditional assertion regarding −u, two terms, [+u, C1] and [+u, C7], are negated and the variables U and V6 are determined as −u and −v6.

C12 is specifically responsible for forcing the assertion of −v6 because no other enqueued constraints asserted a term representing the value −u at the time U was determined. Consequently, C12 became prevailing as well as determined. The only negated term in C1 is negated by an unconditional assertion; therefore, the cause of C1 remains empty, but the reason of C1 came to contain the term [−u, C12]. C1 comes to assert [−v6, C1], and C1 becomes enqueued.

The above process shows how negation works in a conjunct-disjunct expression: first values of the variables for asserted terms in some of the constraints are determined, the determined values disagree with some terms in other constraints and reduce the set of implicated terms in the affected constraints.

Note that implying is distinguished from implication and what is implied is distinguished from what is implicated.

Implying a term is used in the logic rule of modus ponens. According to modus ponens "Given A implies B, if A is true then B must be true." In addition, disjunction is an isomorphic transformation of implying. Specifically, A implies B if and only if not-A is true or B is true." Alternative forms of expressing this theorem are provided below for the convenience of the reader:
(A implies B) iff (−A=T OR B=T)
(A→B)<=>(−A OR B)
In addition, modus tollens gives us::
(A implies B)<=>(−B implies −A)
This theorem has the following truth table:

| A | B | −A | (−A OR B) | (A --> B) |
|---|---|----|-----------|-----------|
| T | T | F  | T         | T         |
| T | F | F  | F         | F         |
| F | T | T  | T         | T         |
| F | F | T  | T         | T         |

This theorem and the commutativity of disjunction and conjunction is used to find the equivalence between disjunction and various implying expressions. Any disjunction of more than two values is equivalent to a large number of implying expressions, such as the following list of statements that are equivalent to "A or B or C".

| | |
|---|---|
| Not-A implies B or C. | Not-A implies C or B. |
| Not-B implies A or C. | Not-B implies C or A. |
| Not-C implies A or B. | Not-C implies B or A. |
| Not-A and Not-B implies C. | Not-B and Not-A implies C. |
| Not-A and Not-C implies B. | Not-C and Not-A implies B. |
| Not-B and Not-C implies A. | Not-C and Not-B implies A. |

The difference between "implying" and "implicating" is demonstrated by an example. If a conjunct-disjunct expression includes three constraints of "A OR B" and "A OR C" and "Not-B OR Not-C OR D", then asserting Not-A forces the assertion of B and C, which negates the Not terms in the final constraint, ultimately forcing the assertion of D. It is said that the assertion of Not-A implies D. Further, based on modus tollens, if Not-A implies D, then Not-D implies A.

Implication is different from implying in that if Not-D alone is asserted, then terms are negated but the constraints containing those terms are not forced to assert other terms, and thus the process stops. So, the assertion of Not-D implies A but it does not implicate A. In short, what is implicated is also implied, but what is implied is not necessarily implicated.

Figure 6:
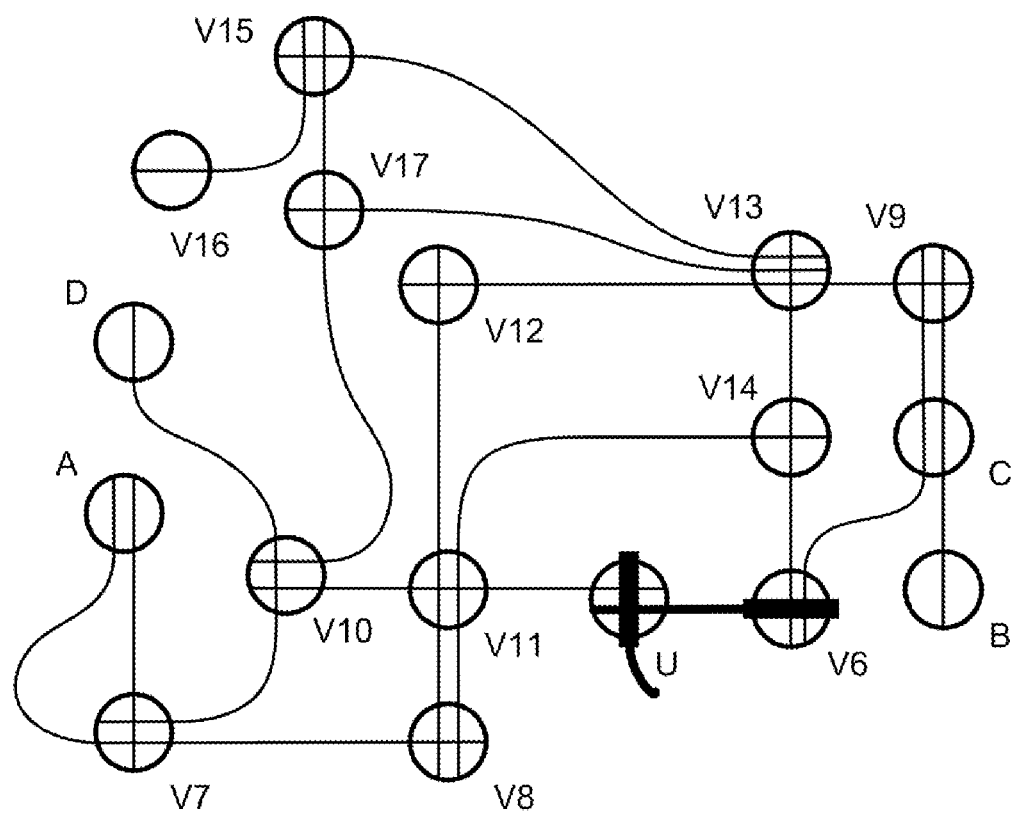

FIG. 6 shows that variable V6 is determined by C1 to have the value −v6. Because C1 has an empty cause, its assertion is also unconditional. Again, there are no other enqueued assertions, and therefore V6 becomes determined next and C1 becomes both determined (rather than enqueued) and prevailing. Terms [+v6, C8] and [+v6, C9] were negated, but neither of the constraints were forced to assert a term.

Figure 7:
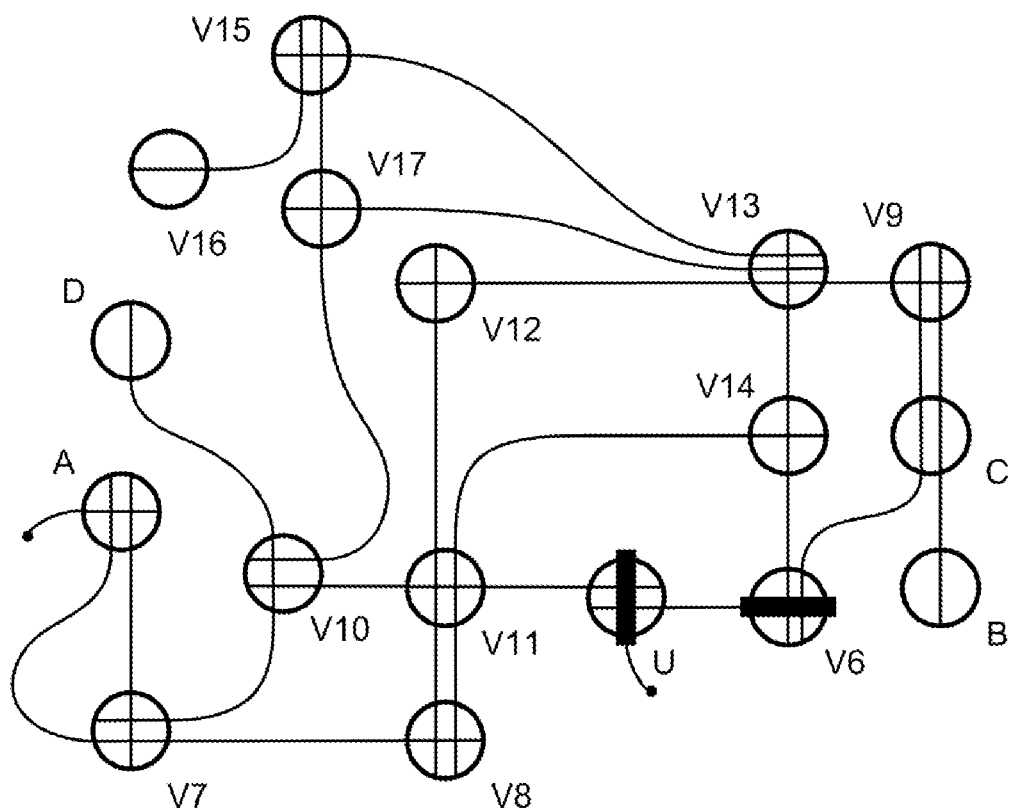

FIG. 7 shows the first assumption.

While FIG. 6 showed an unconditional assertion [−v6, C1] forced by the unconditional assertion of [−u, C11], FIG. 7 shows that the first assumption is represented by a new constraint C17 which contains a term that represents −a. The reason of C17 is empty, but the cause and common reason of C17 each contain a single term [−a, C17].

Figure 8:
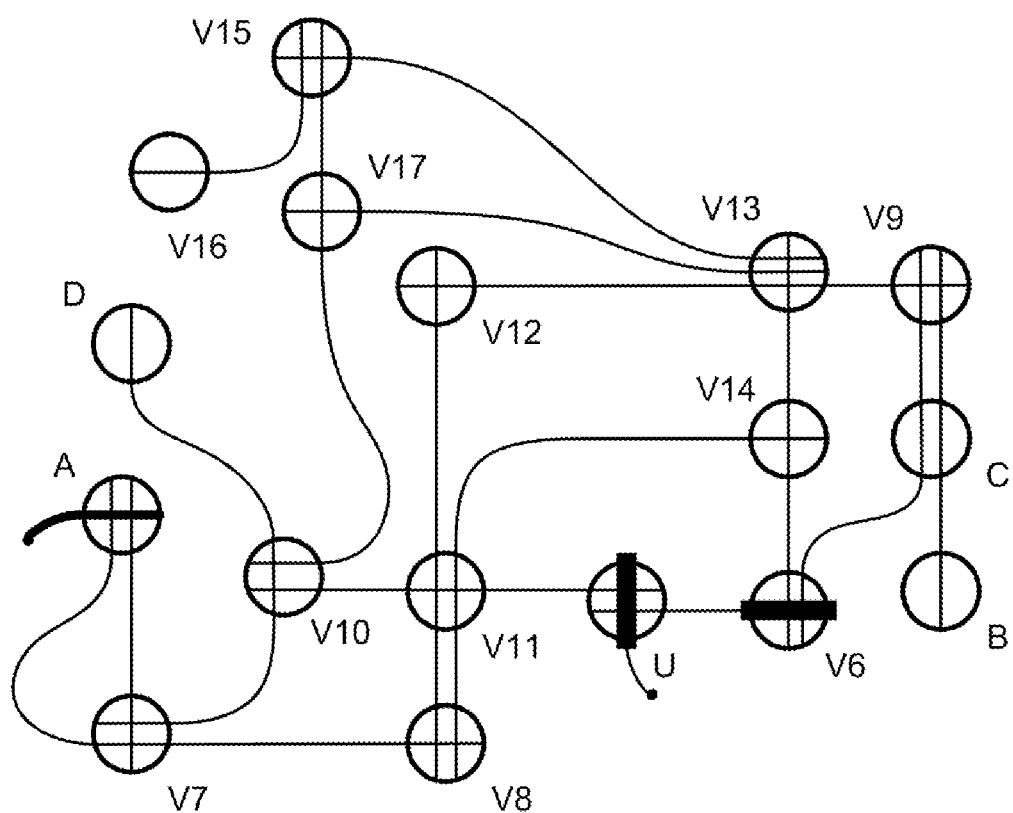

FIG. 8 shows that because constraint C17 contains only one term, it asserts that term and C17 becomes enqueued. Constraint C17 is shown with a thick line to indicate that the constraint is forced to assert a term because of the latest assumption. The reason of C17 is empty, as is always the case with an assumption, and the cause of C17 contains its only term, as is always the case with an assumption, namely [−a, C17] in this case.

Figure 9:
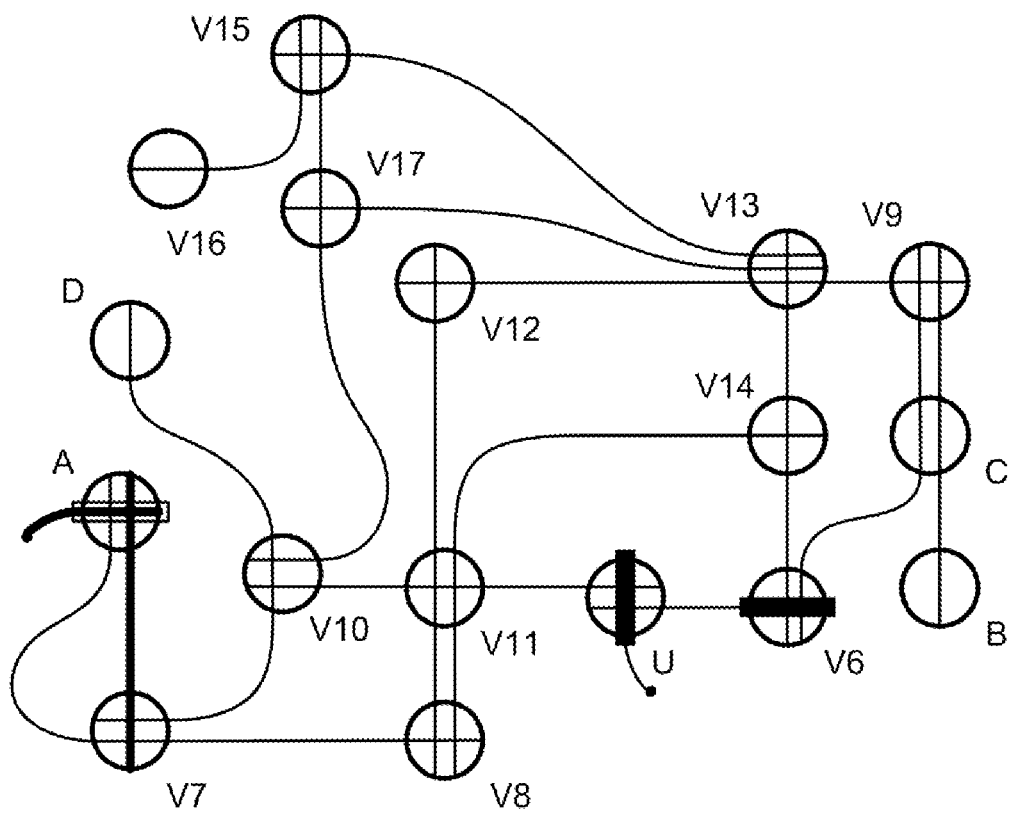

FIG. 9 shows that the assertion of C17 determines the value of A as −a. No other enqueued assertions exist; so without competition, no decision about which variable value is next to be determined or which constraint asserting that value is prevailing need to be made. Therefore, C17 automatically becomes both determined (rather than enqueued) and prevailing. The common reason of C17 comes to contain the assumption's only term, namely [−a, C17]. So, the common reason of the prevailing constraint C7 is {[−a, C17]}. The common reason pertains only to prevailing constraints and is set only after a constraint becomes determined and prevailing.

The value asserted by C17, namely −a, becomes determined, and that determination negates two terms [+a, C3] and [+a, C4]. C3 is forced to assert a term [−v7, C3]. The cause of C3 comes to contain [−a, C17] because that is the only term in the cause of the prevailing assertion that negates a term in C3. Because the only negated term in C3 is negated by an assertion forced by the latest assumption, the reason of C3 contains the prevailing assertion that negates that term plus the reason for the constraint which asserts it. Because the negating assertion is the assertion of an assumption, the reason of that assertion is empty; so the reason of C3 contains only the asserted term [−a, C17]. C3 becomes enqueued.

Figure 10:
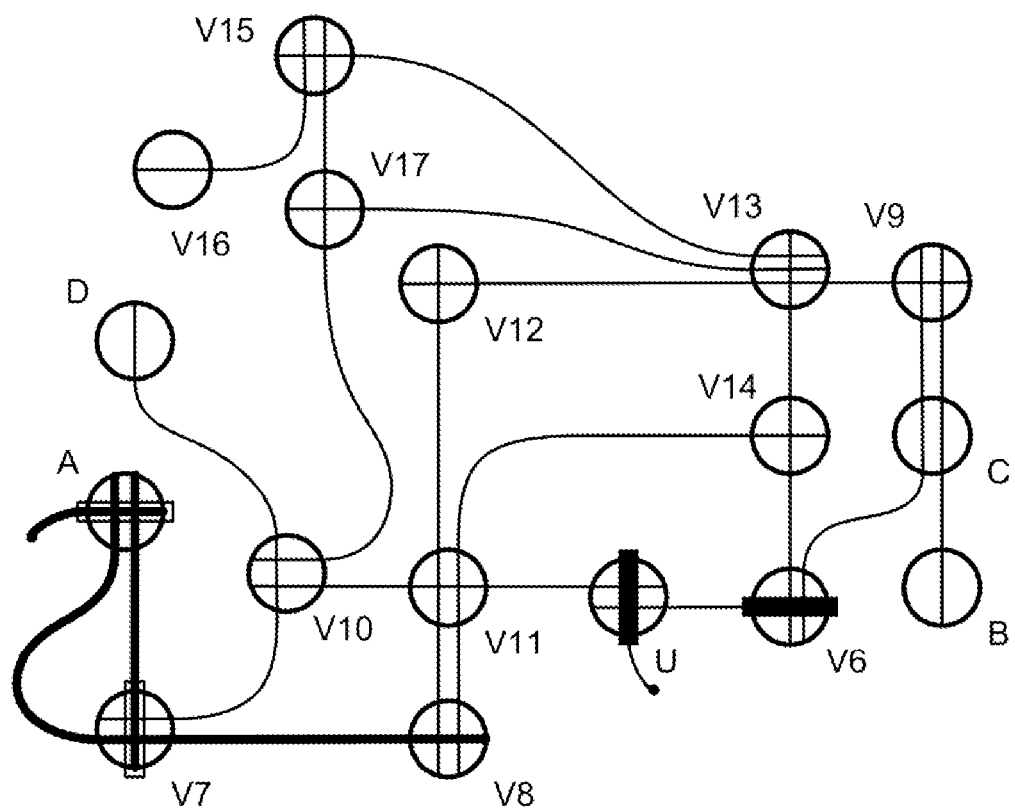

FIG. 10 shows how the value of V8 is asserted from the assumption regarding A. Variable A is in constraints C3 and C4. Determination of the value of this variable as −a negates two terms. The negation of the term [+a, C3] in C3 forces C3 to assert a term that represents −v7. Variable V7 is in C3, C4 and C6. The negation of the terms representing +a and +v7 in C4 combine to force the constraint C4 to assert a value that represents −v8. So two values −v7 and −v8 are implicated from the assumption of −a. Because no other enqueued assertions exist, C3 is next to be determined and it also becomes prevailing. The common reason of C3 comes to contain the set {[−a, C17], [−v7, C3]}. Because the assertions that negate both of the negated terms in C4 have [−a, C17] in their causes, both are assertions forced by the latest assumption. The union of the causes of these two negating prevailing assertions contains only [−a, C17], and thus [−a, C17] becomes the cause of C4. The reason of C4 becomes {[−a, C17], [−v7, C3]}, which is the union of the reasons of these negating prevailing assertions plus their assertions. C4 becomes enqueued.

Figure 11:
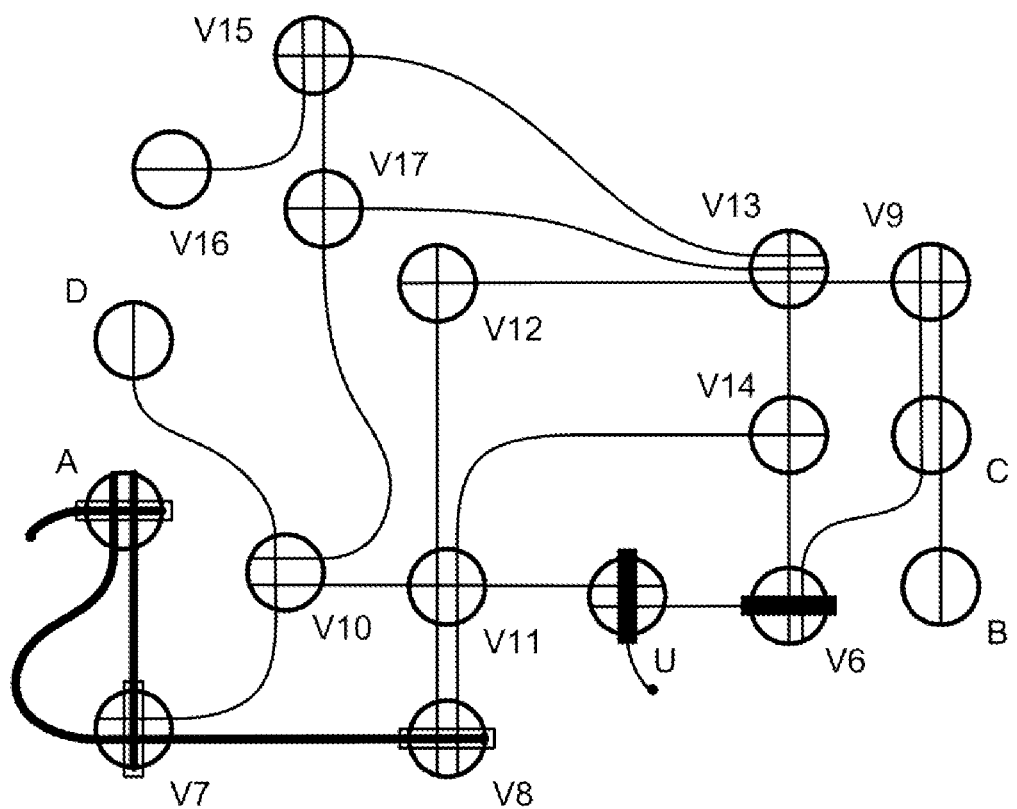

FIG. 11 shows C4 becoming determined. No other enqueued assertions exist, so C4 becomes determined instead of enqueued and also becomes prevailing. The common reason of C4 comes to contain [−a, C17]. Two terms, [+v8, C8] and [+v8, C9], are negated by the determination of variable V8, but neither constraint is forced to assert a term.

Note that at this point, the common reason for the constraint C4 contains the prevailing assertion that represents the value −a and its own assertion, but it does not contain the prevailing assertion that represents −v7 because [−a, C17] is the only term in the intersection of the common reasons of the two prevailing assertions that negate the terms of C4. The two prevailing assertions that negate the terms of C4 are the assertion of [−a, C17] by assumption and the assertion of [−v7, C3] by the constraint C3. The common reasons of these two assertions intersect only in [−a, C17] as shown in FIG. 8. So, the common reasons for the determination of V7 and V8 both contain the assertion of constraint C17 which was done by assumption. In addition to the terms that are common to the common reasons of all prevailing assertions that negate terms of a constraint, the common reason of a prevailing constraint also always contains its own assertion. The common reason of C3 also contains its assertion [−v7, C3], and the common reason of C4 also contains its assertion [−v8, C4]. So, the common reason of the C3, after C3 becomes determined and prevailing, is {[−a, C17], [−v7, C3]} and the common reason of C4 is {[−a, C17], [−v8, C4]} which is set after C4 becomes determined and prevailing.

Further, both constraints C3 and C4 are shown with the notation indicating the assertions forced by the latest assumption because both assertions representing −v7 and −v8 were forced by the latest assumption, namely the assumption of −a in FIG. 7.

Figure 12:
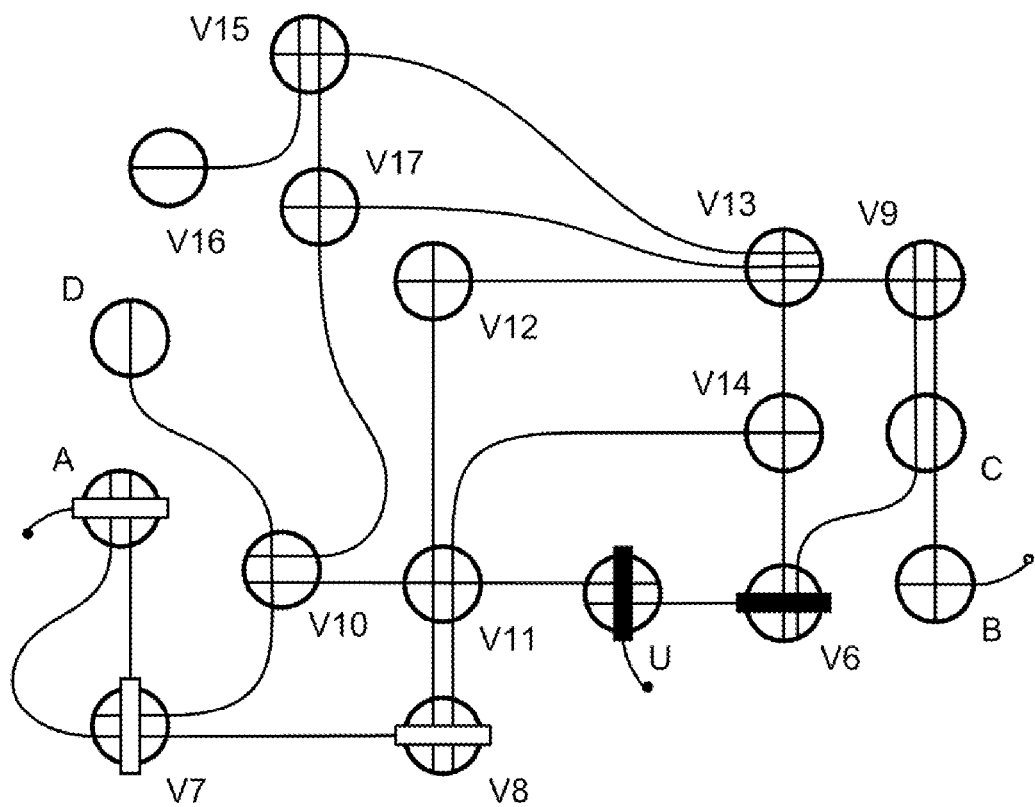

FIG. 12 shows the making of the second assumption which is represented as a new constraint C18 and which assumes −b.

No further assertions are forced as a result of the first assumption of −a shown in FIG. 7. Thus, a next assumption is made. First, the first assumption is set as not the latest assumption; and, as the drawing shows, the notations for C3 and C4 are changed to show C3 and C4 with thin lines, indicating them as assertions that are no longer forced by the latest assumption. Also, the notations for the determinations of A, V7, and V8 are changed to show the bars crossing the circles of A, V7, and V8 as opaque white instead of transparent, indicating that it is not the latest assumption that forces these determinations. Then, the second assumption is made which represents −b. The cause of an assumption is always its only term, namely {[−b, C18]} in this case. The reason of an assumption is always empty. The common reason of C18 comes into being after C18 is determined and if it is prevailing.

Figure 13:
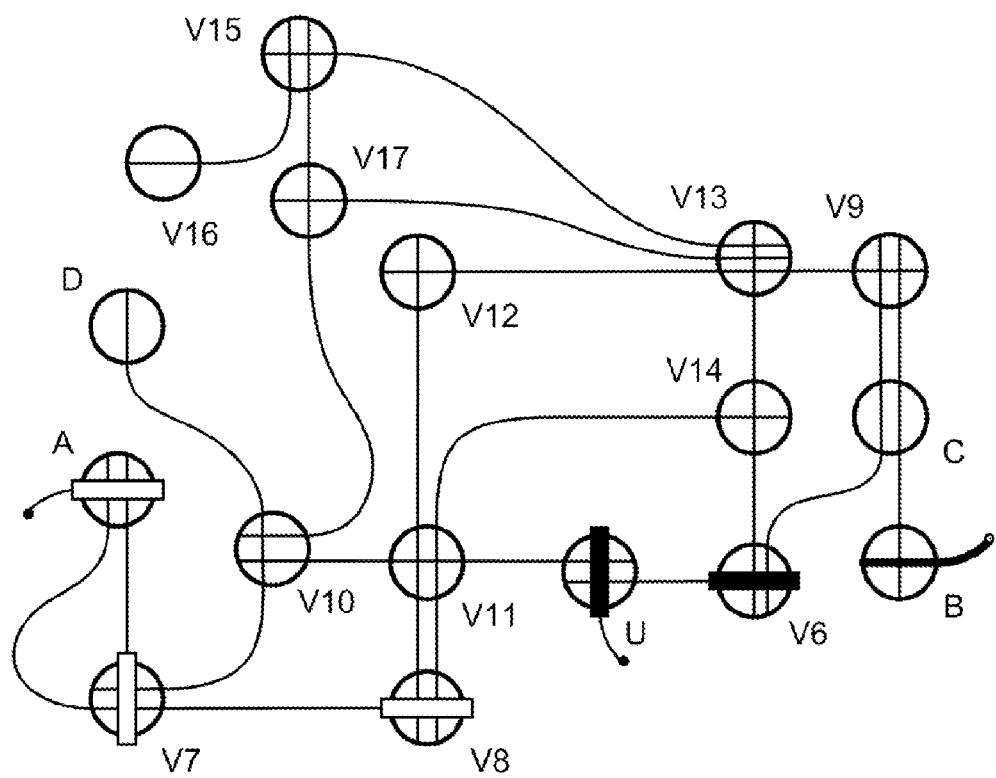

FIG. 13 shows C18 asserting its value. The notation is changed to show C18 with a thick line indicating that it asserts a term as a result of the latest assumption.

Figure 14:
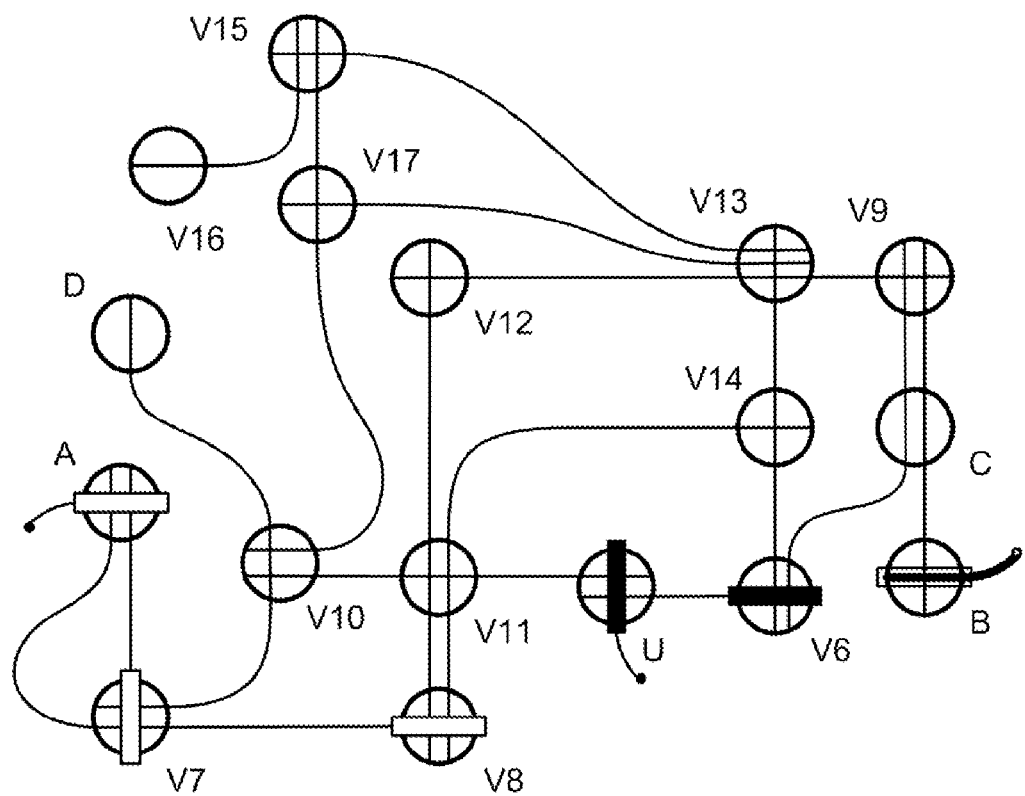

FIG. 14 shows the determination of the second assumption.

The second assumption becomes determined and the notation shows that B is now determined as −b as opposed to being merely assumed as −b. Further, the determination of B as −b negates one term [+b, C5], and no further assertions are forced by this assumption because C5 has two other terms that remain undetermined. C18 also becomes prevailing, as is always the case with an assumption, and the common reason of C18 comes to contain [−b, C18] because the common reason of an assumption always comes to contain its only term. Note that the common reason is not defined until C18 is determined and prevailing.

Figure 15:
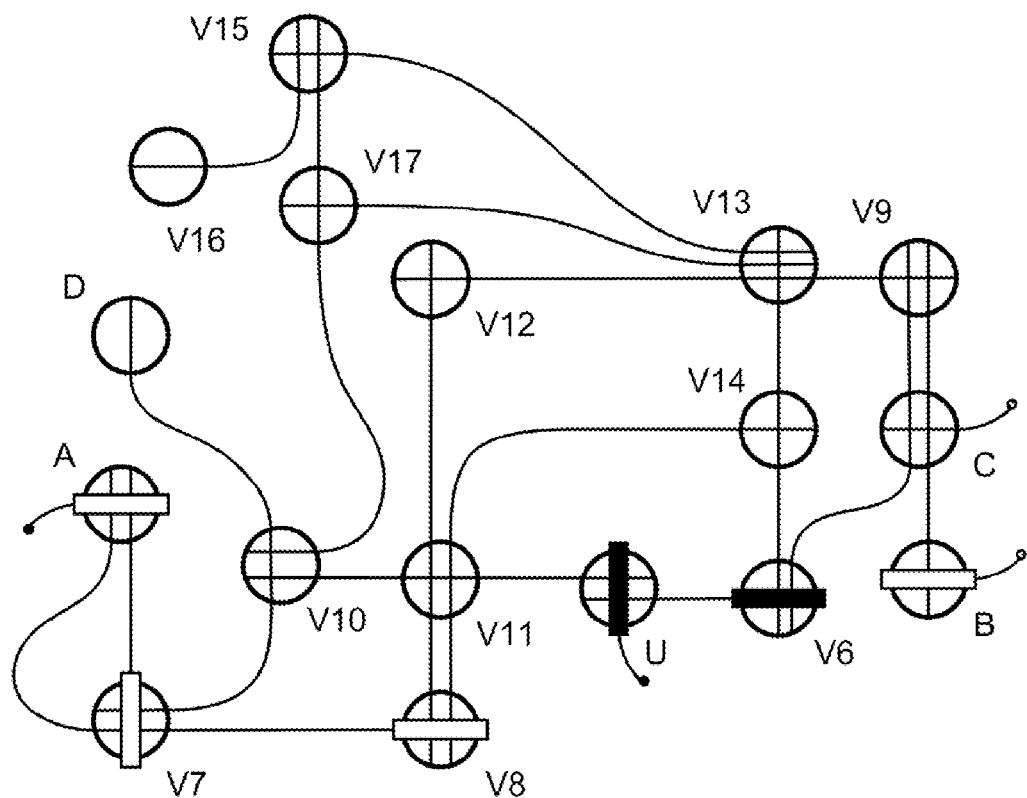

FIG. 15 shows the making of a third assumption which is represented as a new constraint C19 containing one term, namely [−c, C19].

Because no further assertions are forced as a result of the second assumption, the diagram is prepared for the next assumption by making the second assumption not the latest assumption. The notation for the variable B is changed to indicate that it is no longer forced by the latest assumption. The drawing also shows the making of the third assumption which represents −c.

Figure 16:
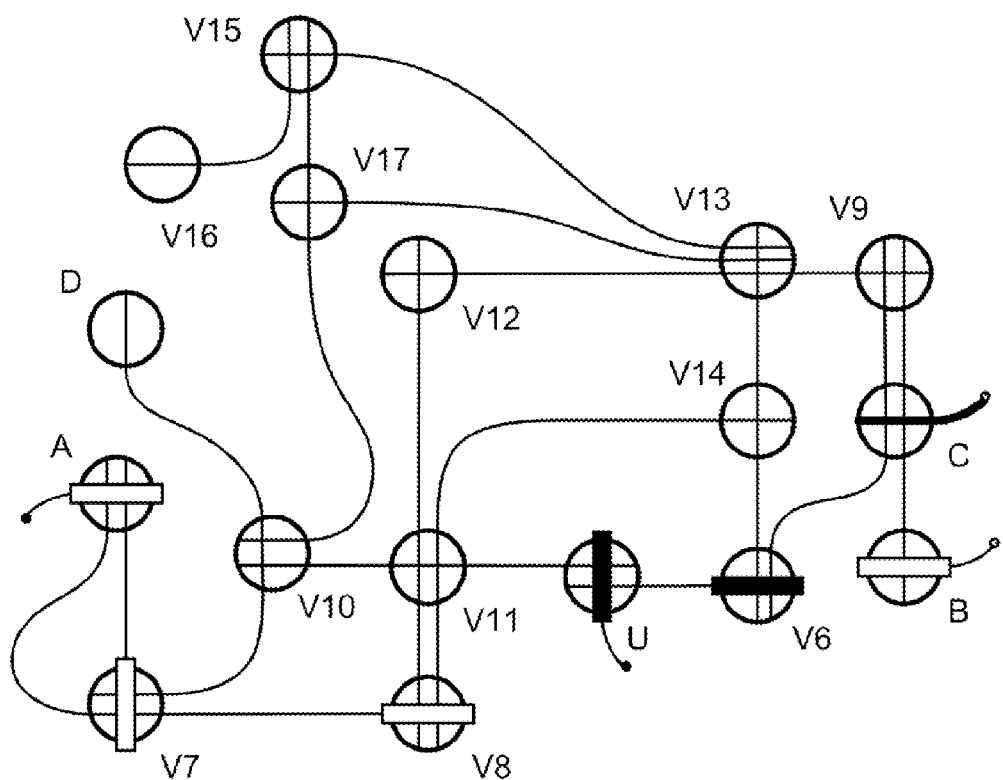

FIG. 16 shows the constraint representing the latest assumption asserting its only term. As always, an assumption has an empty reason and a cause containing its only term, namely [−c, C19] in this case. FIG. 16 also shows the assumption regarding the variable C as the latest assumption. C19 becomes enqueued.

Figure 17:
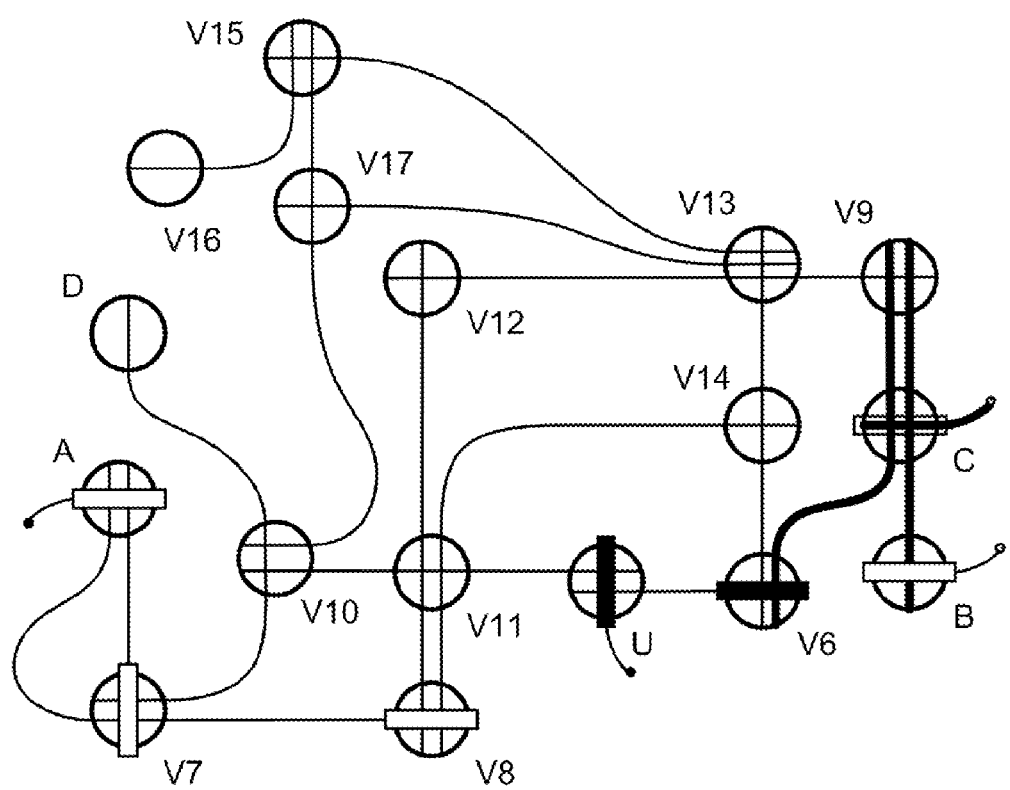

FIG. 17 shows that the assumption −c made in FIG. 15 has become determined and negates terms of two other constraints C2 and C5. Both constraints are forced to assert terms, and the two asserted terms represent the same value −v9.

The two terms negated in C2 are [+c, C2] and [+v6, C2]. The term [+v6, C2] is negated by the assertion of [−v6, C1] which we know is an unconditional assertion because it has an empty cause. [+c, C2] is negated by the assertion of [−c, C19] which we know is an assertion of the latest assumption because it has the term of the latest assumption in its cause, and it happens that it has no other terms in its cause. The cause of C2 is the union of these two causes which is only one term, namely [−c, C19]. The reason of an implicated assertion, as opposed to the assertion of an assumption, must be the prevailing assertions forced by the latest assumption that negate terms in the constraint in question plus the reasons associated with those negating assertions. In this case, the only negating assertion forced by the latest assumption is [−c, C19], and the reason of the constraint that asserts this term is empty. So the reason of C2 is [−c, C19]. C2 becomes enqueued.

The two terms negated in C5 are [+c, C5] and [+b, C5]. [+b, C5] is negated by the assertion of [−b, C18] which we know is not an assertion forced by the latest assumption because C18 does not have the term asserted by the latest assumption in its cause. Instead, the cause of C18 is [−b, C18]. The term [+c, C5] is negated by [−c, C19] which we know is an assertion forced by the latest assumption because C19 does have the term asserted by the latest assumption in its cause. The cause of C5 is the union of the causes of C18 and C19, namely {[−b, C18], [−c, C19]}. Because C19 is an assertion forced by the latest assumption, its contribution to the reason of C5 is its assertion, namely [−c, C19], plus its reason, which is empty. Because C18 is not an assertion forced by the latest assumption, it does not contribute to the reason of C5. So the reason of C5 contains only [−c, C19]. C5 becomes enqueued.

As always, the common reason of the constraint of an assumption contains its only term. So the common reason of C19 is [−c, C19].

Figure 18:
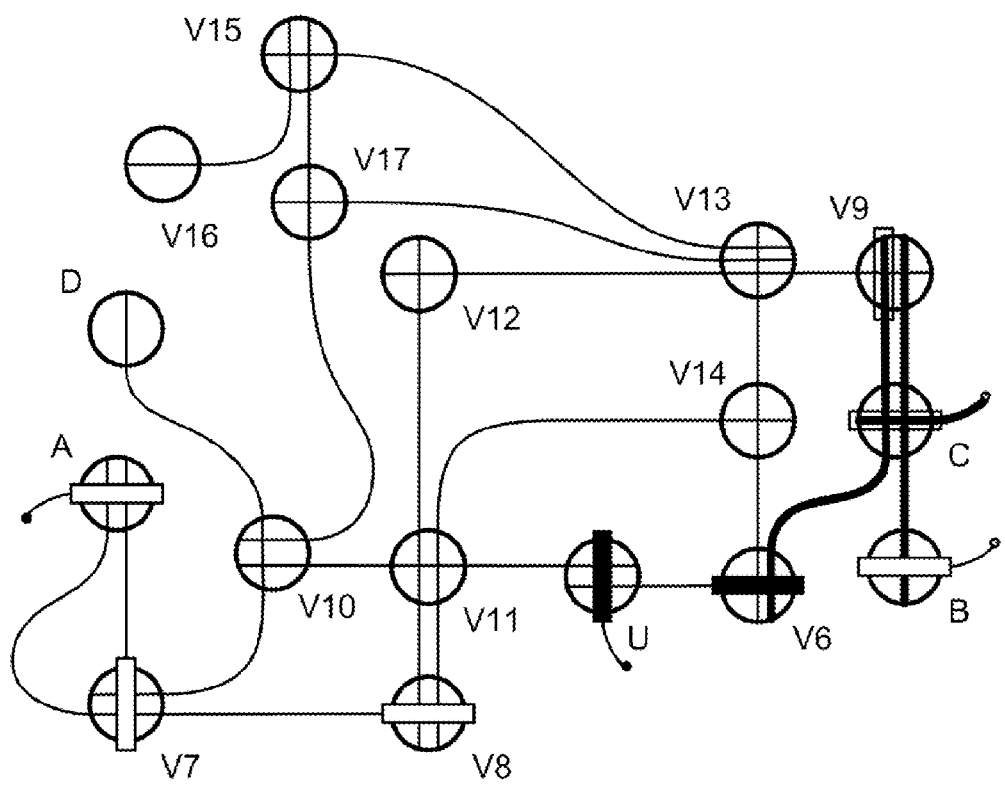

FIG. 18 shows the assertions implicated by the third assumption (−c) becoming determined, and one of them becoming prevailing.

This time there is more than one enqueued assertion. However, both constraints assert terms that represent the same value (−v9); so no decision needs to be made regarding which value should be determined first. Both of the constraints that assert this value become determined rather than enqueued. Neither asserting constraint has a reason that contains a term that represents a value of the same variable that the constraint asserts; consequently, it is known that neither assertion represents a loop in the prevailing path between the latest assumption and the asserted value. If an assertion represents a loop in the prevailing path, it cannot become prevailing; but because both assertions are valid candidates for becoming prevailing assertions, in order to decide which becomes prevailing, it is necessary to determine which constraint has the lesser cause.

In order to compare the causes of C2 and C5, they are converted into numbers. The number treats each existing assumption as a digit in a trinary number. Existence of a specific assumption in a cause places either a one (1) in that digit, if the value is a kiss ('X'), or a two (2) if the value is a hug ('o'), and non-existence of that assumptive term in that cause places a zero (0) in that digit. The digits are ordered according to the order of the variables which is the same as the order of the assumptions in this example. The first assumption corresponding to the "ones" digit (i*3^0), the second assumption corresponding to the "threes" digit (j*3^1), and the third assumption corresponding to the "nines" digit (k*3^2), and so forth. In this case, the cause of C2 is {[−c, C19]} and the cause number for C2 is 100. The cause of C5 is {[−c, C19], [−b, C18]}, and the cause number of C5 is 110. Therefore, C2 has the lesser cause and it becomes determined and prevailing while C5 becomes determined but non-prevailing.

The common reason of C2 is the set {[−c, C19], [−v9, C2]}. The assertion of C2 negates one term [+v9, C10], but no further assertions are forced by the third assumption (−c).

Figure 19:
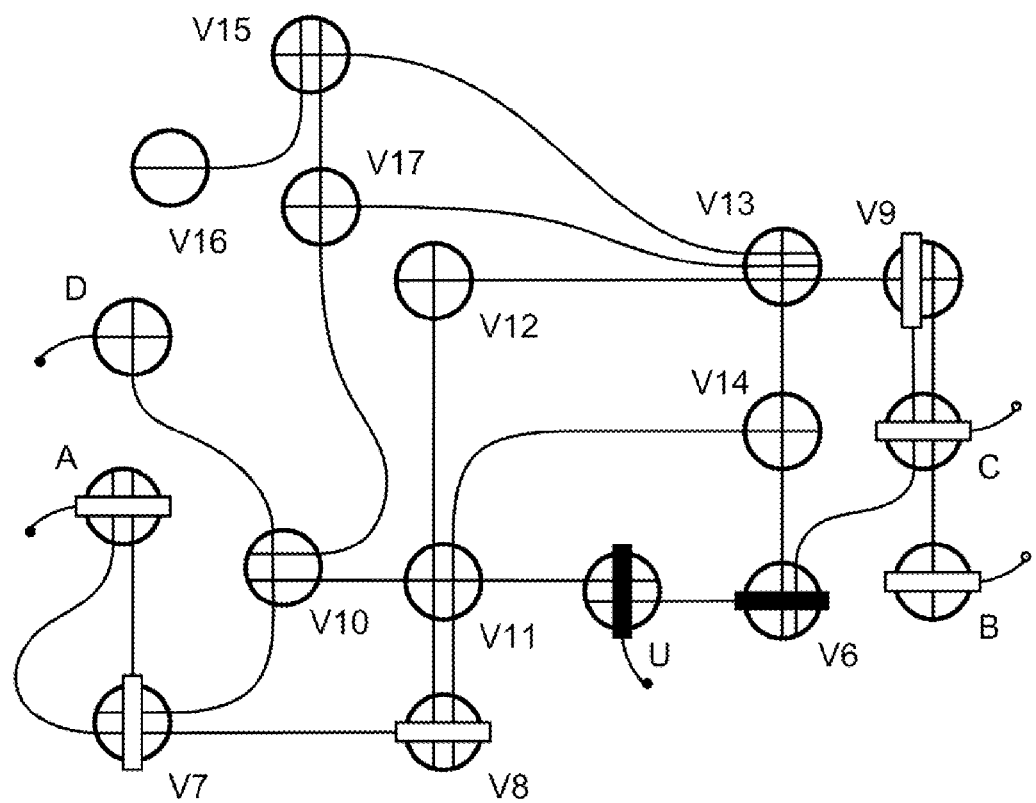

FIG. 19 shows the making of a fourth assumption which is represented as a new constraint C20 containing one term, namely [−d, C20].

Because no further assertions are forced as a result of the third assumption, the drawing is prepared for the next assumption by changing the notation to indicate that the third assumption is no longer the latest assumption. Then, the fourth assumption is made which represents −d.

Figure 20:
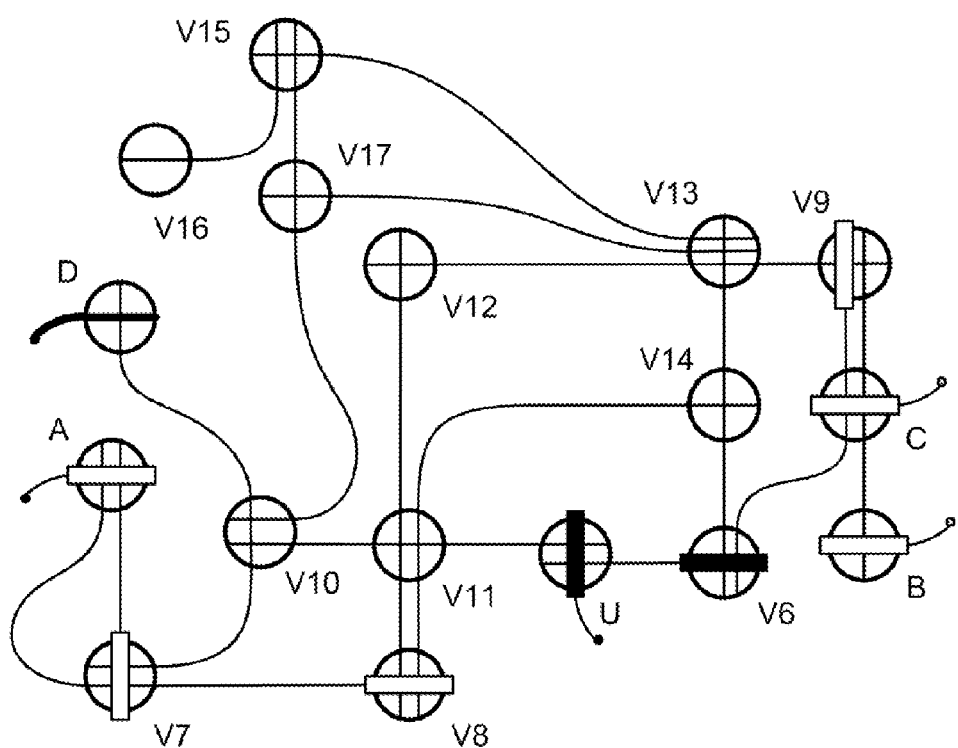

FIG. 20 shows the constraint of the fourth assumption asserting its only term. As always, an assumption has an empty reason and a cause containing its only term, namely [−d, C20] in this case. FIG. 20 also shows the assumption regarding the variable D as the latest assumption. C20 becomes enqueued after −d is determined.

Figure 21:
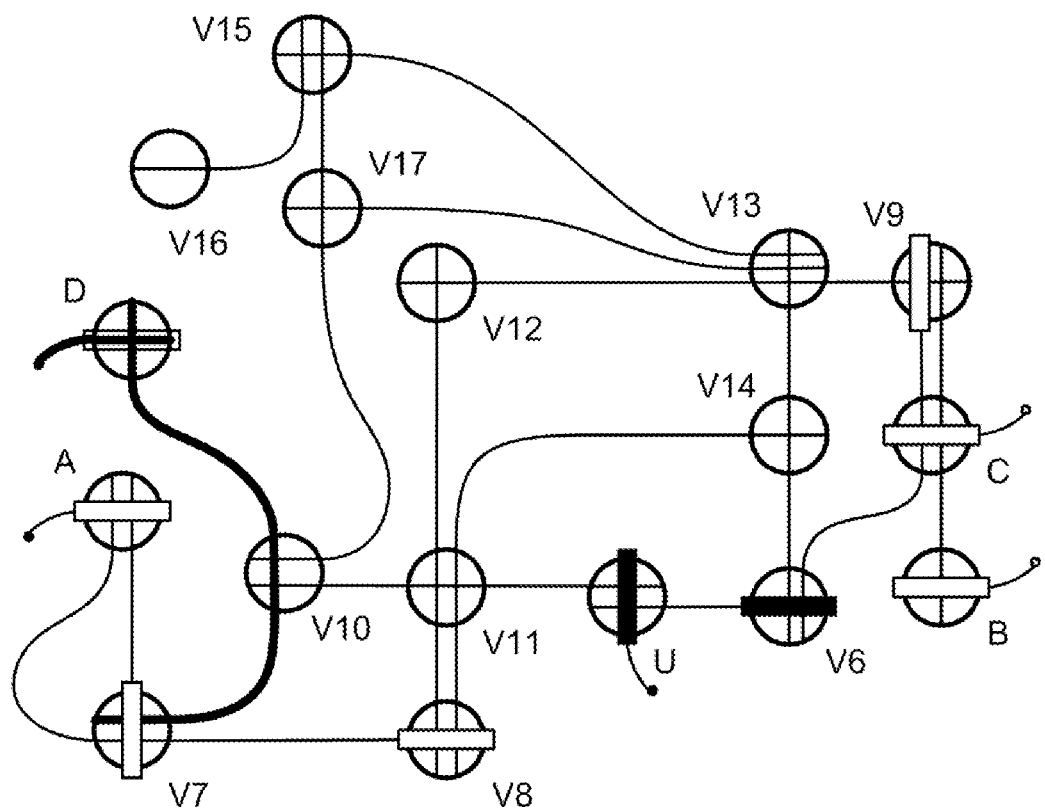

FIG. 21 shows that the fourth assumption determines the value of D and negates one term which represents the value +d. The notation in FIG. 20 shows that the value of D is determined as −d. D is a variable in constraint C6. As always, the common reason of the constraint of an assumption contains its only term. So the common reason of C20 is [−d, C20].

The notation in FIG. 21 also shows that the negation of the term in C6 forces C6 to assert a term that represents −v10, and that this assertion is forced by the latest assumption. The cause of C6 becomes {[−a, C17], [−d, C20]}, which is the union of the causes of the prevailing assertions that negate [+v7, C6] and [+d, C6]. The reason of C6 becomes {[−d, C20]}, which is the union of the latest assumption's assertion and its reason, and which does not contain any contribution from the assertion that negates [+v7, C6] because that assertion is forced by a previous assumption and not by the latest assumption. C6 becomes enqueued.

Figure 22:
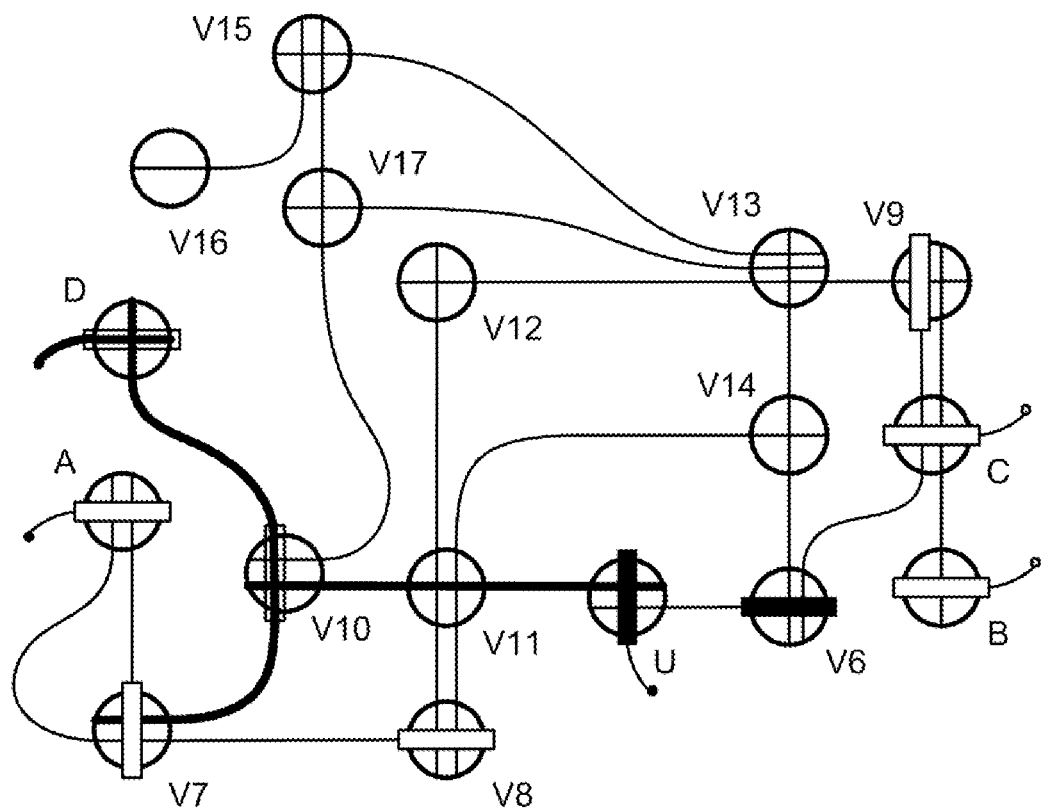

FIG. 22 shows that the determination of −v10 negates one term in C7. The negation of the term in C7 forces it to assert a term that represents −v11.

A common reason is the intersection of the common reasons of all prevailing assertions forced by the latest assumption that negate terms of the prevailing constraint in question plus the asserted term of the constraint in question. The terms of C6 which are negated are [+d, C6] and [+v7, C6]. The term [+v7, C6] is negated by the assertion of [−v7, C3], which we know is not an assertion forced by the latest assumption because its cause does not contain the term of the latest assumption. [+d, C6] is negated by the assumption and therefore the common reason of C6 is {[−d, C20], [−v10, C6]}.

The terms of C7 that are negated are [+u, C7] and [+v10, C7]. The term [+u, C7] is negated by the assertion of C12 which is an unconditional assertion. [+v10, C7] is negated by the assertion of C6 which is an assertion forced by the latest assumption. Consequently, the cause of C7 is the same as the cause of C6, namely {[−a, C17], [−d, C20]}, and the reason of C7 is {[−v10, C6], [−d, C20]}, which is the reason of C6 plus the assertion of C6.

Figure 23:
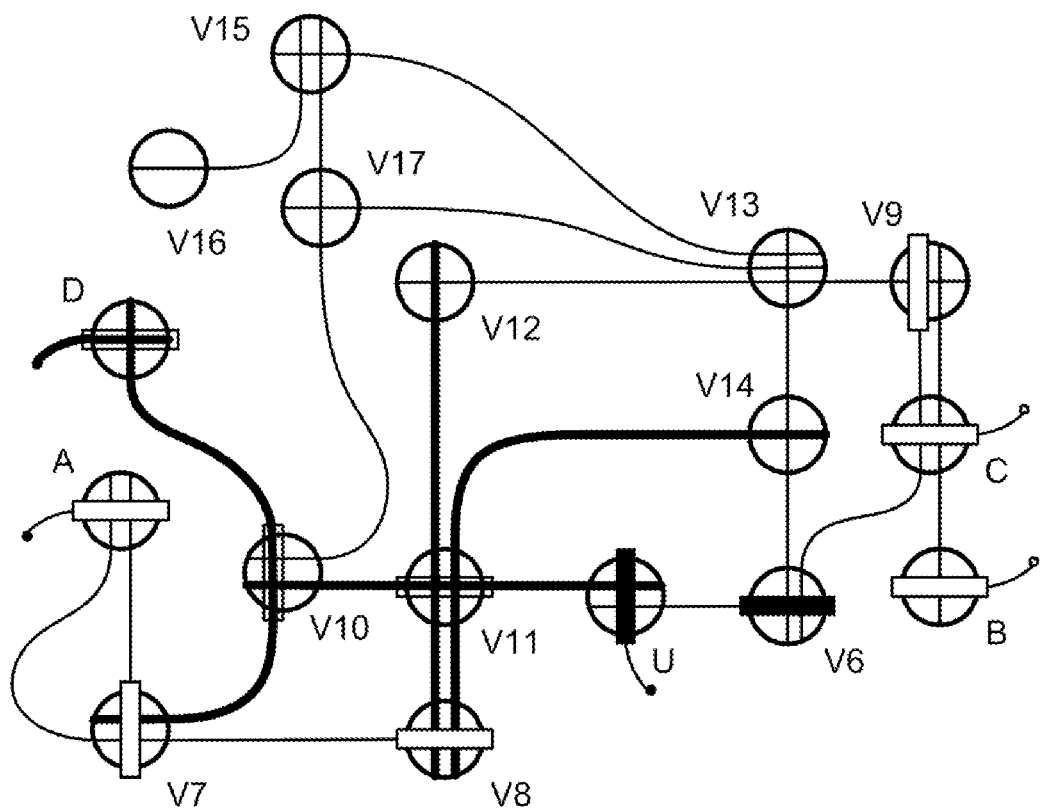

FIG. 23 shows the value of V11 becoming determined as −v11. This determination negates two terms in C8 and C9. C8 is forced to assert [−v12, C8], and C9 is forced to assert [−v14, C9]. Both of these constraints become enqueued after −v11 becomes determined.

The prevailing assertions that negate the terms of C8 are the same prevailing assertions that negate the terms of C9. Consequently, both have the same cause and same reason. Each cause is {[−a, C17], [−d, C20]}. Each reason is {[−v11, C7], [−v10, C6], [−d, C20]}, which is the reason of C7 plus the assertion of C7.

Figure 24:
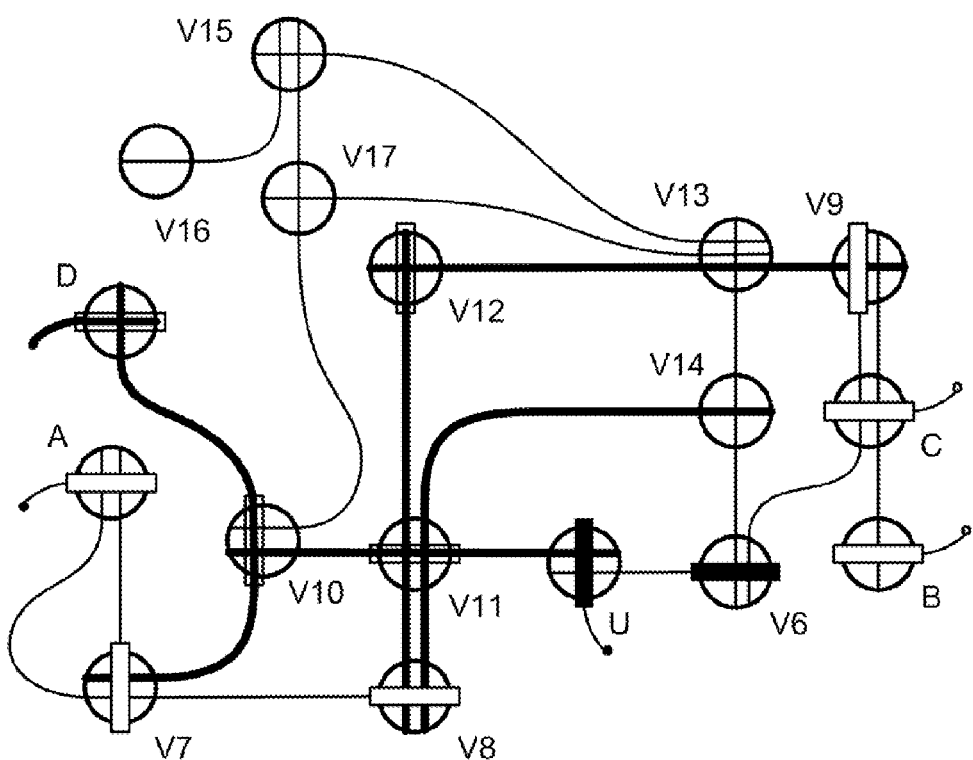

FIG. 24 shows the value of V12 becoming determined as −v12 before the value of V14 becomes determined. This determination negates one term in C10, and C10 is forced to assert [+v13, C10]. C10 becomes enqueued after −v12 is determined.

Before we can make some variable value determined, we must choose which value to determine. When more than one enqueued assertion exists and some of the asserting constraints assert terms for different values, it becomes necessary to decide which value will be determined first. In order to make that decision, first we compare the causes of the enqueued constraints in order to identify the constraints with the least cause. In this case, both constraints have the same cause; so the number generated would be the same and they would both be considered to be least causes. When the causes are the same, we compare reasons in a very similar way. However, in this case both the reasons are the same as well. If the cause and reason are the same, then we have little need to care which value we determine first, but it is still necessary to make a choice. In this example we make the final disambiguation by comparing the variables represented by the assertions. In this case, the assertion of −v12 is less than the assertion of −v14. There are no other constraints that assert −v12, so C8 determines the value of V12. The notation of FIG. 24 shows −v12 as determined while V14 is still not shown as determined.

The only term in C8 that is negated by an assertion forced by the latest assumption is [+v11, C8] which is negated by the assertion of C7. Consequently, the common reason of C8 becomes the same as the common reason of C7 plus the assertion of C8, resulting in the set {[−v12, C8], [−v11, C7], [−v10, C6], [−d, C20]}.

The negated terms of C10 are [+v12, C10] and [+v9, C10] which are negated by the assertions of C8 and C2. C2 is not an assertion forced by the latest assumption, and its cause contains only [−c, C19]. Consequently, the cause of C10 becomes {[−a, C17], [−d, C20], [−c, C19]}, and the reason of C10 becomes {[−v12, C8], [−v11, C7], [−v10, C6], [−d, C20]}, which is the reason of C8 plus the assertion of C8.

Figure 25:
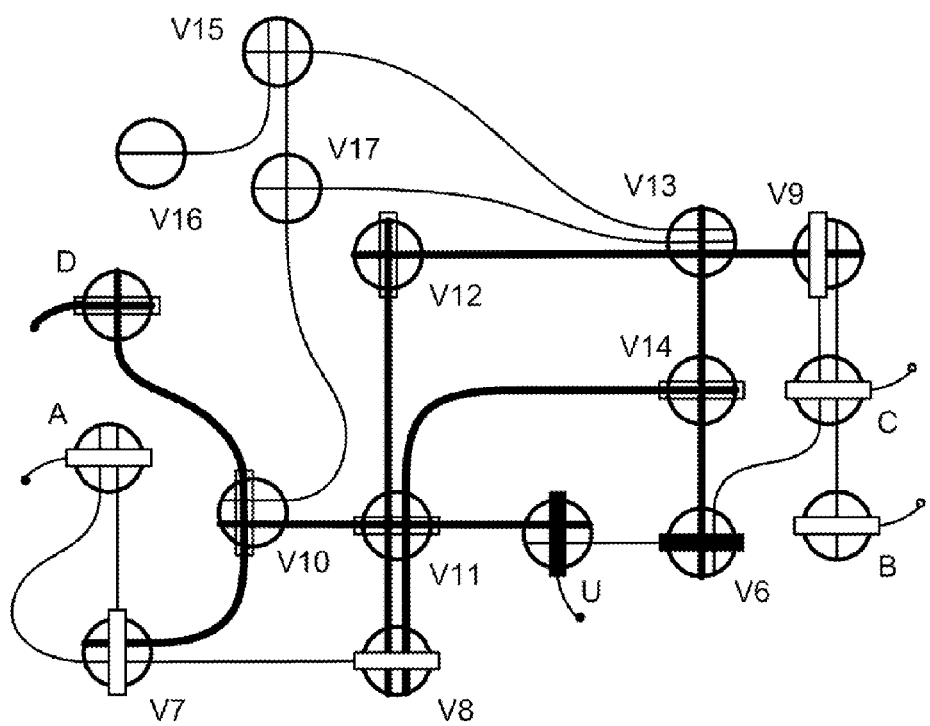

FIG. 25 shows that V14 becomes determined by C9 as −v14 before V13 becomes determined. This determination negates one term in C11, and C11 is forced to assert [−v13, C11]. C11 becomes enqueued after −v14 becomes determined.

Again, prior to the determination, we have more than one enqueued assertion, and they assert terms with different values. We must decide which value will be determined first. To do that, we must first compare the causes of the enqueued constraints. C10 is enqueued, and its cause is {[−a, C17], [−d, C20], [−c, C19]}. C9 is also enqueued, and its cause is {[−a, C17], [−d, C20]}, and no other constraints are enqueued. The cause of C9 is obviously lesser; so −v14, which is the value represented by the assertion of C9 is determined before +v13, which is the variable represented by the assertion of C10.

There are no other enqueued constraints that assert terms that represent −v14; so C9 becomes determined and prevailing. The common reason of C9 becomes the same as the common reason of C7 plus the assertion of C9, resulting in the set {[−v14, C9], [−v11, C7], [−v10, C6], [−d, C20]}.

The cause of C11 becomes the same as the cause for C9 because [+v6, C11], the negated term of C11 that is not negated by C9, is negated by an unconditional assertion, namely [−v6, C1], and unconditional assertions do not contribute terms to causes or reasons. So the cause of C11 becomes {[−a, C17], [−d, C20]}, and the reason of C11 becomes {[−v14, C9], [−v11, C7], [−v10, C6], [−d, C20]}, which is the reason of C9 plus the assertion of C9.

Figure 26:
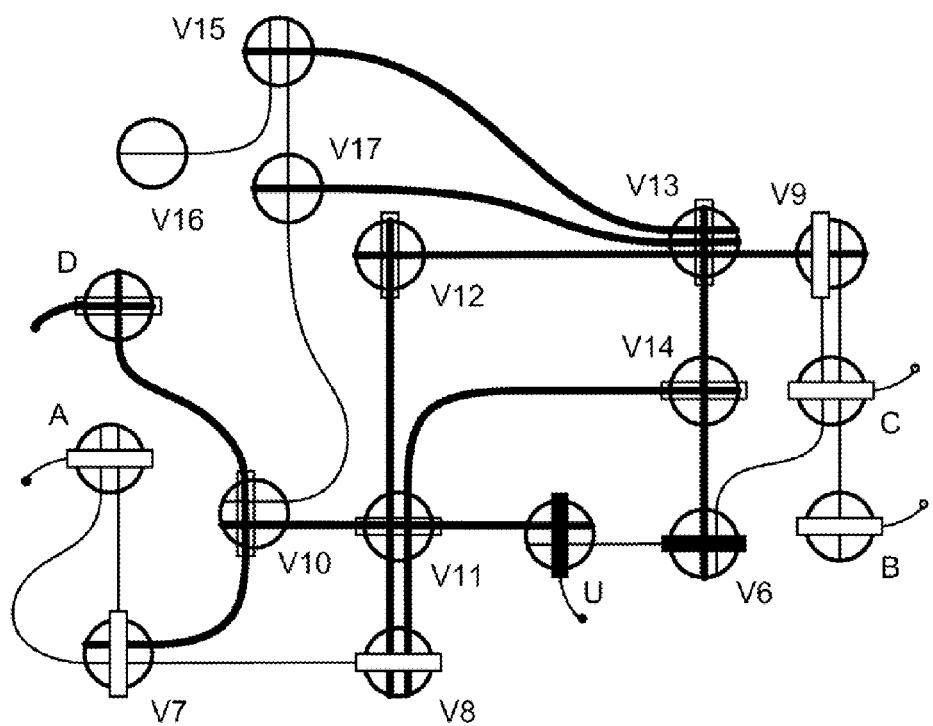

FIG. 26 shows that V13 becomes determined by C11 as −v13 before it becomes determined by C10 as +v13. This determination negates terms in C13 and C15, but it does not negate the term in C10 because that constraint is already asserting a term. C13 is forced to assert [−v15, C13], and C15 is forced to assert [−v17, C15]. C11 and C13 both become enqueued after −v13 is determined.

Again, prior to the determination, we have more than one enqueued assertion, and they assert terms with different values. This time the values of the asserted terms disagree with one another, but that is not important. Because the cause of C11 is the same as the cause of C9, C11 has a lesser cause than C10 and therefore is implicated before C10.

There are no other enqueued constraints that assert terms that represent −v13; so C11 becomes determined and prevailing. The common reason of C11 becomes the same as the common reason of C9 plus the assertion of C11, resulting in the set {[−v13, C11], [−v14, C9], [−v11, C7], [−v10, C6], [−d, C20]}.

The causes of C13 and C15 both become the same as the cause for C11 because there are no terms of C13 or C15 that are negated by a term other than the assertion of C11. So the causes of C13 and C15 are both {[−a, C17], [−d, C20]}; and the reasons of both are also the same, each reason becoming {[−v13, C11], [−v14, C9], [−v11, C7], [−v10, C6], [−d, C20]}, which is the reason of C11 plus the assertion of C11.

Figure 27:
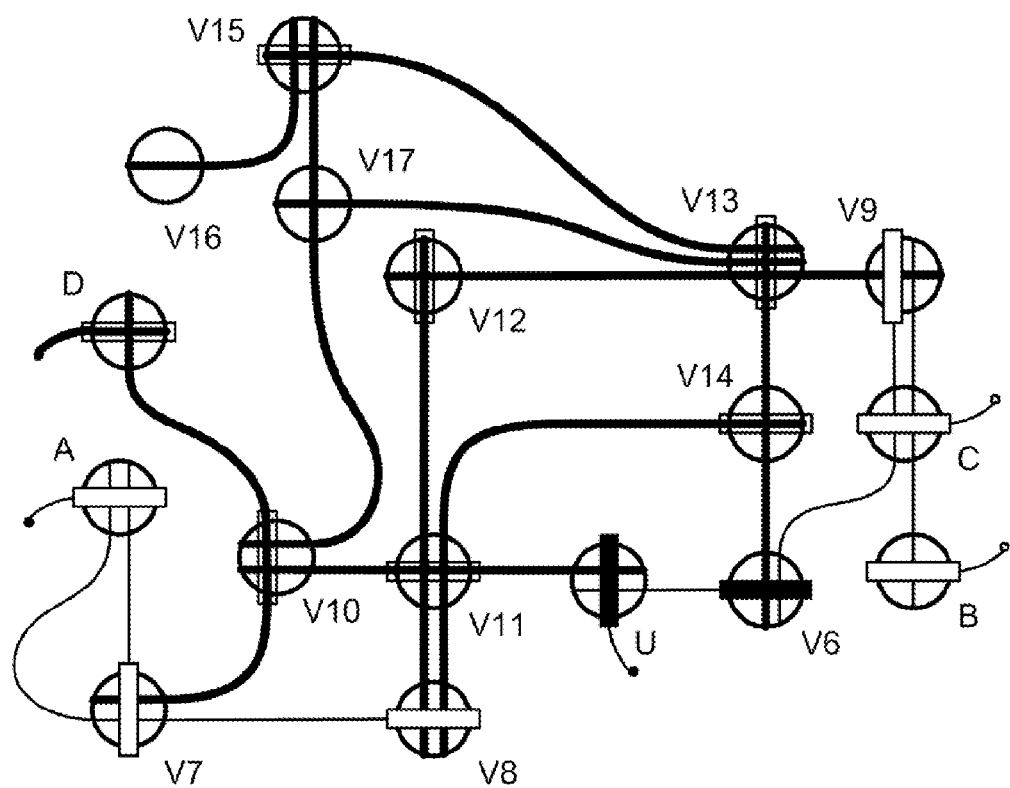

FIG. 27 shows that V15 becomes determined by C13 as −v15 before V13 is over-determined by C10 or V17 is determined by C15. This determination negates terms in C14 and C16. C14 is forced to assert [−v16, C14], and C16 is forced to assert [+v17, C16]. Both C14 and C16 become enqueued after −v15 becomes determined.

Prior to the determination, we have more than one enqueued assertion, and they assert terms representing different values. Because the causes of C13 and C15 are the same as the cause of C11, which is the same as the cause of C9, both C13 and C15 have causes which are lesser than the cause of C10. Because the only negated term in C13 and C15 are negated by the same determined variable value, their reasons are also the same. So again we have little reason to care which is determined first, but a decision must be made. C13 asserts a term that represents a lesser variable than C15; so the variable represented by the assertion of C13, namely −v15, is determined first.

There are no other enqueued constraints that assert terms that represent −v15; so C13 becomes determined and prevailing. The common reason of C13 becomes the same as the common reason of C11 plus the assertion of C13, resulting in the set {[−v15, C13], [−v13, C11], [−v14, C9], [−v11, C7], [−v10, C6], [−d, C20]}.

The cause of C14 becomes the same as the cause of C13 because there are no terms of C14 that are negated by a term other than the assertion of C13. So the cause of C14 is {[−a, C17], [−d, C20]}. The reason of C14 becomes {[−v15, C13], [−v13, C11], [−v14, C9], [−v11, C7], [−v10, C6], [−d, C20]}, which is the reason of C13 plus the assertion of C13.

The cause of C16 is the union of the cause of C13 and the cause of C6, because the negated terms of C16 are negated by the determined values asserted by these two prevailing constraints. The cause of C13 is {[−a, C17], [−d, C20]}, and the cause of C6 is also {[−a, C17], [−d, C20]}. Consequently, the cause of C16 also becomes {[−a, C17], [−d, C20]}. The reason of C16 becomes {[−v15, C13], [−v13, C11], [−v14, C9], [−v11, C7], [−v10, C6], [−d, C20]}, which is the union of the reasons of C13 and C6 plus their assertions.

Figure 28:
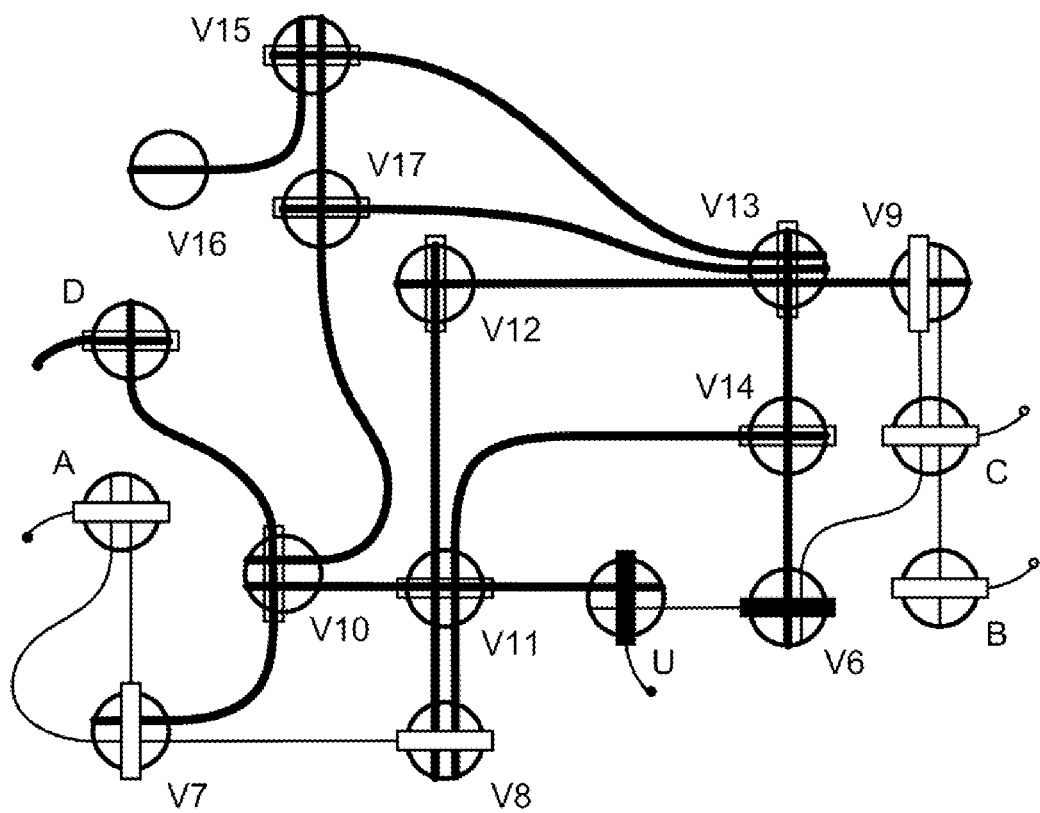

FIG. 28 shows that V17 becomes determined by C15 as −v17 before V13 is over-determined by C10, or V16 is determined by C14, or V17 is determined by C16 as +v17. No terms are negated by this determination because the only term that disagrees with −v17 is in a constraint that is already asserting a term.

Prior to the determination, we have more than one enqueued assertion, and they assert terms representing different values. Because the causes of C14, C15 and C16 are all the same as the cause of C9, both C14 and C15 have causes which are lesser than the cause of C10. The reason of C15 is the same as the reason of C13, and the reasons of C14 and C16 are both the reason of C13 plus the assertion of C13. So the reason of C15 is the lesser of all three enqueued constraints with the least cause, and the combination of cause and reason of C15 is lesser than the combination of cause and reason for all enqueued constraints prior to the determination. Consequently, C15 becomes determined next.

The only term of C15 that is negated by a prevailing assertion forced by the latest assumption is negated by the assertion of C11. Consequently, the common reason of C15 becomes the same as the common reason of C11 plus the assertion of C15, resulting in the set {[−v17, C15], [−v13, C11], [−v14, C9], [−v11, C7], [−v10, C6], [−d, C20]}.

Figure 29:
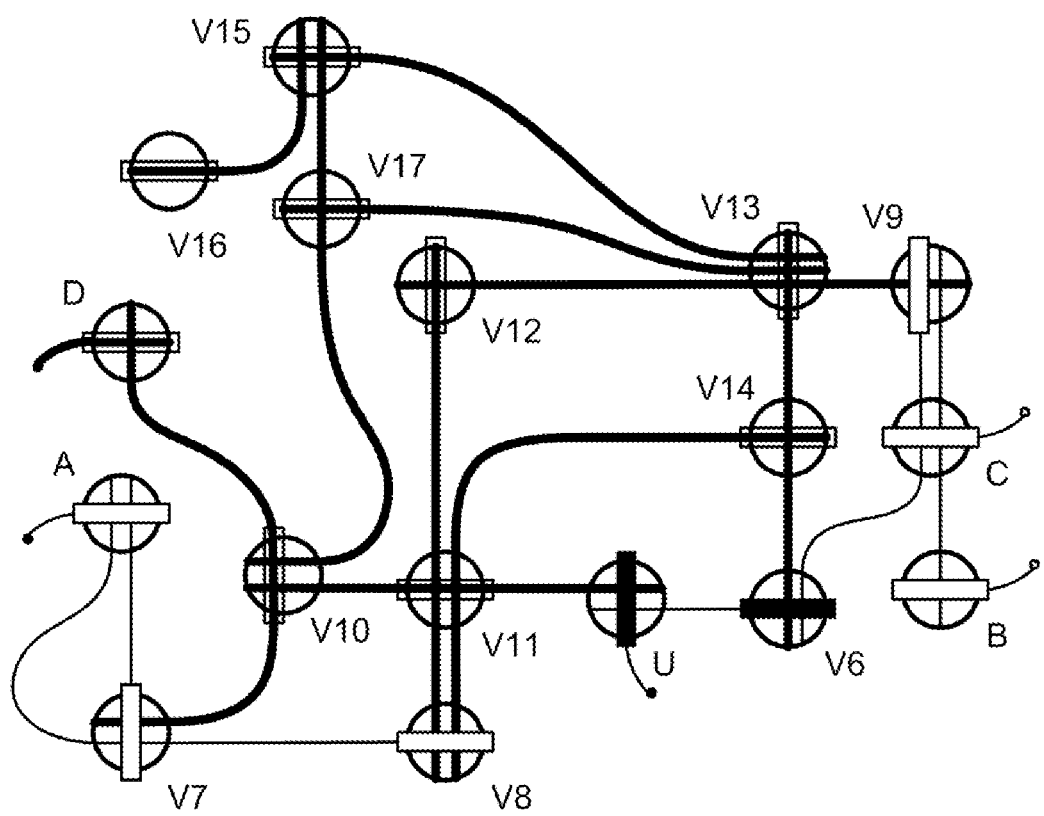

FIG. 29 shows that V16 becomes determined by C14 as −v16 before V13 becomes over-determined by C10 or V17 becomes over-determined by C16. No terms disagree with −v16; so no terms are negated and no constraints are forced to assert terms because of the determination of V16.

Prior to the determination, we have more than one enqueued assertion, and they assert terms representing different values. C14 and C16 have causes which are the same and which are lesser than the cause of C10. The reasons of C14 and C16 are also the same; so we make a decision about which constraint is to be determined next based on the variable represented by their assertions. V16 is lesser than V17; so C14 is next to become determined.

The only term of C14 that is negated by a prevailing assertion forced by the latest assumption is negated by the assertion of C13. Consequently, the common reason of C14 becomes the same as the common reason of C13 plus the assertion of C14, resulting in the set {[−v16, C14], [−v15, C13], [−v13, C11], [−v14, C9], [−v11, C7], [−v10, C6], [−d, C20]}.

Figure 30:
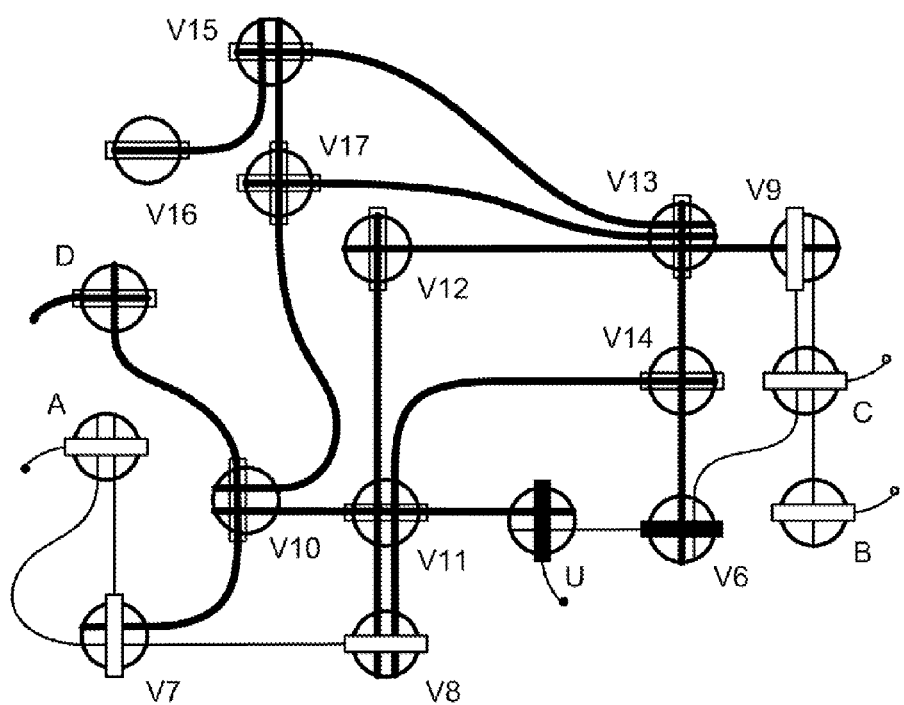

FIG. 30 shows that V17 becomes over-determined by C16 before V13 becomes over-determined by C10. This occurs because the cause of C16 is lesser than the cause of C10. C16 asserts [+v17, C16]. The terms of C16 that are negated by prevailing assertions forced by the latest assumption are negated by the assertions of C6 and C13. The common reason of C6 is {[−v10, C6], [−d, C20]}. The common reason of C13 is {[−v15, C13], [−v13, C11], [−v14, C9], [−v11, C7], [−v10, C6], [−d, C20]}. The common reason of C16 becomes the intersection of the common reasons of C6 and C13 plus the assertion of C16, which is the set {[+v17, C16], [−v10, C6], [−d, C20]}. A contradiction becomes apparent in the over-determination of V17. The union of the causes of the two contradicted prevailing assertions is not empty, and therefore the contradiction is dependent on some assumptions. Consequently, this contradiction is conditional.

Up to this point in the example, only activities that are part of the process of implication have been described. Implication is the iteration of the processes of assuming values and asserting terms and includes the processes which determine the prevailing assertions and maintain the causes, reasons, and common reasons associated with the constraints. After this point we consider activities that are part of the process of precipitating an inference. Prior to this point we have only maintained the common reason, and now we will use it to make decisions.

Note that an inference is the formal name of the data structure that records negation of the terms of a constraint and associates causes, reasons, and common reasons with the constraint. For the purposes of this example, we have referred to what are formally inferences as constraints because, until the first inference is precipitated, all inferences represent either original constraints or assumptions.

FIGS. 31 and FIG. 32 show the stages of precipitating an inference for solving the problem shown in FIG. 1 and FIG. 2, according to aspects of the present invention.

FIG. 31 shows the teardrop for the identified contradiction. The two contradicted assertions are [+v17, C16] and [−v17, C15]. The first common reason is the common reason of C16 that is {[+v17, C16], [−v10, C6], [−d, C20]}. The second common reason is the common reason of C15 that is {[−v17, C15], [−v13, C11], [−v14, C9], [−v11, C7], [−v10, C6], and [−d, C20]}. So the intersection of the common reasons of the assertions that represent V17 contains, from the most recent to the earliest, [−v10, C6] and [−d, C20]. The intersection of two sets gives us the set of members which are common to both sets. Note that for constructing the common reason of an assertion, the list goes back to the last assumption that had to be made in order for the series of ensuing assertions to lead to the assertion in question. Thus, both these lists go back to the assumption of −d.

The common member of the two common reasons which has the greatest determinant number is always the assertion that is common to both sets, and which has most recently been forced, namely [−v10, C6] in this case. Having a larger determinant number means having been determined more recently or having occurred more recently. The value which is complementary to the value of that term is +v10, and this complementary value, +v10, is identified as the precipitant value for the contradiction. Once the precipitant value is identified, all conditional assertions with determinant numbers less than or equal to the determinant number of [−v10, C6], which is the prevailing assertion which disagrees with the precipitant value, are treated as determinants of previous assumptions. Constraint C6 became determined in FIG. 22 where all of its variables became determined. The constraints that became determined before C6 are the constraints C12, C1, C3, C4, C2, and C5 which are listed in the order that they became determined. The constraints that became determined after C6 are the remaining constraints: C7 through C11 and C13 through C16. The prevailing assertion which disagrees with the precipitant value, and is determined to be [−v10, C6] for the preceding example, may be referred to as the precipitant assertion.

The determined values of D and V10 are shown in FIG. 31 by opaque thick white bars across the circles representing these variables. This notation for variables D and V10 is purely an additional means of illustrating that the constraints that assert the determined values of these variables are not part of the teardrop—it is not meant to indicate that these constraints are actually considered to be forced by an assumption other than the latest assumption.

FIG. 31 also shows constraints that are not part of the teardrop. Constraints not part of the teardrop include: the prevailing constraints with determinant numbers less than or equal to the determinant number of the precipitant assertion, namely C1, C2, C3, C4, C5, C6, C17, C18, C19, and C20; non-determined constraints (of which there are none in FIG. 30 or 31); non-prevailing constraints, namely C2; constraints asserting unconditionally, namely C1 and C12; and those conditional prevailing constraints which have determinant numbers greater than the determinant number of the prevailing assertion that disagrees with the precipitant value, but the assertions of which are not in the reasons of the constraints of the contradicted assertions, namely C8, C10, and C14. The disinclusion of these constraints is indicated by representing them with thin lines in FIG. 31 while the value determinations resulting from their assertions continue to be represented as they were.

This leaves constraints C7, C9, C11, C13, C15, and C16 as the constraints that contain the "body" of the teardrop which is discussed below. The term "teardrop" indicates parameterization of the contradiction.

FIG. 32 shows the inference precipitated from the body of the teardrop as new constraint C21 which contains terms representing values +v10 and +v8. These are the values in the precipitated inference because the set of values in any precipitated inference is the precipitant value plus the set of values of terms in the body constraints which are negated by prevailing assertions that are forced by assumptions other than the latest assumption. The entire set of values in constraints C7, C9, C11, C13, C15, and C16 is {+u, +v6, +v8, +v10, +v11, −v1, +v13, −v13, +v14, −v14, +v15, −v15, +v17, −v17}. The non-negated values are −v11, −v13, −v14, −v15, and −v17. The values negated by prevailing assertions that are forced by the latest assumption are +v10, +v11, +v13, +v14, +v15, +v17, −v17. The values negated by unconditional assertions are +u and +v6. This leaves +v8 as the sole value negated by a prevailing assertion forced by an assumption other than the latest assumption. Adding the precipitant value, +v10, to the set of values negated by a prevailing assertion forced by an assumption other than the latest assumption, +v8, produces {+v8, +v10}, the set of values which is the body of the teardrop. Formally, this set of values is called the "body" of the teardrop until the values are instantiated as actual terms. The two variables V8 and V10 form a new constraint called C21=(+v8 OR +v10).

FIG. 32 also shows all the assumptions deleted (C17, C18, C19, and C20). All the other constraints which conditionally asserted terms (C2 through C11, and C12 through C16) are shown as non-asserting, leaving only the unconditional assertions [−u, C12] and [−v6, C1] still determining the values they represent. C21 is new and is shown as non-asserting. This would be the condition of the expression after precipitation of the inference representing the identified contradiction; because in this example, the process of precipitation calls the process of de-asserting for every assumption, and the process of de-asserting deletes assumptions and also removes any assertions forced by the input assertion.

The importance of the precipitated inference is that it represents a proximal parameterization of the teardrop as if it were a constraint C21.

The precipitated inference is a representation of the teardrop, and the contradiction represented by the teardrop, because, if all the values of the precipitated inference were negated, then a contradiction would have to exist, and at least one of the constraints in the teardrop would have to assert one of the contradicted values. This would have to be the case regardless of the order in which values were negated or the order in which the constraints became asserting, determined, or prevailing.

The representation is a parameterization because it does not reproduce all the constraints that form the teardrop. Instead, the constraints that form the teardrop, as shown in FIG. 31, are condensed to just this specific set of variable values shown as the new constraint C21 in FIG. 32.

The parameterization is proximal because it is based on proximity of the assertions. If we view each assertion as determining a value which in turn negates terms and forces further assertions, then a particular assertion can be viewed as a step in a path of many assertions. In a sequential path we could say that each step is next to the step before it and the step after it. However, these are not sequential paths because it may take more than one negating assertion to force another assertion, and these prerequisite assertions may occur at different points in time. Consequently, instead of saying that steps are "next" to one another, we may say they are "adjacent" to one another; and further, while "adjacency" captures the immediate juxtaposition of constraints, "proximity" captures the extended clustering of constraints that have such relationships as well as capturing the compactness that characterizes the folded-back or folded-inward shape of the teardrop path. This path-making is what is meant when we talk about "a spirit of implication between an assumption and a specific assertion."

This kind of proximity is necessarily founded on the notion of negating which is productively conveyed only between any two constraints that have exactly one controversial variable between them and any number of other variables between them of any relative quality other than controversial. This is so because when two constraints have some other number of controversial variables between them, there are no cases where one can productively negate a term in the other.

When no controversial variables exist between two constraints, then it is impossible for one to assert a term that negates a term in the other because there are no two terms that disagree in the sub-expression.

When three or more variables are controversial between two constraints, then in order for one to assert a term that disagrees with a term in the other, at least two terms in the other must agree with determined values and therefore the other constraint cannot have only one unnegated term and thus cannot assert a term. Therefore the relationship is unproductive.

When there are exactly two controversial variables between two constraints, then in order for one to assert a term that disagrees with a term in the other, one term in the other constraint must agree with a determined value. If the other constraint is to assert any term it must assert the term that agrees with this determined value; but in doing so, no new assertions could be forced because the potential further negations already occurred when that value was determined. Such a redundant assertion is not noted by the algorithm as a contribution to the cause or reason of any further assertion, and thus it is not productive.

The advantage of the precipitated inference is that it redirects the flow of implication to avoid contradictions that have previously been made apparent. Prior to the precipitation, it was possible to negate all but one of the values in the body of the teardrop without forcing an assertion of the remaining value, resulting in a contradiction. After the precipitation, this is no longer possible. After the precipitation, negation of all but one of the values in the body of the teardrop forces the assertion of the final value, ultimately resulting in the counter-assertion of one of the variables which formerly was the source of an assumption, and thus that variable is no longer free when it comes time to make an assumption. The effect of counter-asserting formerly assumptive variables depending on a subset of previously asserted values provides a persistently selective variation of assumptive values rather than a combinatorial variation, and this selectivity is manifold because of the various implying statements that are equivalent to a disjunct expression, and the fact that an implication effects all paths that flow from the position of the asserted value, and an inference that is compact provides implications that effect more paths than an inference that is so broad that it resolves to implicating only assumptions. This manifold selectivity is the primary source of the performance improvement provided by the invention.

FIG. 33, FIG. 34, and FIG. 35 show an alternate teardrop that might have been precipitated in order to demonstrate the purpose, usefulness, and necessary features of the cause, reason, common reason, and orderings.

FIG. 33 shows a contradiction that could have been identified if there was a step 10c2a5.5 that stated, "If an asserting inference has a term in its implicated phrase which disagrees with the term asserted by X, then record an indication that the variable represented by X is over-determined and halt the process of implication."

In FIG. 33, the value +v13 is represented by the assertion of constraint C10. The common reason of C10 would be the common reason of C8, which asserts a term representing −v12, plus the term asserted by C10 because [+v12, C10] is the only term of C10 that is negated by an assertion forced by the latest assumption. Consequently, the common reason of C10 would be {[+v13, C10], [−v12, C8], [−v11, C7], [−v10, C6], [−d, C20]}.

FIG. 34 shows the teardrop of the contradiction shown n FIG. 33. The two contradicted assertions are [+v13, C10] and [−v13, C11]. The common reason of C10 is {[+v13, C10], [−v12, C8], [−v11, C7], [−v10, C6], [−d, C20]}. The common reason of C11 is {[−v13, C11], [−v14, C9], [−v11, C7], [−v10, C6], [−d, C20]}. So the intersection of the common reasons associated with the contradictory assertions contains, from the most recent to the earliest, [−v11, C7], [−v10, C6], and [−d, C20]. The common member of the two common reasons which has the greatest determinant number is [−v11, C7]; so +v11 is the precipitant value in this case.

All prevailing constraints with determinant numbers less than or equal to the determinant number of the prevailing assertion that disagrees with the precipitant value are shown with thin lines in FIG. 34 in order to indicate that those constraints are not part of the teardrop. This includes constraints C1 through C7, and constraint C12. This set naturally includes all constraints that assert terms unconditionally. Constraints C13 and C15 are also shown with thin lines because their assertions are not in the reasons of C10 or C11 and therefore they are not part of the teardrop. This leaves only constraints C8 through C11 as part of the teardrop.

FIG. 34 shows the inference that is precipitated from the body of the teardrop shown in FIG. 33. The full set of values in constraints C8 through C11 is {+v6, +v8, +v9, +v11, +v12, −v12, +v13, −v13, +v14, −v14}. Of these +v6 is negated by an unconditional assertion, and the assertions which represent variables V11, V12, V13, and V14 are either not negated or negated by assertions forced by the latest assumption. So we are left with two values each of which is negated by an assertion forced by an assumption other than the latest assumption: +v8 and +v9. Adding the precipitant value gives us the body of the teardrop: {+v8, +v9, +v11}.

FIG. 35 shows the inference precipitated from the body of the teardrop shown in FIG. 34. The inference is represented as a different constraint C'21 containing terms [+v8, C'21], [+v9, C'21], and [+v11, C'21].

Note that the inference that is shown precipitated in FIG. 32 will assert a term after the assertions forced by assumption A have been propagated, while the inference shown precipitated in FIG. 35 will not assert a term until after the assertions forced by A and C have been propagated. Because both inferences are valid implicates of the expression, the main difference is that the preferred precipitated inference (from FIG. 32) would then have a cause that is a proper subset of the cause that the other inference (from FIG. 35) would have. Consequently the preferred inference allows for fewer irrelevant implications. Thus, the given set of rules which operates without step 10c2a5.5 is more selective about which teardrop gets precipitated first. This is important because precipitating inferences from all possible teardrops is a task with hyperpolynomial cost. Consequently, being selective about which teardrops to precipitate is another important contribution to the performance of the algorithm.

In this case, the difference in which teardrop is precipitated as an inference is effected by not taking the first disagreement of asserted values and instead waiting for the values to be determined. This allows the order of implication, which is primarily based on a comparison of causes, which are sets of assumptions, to guide the selection of the contradiction toward those with lesser sets of assumptions. Consequently, without a record of causes, there would be no selectivity in what teardrops were precipitated as inferences, and that entails a greater tendency toward hyperpolynomial cost of the algorithm.

The common reason is necessary for identifying the precipitant value of the teardrop.

The reasons provide a disambiguating role in the order of implication, which decides which value is determined next, and the order of priority, which decides which assertion becomes prevailing among many assertions representing the same value; but the reasons are also vital for identifying the frame of the teardrop from which the body of the teardrop is derived. Without a record of the constraints in the path to each asserted value, which the reason parameterizes, it would be possible to reconstruct the body of a teardrop by implicating from the precipitant; but if the common reason was also omitted, there would be no possible way to identify the body of the teardrop. Conversely, it is possible to identify the precipitant by back-tracking through the reasons, but the common reason provides this information much more efficiently.

The invention tracks the sources of implications and identifies proximal parameterizations of conditional contradictions and subsequently avoids those contradictory conditions.

Glossary

A glossary of some of the terms used is provided below. This glossary summarizes some of the concepts discussed above. The various terms of the glossary are explained using other terms that may be located above or below them in the list. At times a definition is provided and at times a mere explanation.

Expression=Presentation of the problem in the form of a logical statement. In one exemplary aspect, used for the ease of demonstration, an Expression is the statement of the problem in the form of a conjunction (AND) of a number of clauses/constraints, each being a disjunction (OR) of variables Vi. An Expression may include n variables V1 . . . Vn. Each constraint may include k number of variables Vi. The objective of the algorithm is to find one or more sets of values for the variables Vi that make the Expression True; or, in the alternative, to demonstrate that no set of values for the variables exists that can make the Expression True. A set of values for the variables that makes the Expression True is said to Satisfy the Expression. When no set of values for the variables exists that can make the Expression True, a necessary contradiction exists and the Expression is Unsatisfiable.

The preceding describes an Expression in conjunct-disjunct normal form. Naturally, Expressions can be represented in other forms. But every logical expression can be isomorphically transformed into an expression in conjunct-disjunct normal form in polynomial time.

For example, in the Expression: (v1 OR v3 OR Not-V2) AND (v5 OR v4 OR v1) AND (v1 OR Not-v2 OR Not-v3), there are n variables with n=5 and each constraint has k variable values with k=3.

The Truth Table of an Expression=True (T) or False (F) value of the expression obtained for all permutations for the variables. An expression containing n variables has a truth table containing $2^n$ rows.

Variable=Predicate=Shown usually as Vi, each variable is a logical variable that may take one of four states, two of which are "values": the True value, the False value, the undetermined state (sometimes called the Null value), the over-determined state. Formally "Null", which neither agrees nor disagrees with True or False, is not a value per se. A variable in the over-determined state constitutes a contradiction. In multi-valued logics, other values are also possible for a variable.

Free Variable=A Variable for which the value has not been determined by the solution algorithm.

Determined Variable=A Variable for which the value has been determined by the algorithm.

Over-Determined Variable=A Variable for which the algorithm has determined disagreeing values. The over-determination may need to be resolved before the problem is solved.

Assumptive Variable=A variable for which a value has been assumed by a user or the algorithm. In some aspects of the present invention, only the algorithm makes assumptions. However, the user can affect the algorithm's decision by selecting an ordering.

Non-Assumptive Variable=A variable for which no value has yet been assumed.

Controversial Variable=A variable corresponding to two terms is said to be a controversial variable when for one term in a constraint, there is a complementary term in another constraint of the same expression.

Atomic value of a variable="Atom" means an "indivisible thing." An atomic predicate is roughly equivalent to a single variable value. Generally, predicates can be complex, logically combining many atomic predicates.

Determinant=The determinant number for a variable is the order in which a variable was determined. For example, if the variable V3 is the 5th variable whose value is determined, then the order of determination or the determinant number of V3 is 5.

Constraint=Clause=In one exemplary aspect, a constraint is a disjunction (OR) of some of the variables. A disjunct phrase is ORed and, therefore, a disjunct phrase is satisfied when the value of at least one of its variables agrees with the determined value of the variable. Other forms of constraints may be used to form the expression. All constraints must be satisfied in order for the expression to be satisfied. Some discussions of Satisfaction use the word "clause" where the current written description uses "constraint."

Assumptive Value=Assumption=A value assumed for a variable by the algorithm for solving the problem. The order that the assumptions are made is preserved by the algorithm because the algorithm needs to know which assumption was made last, or "latest" or "most recently" and uses the concept of most recent assumptions in the solution. Assumptive values lead to implications; however, an assumptive value does not result from any implications.

Term=The value of a variable Vi in the context of a particular constraint Cj. A term of a logical variable may be True or False. A Term may be stated, for example, as [+v1, Cj] to show that the value of variable V1 is represented as True by that term. A term [+v1, Cj] is said to disagree with a term [−v1, Ck]. Further, a term resides in a constraint. So the notation used to show a term contains a reference to the constraint of the term (Cj). In the following written description, the value of a logical variable need not be specified as True or False because the operations of the method does not depend on whether anything is true or false. It is only necessary to detect or state whether terms disagree or are the same. Given two terms that do not disagree and are not exactly the same term, because they are not from the same constraint, detecting whether they do agree or instead are askew is irrelevant. In the description, terms and variable values are said to agree only as a literary convenience.

Agreement of terms=terms of the same type agree. Two true terms agree. Two false terms agree. Agreement of terms in multi-valued logics applies when the values of two terms for the same variable have a non-empty intersection.

Disagreement of terms=Complementariness of terms=Two terms of the same variable which are not of the same kind are said to be complementary terms for that variable. For example, in two-valued logic, the value True is complementary to the value False. Complementariness, however, is more complicated in multi-valued logics.

Negation of terms=A term is said to be negated when a complementary value for the term has been determined. In other words, a term in a particular constraint is negated if the determined value for the variable of the term disagrees with the value of the variable in the particular constraint associated with the term. Negation is the result of disagreement between a determined variable value and a term in a constraint, not between two terms. A term [+v1, C2] is negated if it is determined that V1 is indeed False.

Controversial terms=disagreement between two terms, regardless of any negation that may or may not be involved, makes the variable controversial.

Contradicted Term=A term is contradicted when it is asserted and a disagreeing term is also asserted.

Unconditionally Contradicted Term=When a term is contradicted irrespective of the assumptions that have been made by the algorithm. In the context of the cause of a term, a term is unconditionally contradicted when the cause phrase of the constraints that assert the term is empty. Cause phrases contain only assumptions. So when the cause phrase of the constraint that asserts a term is empty, no assumptions contributed to the assertion of that asserted term. For a contradiction, both cause phrases of the constraint that asserts the term and the constraint that asserts the complementary term must be empty in order for the contradiction to be unconditional.

Conditionally Contradicted Term=When a term is contradicted because of an earlier assumption such that if the assumption is removed, the contradiction is resolved. For contradicted terms, at least one of the cause phrases, the cause phrase of the constraint asserting the term or the cause phrase of the constraint asserting the complementary term, is not empty. As an artifact of the process that when one is not empty, the other will also be not empty.

Unsatisfiable Expression and Contradicted Terms=An expression is unsatisfiable when terms for the same variable unconditionally contradict each other. Therefore detecting this condition indicates that the expression is unsatisfiable. Yet, an expression may be ultimately unsatisfiable even if this condition is not represented.

Phrase=An array of terms, each term pertaining to a different variable. For example: {[+v1, C1], [−v2, C1], [−v3, C3], [−v4, C3], [+v5, C7]}. Conjunct phrase=A set/array of terms over which a conjunctive transformation operates (the terms are ANDed together).

Disjunct phrase=A set/array of terms over which a disjunctive transformation operates (the terms are ORed together). For example, a constraint is a disjunct phrase that is not empty.

Orderings=An order arbitrarily imposed on variables, values, and inferences. The user of the algorithm may choose the ordering to obtain a certain advantage rather than having an ordering imposed randomly.

General Ordering=an order imposed upon a set of variables and therefore upon phrases that include the terms of those variables. Ordering allows there to be a lesser or greater variable. A lesser variable is closer to the beginning of the ordering. A general ordering is effectively the same as the ordering of the variables.

Ordering of Variables=Used to designate the least variable among the free variables. In one exemplary aspect, the ordering of variables is used to determine the least variable among the free variables as the variable that is next given an assumptive value.

Inference=Often an inference is a constraint. An inference includes an implicated phrase, negated phrase, cause phrase, reason phrase, and common reason phrase. Some flags such as prevailing or determined are included in the inference. In general, an inference is more than a constraint, but the implicated phrases of many inferences look like the constraints, and the implicated phrases of all inferences other than assumption inferences act like constraints.

Ordering of Inferences=There are two types of ordering of inferences: Implicational Ordering of Inferences and Priority Ordering of Inferences.

Implicational Ordering of Inferences=Implicational ordering decides which asserting inference becomes determined before other inferences. Implicational ordering also decides which asserted value is determined first.

Priority Ordering of Inferences=Priority ordering decides which asserting inference is prevailing among all inferences that assert terms representing similar values.

Implication=The iterative process of assertion, determination, and negation is called "implication." An assumption is represented as an inference that asserts a value of a free variable with only itself as the cause. An assumption is added to the inference database whereupon that variable is determined to have that value. The variable value negates terms in other inferences. If the number of terms not negated in the other inferences is exactly one, then that inference asserts that one term. That assertion may then become prevailing and result in the determination of its variable, which in turn negates other terms, and so forth. This effect may cascade until either no further terms are asserted, or a contradiction is encountered. The assertions are the sole terms residing in the implicated phrase in each of the asserting inferences.

Implicating a phrase=A constraint is converted into an inference by the process of initialization, but prior to initialization it is just a phrase. When a phrase is implicated, the content of the implicated phrase is implicated. At the time a constraint is converted into an inference, the implicated phrase of the inference looks very much the same as the constraint looked and, thus, it could be said that constraints per se are implicated, but it cannot be said that the inferences into which the constraints are converted are implicated. When the implicated phrase contains only one term, that term is considered to be asserted. The process of implication propagates assertions as described above.

Implicated Phrase=A disjunct (OR) phrase containing terms that have not been negated.

Negated Phrase=A disjunct phrase containing terms that have been negated.

Cause Phrase=The cause phrase shows what assumptions participated in forcing the constraint to assert the term. The cause phrase of a constraint is a conjunct (AND) phrase containing terms representing values in an apparent least set of assumptive values sufficient to force the implicated phrase to be true. Cause phrases contain only assumptions. A cause is not itself implied from, or caused by, some other assumption. The assumptions are the cause. A constraint that is forced to assert a term has a non-empty cause phrase. But, when a term in a constraint is unconditionally asserted, there is no assumption and the constraint has an empty cause phrase.

Reason Phrase=A constraint that is forced to assert a term has a reason phrase that shows by what reason the cause led to the assertion of the term. The reason phrase of a constraint is a conjunct phrase containing asserted terms that represent an apparent least path that provides logical consistency between the cause phrase and the implicated phrase. When the value of a variable is determined by assumption alone, the cause phrase for the variable is the assumption but the reason phrase for the variable is empty. When a term in a constraint is unconditionally asserted, the constraint has an empty reason phrase.

The definition of a reason phrase given above is correct, but it is more general than the rule that is actually used in the examples provided in this specification. In the examples, the reason phrase provides logical consistency between the latest assumption in the cause phrase and the implicated phrase. The general reason set could well be useful for other methods of constructing the implicational and priority orderings; and this more narrowly defined set of terms is easily rendered from the more general set; but under the given example rules for constructing the implicational and priority orderings, there is no need for the additional terms that would be included in the general reason set.

Common Reason Phrase=A set of terms that are common to all prevailing paths from the latest assumption that converge to force an assertion. The common reason of an assumption contains one term representing the assumptive value.

The reason and the common reason are both inductive structures. There are only two ways to accurately describe inductive structures: either recursively, referring to previous common reasons in the definition of the candidate common reason; or else constructively, specifying the starting state and the rule for constructing a next state given an existing state. Such structures may be explained using examples. However, the number of examples required is usually large.

One example for explaining the concept of common reason is provided here. Given constraints 1: +a+b+c, 2: +a+b+d, and 3:+a+d where −b, −c, and −d are all prevailing assertions of some other constraints 7, 8, and 9, respectively; and where the common reason of −b contains −b, +w, +x, and +z, and the common reason of −c contains −c, +w, +y, and +z, and the common reason of −d contains −d, +w, +x, and +y, then:

If +a+b+c is the prevailing constraint asserting +a, then the common reason of +a contains +a, +w, and +z. This is the intersection of the common reasons of −b and −c plus the assertion +a.

If +a+b+d is the prevailing constraint asserting +a, then the common reason of +a contains +a, +w, and +x. This is the intersection of the common reasons of −b and −d plus the assertion +a.

If +a+d is the prevailing constraint asserting +a, then the common reason of +a contains +a, −d, +w, +x, and +y. This is the common reason of −d plus the assertion +a.

In some situations, for example, if there is only one negated term in each asserting constraint, then the common reason is the same as the reason (plus the assertion itself). Except in the case of assumptions, the definition of common reason must rely on previous common reasons.

Types of Inference=Asserting inference, enqueued asserting inference, determined inference, non-asserting inference. After inferences assert, they wait in the queue for their turn to be further processed. When they get their turn, the variable becomes determined or it may become over-determined.

Types of Asserting Inference=Prevailing assertion, non-prevailing assertion, non-determined implication. When several inferences assert the same value for a variable, only one inference contributes its cause, reason, and common reason to subsequent assertions. That assertion is said to prevail among the members of that set. The other members of that set are non-prevailing.

The point in the process where that decision gets made about which inference prevails is the same point at which the inferences of the assertions become determined. So all prevailing assertions have inferences that are determined, and all non-prevailing assertions have inferences that are determined. Inferences that either do not assert or that do assert but have not yet become determined are considered to be non-determined. Such inferences are not prevailing but neither are they necessarily non-prevailing because for them that decision has not yet been made.

Asserted Term=A term whose variable value is asserted by the previously made assumptions and previously determined variable values.

A term is either asserted as an assumption, or as a result of the process of implication, namely the negation of terms, until only one term remains in the implicated phrase. "Implication" is a process where negations reduce "implicated phrases", resulting in implicated phrases with fewer terms. When the implicated phrase contains a single term, that term is considered to be asserted.

Aspects of the present invention are generally implemented on a computing machine, device or system that includes, at the least, an input and output interface that may include keyboard, mouse, display screen, printers and remote communication modules, one or more processors for processing the various information input to the machine and generating the result as output, volatile and permanent memory located within the machine or provided for use by the machine that are used for storing the input and output data and the programs that are used for processing of the data, and a bus or other internal communication module for establishing communication and for transfer of data between the components of the machine. Aspects of the invention may be implemented as circuits on a microchip.

The present invention has been described in relation to particular examples, which are intended to be illustrative rather than restrictive, with the scope and spirit of the invention being indicated by the following claims and their equivalents.

The invention claimed is:

1. In a computer-implemented method for solving a problem in NP, an improvement comprising a process which identifies proximal parameterizations of conditional contradictions wherein the proximal parameterizations of conditional contradictions are according to proximity and the proximity is founded on the extended clustering of adjacent pairs of constraints wherein a first constraint asserts a term which negates possible values of a variable shared by a second constraint, and no disagreement over possible values exists between the first constraint and the second constraint for any other variable, and the proximal parameterizations of the conditional contradictions are limited to teardrop values.

2. A method for solving a problem in NP, comprising the steps of:
   converting a given problem definition into an expression composed of one or more constraints;
   selecting assumed values for variables of the expression to provide selected assumptions;
   tracking a set of paths of implications resulting from the selected assumptions by recording or extracting any of causes, reasons, or common reasons, and by recording or extracting prevailing implications;
   resolving conditional contradictions by identifying a proximal parameterization of the conditional contradictions to provide a parameterization, wherein the proximal parameterization of the conditional contradictions are limited to teardrop values;
   treating the parameterization effectively as a constraint, and then deselecting one or more assumptions that comprise the conditional contradiction; and
   iteratively applying the selecting, tracking, and resolving steps until either all variables have determined values and no contradictions are apparent or else an unconditional contradiction is found.

3. A computer-implemented method for solving a satisfaction problem, comprising the steps of:
   converting a given problem definition into an expression composed of one or more logical constraints;
   selecting assumed values for variables of the expression;
   tracking a set of paths of implications resulting from the selected assumptions by recording or extracting any of causes, reasons, or common reasons, and by recording or extracting prevailing implications;

resolving conditional contradictions by identifying a proximal parameterization of the conditional contradictions, treating the proximal parameterization effectively as a constraint, and then deselecting one or more assumptions that comprise the conditional contradiction, wherein the proximal parameterizations of conditional contradictions are according to proximity and the proximity is founded on extended clustering of adjacent pairs of the constraints; and iteratively applying the selecting, tracking, and resolving steps until either all variables have determined values and no contradictions are apparent or else an unconditional contradiction is found.

4. A computer program product comprising:
a computer having computer readable code embodied therein for solving a problem, the computer comprising:
  a module in said computer for converting an existing problem representation into a computer-readable logical expression;
  a first data structure in said computer for returning a verifiable satisfiability determination and relevant output terms;
  a second data structure in said computer for accepting an input expression;
  a third data structure in said computer, wherein said third data structure has an implication pool which determines which enqueued processing request is next to be processed and a de-implication pool which determines which enqueued processing request is to be removed;
  a fourth data structure in said computer, known as an inference database, for storing inferences and for recording propagation of interactions between inferences;
  a module for converting the input expression into one or more inferences and storing them in the inference database;
  a module for recording assumptions, determining types of inference interactions, propagating effects of inference interactions through the inference database; and
  a module in said computer for minimizing a set of inferences involved in the conditional contradiction of a term, and precipitating an inference as a representation of that set, the precipitated inference being a constraint representing the precipitant of a teardrop and values of those terms in teardrop constraints that are negated by assertions resulting from assumptions.

5. A device which receives a set of signals corresponding to values of a set of variables, and either receives another set of signals corresponding to a set of constraints or operates on a memory bank containing representations of constraints or embeds a set of constraints in its structure, and applies a process of identification, and returns a signal or a set of signals; the device comprising circuits or other mechanisms, the circuits or other mechanisms identifying a proximal parameterization of a contradiction in the set of constraints wherein the proximal parameterization of a contradiction in the set of constraints is according to proximity and the proximity is founded on extended clustering of adjacent pairs of the constraints.

6. A method for improving time requirement of solving of an expression by avoiding conditional contradictions arising during the solving of the expression, the expression being formed of constraints, each constraint including one or more variables, the solving of the expression including determination of whether the expression is satisfiable by a set of variable values or unsatisfiable when there are no sets of variable values that satisfy the expression, the method being implemented on a computer, the method comprising:
  receiving, as part of the expression being input to the computer, unconditional assertions regarding values of zero or more of the variables wherein said unconditional assertions are not forced by assumptions and have an empty cause;
  making assumptions regarding values of one or more of the variables;
  making assertions of terms regarding values for other ones of the variables, the assertions being made by the constraints responsive to the unconditional assertions and the assumptions, a constraint asserting a term being an asserting inference;
  setting values for the variables as determined values responsive to the unconditional assertions, the assumptions or the assertions, the variables not having a determined value being free variables;
  repeating a process of implication as long as a count of the free variables is not zero, the process of implication being an iteration of the making of assumptions, the making of assertions, and the setting of values for the variables as determined;
  maintaining first data for each inference by keeping track of cause, reason and common reason of each asserting inference;
  determining whether a contradiction is a conditional contradiction, responsive to the first data, the conditional contradiction being conditioned on the assumptions and arising when the determined values for a variable are contradictory and result in the variable becoming an over-determined variable;
  precipitating an inference from the conditional contradiction to arrive at a precipitated inference, the precipitated inference being a constraint in addition to the constraints of the expression and representing the precipitant of a teardrop and values of those terms in teardrop constraints that are negated by assertions resulting from assumptions other than the latest assumption;
  avoiding and de-asserting assumptions that do not satisfy the precipitated inference to prevent the process of implication from reaching a dead end resulting from the conditional contradiction from which the precipitated inference is precipitated, for the precipitated inference to be satisfied, value of at least one variable of variables in the precipitated inference must not be negated;
  reporting that the expression is satisfied if the count of the free variables is zero and all of the variables of the expression have a determined value and every inference is satisfied; and
  reporting that the expression is unsatisfiable if an unconditional contradiction is encountered regarding one of the variables of the expression, an unconditional contradiction being a contradiction not resulting from the assumptions.

7. The method of claim 6,
wherein a term is a value of a variable in context of a particular constraint,
wherein a term of a first constraint is asserted when the term is the only term among the terms of the first constraint that is not negated,
wherein a second constraint negates a term in the first constraint when values for one variable that is common between the first constraint and the second constraint disagree and this disagreeing value is represented by the term asserted by the second constraint, wherein the cause of an asserting inference consists only of assumptions that forced the inference to assert an asserted term, the cause of an assumption is the assumption itself, wherein the reason of an asserting inference consists of the most recent assumption and assertions that formed a prevailing path from the most recent assumption to the term asserted by the asserting inference, assumptions and unconditional assertions have an empty reason, wherein a prevailing path is the path of assertions initiating at a prevailing inference, the prevailing inference being an asserting inference selected from among any inferences asserting terms representing the same value of the same variable that is represented by the asserted term of the prevailing inference, wherein the prevailing inference is selected to be an inference with a reason that does not represents a loop, where a loop is a path that has already passed through the variable represented by the asserted term, and the prevailing inference is selected from among asserting inferences with non-looped paths according to an order of priority where priority is given to a constraint with a lesser cause, and the lesser cause is the cause having fewer assumptions, wherein the asserting constraints are determined one by one, and when a constraint becomes determined, if it is to become prevailing, it becomes a prevailing constraint at the same time it becomes determined, wherein a prevailing inference has a common reason, the common reason of an assumption consisting of the assumption, the common reason of an asserting inference forced directly and solely by a most recent assumption consisting of the assumption and the assertion of the asserting inference, the common reason of an asserting inference forced by an initiating assumption and a number of ensuing assertions made by inferences other than assumptions, consisting of the initiating assumption and the common reasons of the ensuing prevailing assertions, wherein order of priority which decides which assertion becomes a prevailing assertion among a number of competing assertions asserting the same value for the same variable, is determined responsive to the causes of the asserting inferences making the competing assertions, wherein a term is unconditionally contradicted if no assumptions contributed to the assertion of the term and the cause phrase of the term is empty, and wherein a contradiction is determined to be a conditional contradiction when the contradiction is dependent on some assumptions and the union of the causes of the two prevailing assertions leading to the contradiction is not empty.

8. The method of claim 7,
wherein the contradiction arises between a first contradicting assertion asserting a first value for a first variable and a second contradicting assertion asserting a second value for the first variable, and
wherein the precipitating of the inference comprises:
  identifying a first common reason of the first contradicting assertion;
  identifying a second common reason of the second contradicting assertion;
  identifying intersection terms present in both the first common reason and the second common reason;
  identifying a most recent term of the intersection terms, the most recent term including an intersection variable having an intersection value;
  identifying a precipitant value for the contradiction, the precipitant value being a complementary value of the intersection value;
  identifying a precipitant assertion for the contradiction, the precipitant assertion being a prevailing assertion representing a value complementary to the precipitant value;
  identifying a set of teardrop constraints from among the constraints of the expression, the teardrop constraints starting with a first set consisting of prevailing constraints asserting terms present in the first reason that have been determined after the precipitant assertion and a second set consisting of prevailing constraints asserting terms present in the second reason that have been determined after the precipitant assertion has been determined, and adding the first set to the second set and further adding prevailing constraints that assert the first contradicting assertion and the second contradicting assertion, the union of these prevailing constraints being the set of teardrop constraints;
  identifying a set of teardrop values to include the precipitant value and values of teardrop variables, the values of teardrop variables being values of variables in the teardrop constraints which are negated by prevailing assertions that are forced by assumptions other than the latest assumption; and
  forming the precipitated inference from the teardrop values.

9. The method of claim 6, wherein the solving of the expression is performed on the computer in polynomial time.

10. The method of claim 6,
wherein the first data associated with each inference includes a negated phrase, an implicated phrase, a cause phrase, a reason phrase, and a common reason phrase, a phrase being an array of terms each term pertaining to a different variable,
wherein the negated phrase of the inference is a disjunct phrase containing terms of the inference that have been negated,
wherein the implicated phrase of the inference is a disjunction (OR) of terms of the inference that are being implicated responsive to the making of assumptions and the making of assertions but have not been negated,
wherein the cause phrase of the inference is a conjunction (AND) of terms of various inferences that represent assumptions that participated in forcing the inference to implicate the implicated phrase of the inference,
wherein the reason phrase of the inference is a conjunction of the asserted terms of various prevailing inferences that represent the prevailing path by which assumptions in the cause phrase of the inference led to the implication of the implicated phrase of the inference, and
wherein the common reason phrase of the inference is a set of asserted terms of various prevailing inferences that are common to all prevailing paths from a latest assumption that converge to force the implication of the implicated phrase of the inference.

11. The method of claim 10, further comprising:
initializing of an inference database, the inference database including all of the constraints of the expression, the operation of initializing converting the constraints into inferences,
wherein the initializing of the inference database comprises:
  allowing sets of inferences and sets of variables to be empty;

converting an input problem representation into the expression, the expression being a logical expression having a conjunct-disjunct form;

assigning initial values to the variables;

sorting the terms of each constraint according to a general ordering of the variables;

normalizing the set of inferences after the sorting;

indexing the inferences in the inference database; and letting a master determinant number be zero, wherein the master determinant number shows an order of determination of values of all of the variables, wherein while no variable values have been determined determinant numbers are uniformly zero, wherein as part of the process of sorting, redundancy is eliminated by eliminating any constraint the terms of which constitute a superset of the values of the terms of another constraint.

12. The method of claim 11, wherein the assigning of the initial value for each variable in the expression comprises:

recording an arbitrary value assignment for the variable, wherein the arbitrary value assignment is not a result of any of the assumptions by the method or the assertions by the constraints;

recording an indication that the variable having the arbitrary value assignment is a free variable and is non-assumptive; and recording a null determinant number for the variable, a determinant number for a variable indicating an order in which a value is determined for the variable, the null determinant number indicating that no value has been determined for the variable yet.

13. The method of claim 11, wherein the initializing the inference database further comprises:

ensuring that the initial value agrees with an uncontroversial term of the variable, if the variables has an uncontroversial term.

14. The method of claim 11, wherein for each constraint, if there are no inferences which have an implicated phrase which only contains terms that agree with the terms of the constraint, the normalizing for the constraint comprises:

creating a non-determined new inference S which has the terms of the constraint in its implicated phrase and which has empty cause phrase, reason phrase, common reason phrase, and negated phrase;

enqueueing the inference S into the implication queue if the inference S contains exactly one term in its implicated phrase; and recording an indication that the inference S is non-asserting if the inference S contains more than one term in its implicated phrase.

15. The method of claim 10, wherein the making of the assertions by each inference X, which has been enqueued into an implication queue, comprising the steps of:

dequeueing the inference X;

recording an indication that the inference X is determined; and if a reason phrase of the inference X does not contain a term that agrees or disagrees with the assertion made by the inference X, then performing the following:

if a variable V subject to the assertion made by the inference X has a determined value:

if the determined value of the variable V disagrees with the assertion made by the inference X, then:

record an indication that the inference X is a prevailing determination, record an indication that the variable V asserted by the assertion of the inference X is an over-determined variable, set a cause phrase and reason phrase of the inference X for the value of the variable V asserted by the inference X as a prevailing cause and a prevailing reason, and halt the operation of asserting terms for the inference X, and return to the making assertions for a next inference, if the value of the variable V for the assertion made by the inference X does NOT disagree with the assertion made by the inference X, then:

record an indication that the inference X is non-prevailing, if the variable V for the assertion made by the inference X is NOT determined:

if the variable V for the assertion made by the inference X is free:

record an indication that the variable V is determined, set the value of the variable V as the value of the variable V according to the assertion made by the inference X, increment the master determinant number and assign its value as the determinant number of the variable V, record an indication that the inference X is a prevailing determination, let the common reason of the inference X become the assertion of the inference X unioned with the intersection of the common reasons of the prevailing inferences where each of the prevailing inferences asserts a term that disagrees with a negated term (if any) of the inference X and has the latest assumptive value (if any) in its cause phrase, and for each non-asserting inference Z which has a term in its implicated phrase which disagrees with the term asserted by the inference X:

move the term which disagrees with the assertion of the inference X from the implicated phrase of the non-asserting inference Z into a negated phrase of the non-asserting inference Z, if the count of terms in an implicated phrase of the non-asserting inference Z is one:

let the cause phrase of the non-asserting inference Z become the union of the prevailing cause phrases for the values that disagree with the terms in the negated phrase of the non-asserting inference Z, let the reason phrase of the non-asserting inference Z become the prevailing assertions that negate the subset of values in the negated phrase of the non-asserting inference Z where the prevailing cause phrase of each value contains the latest assumption, unioned with the prevailing reason phrases for those same prevailing assertions, and enqueue the non-asserting inference Z into the implication queue; and otherwise, if the variable for the assertion made by the inference X is over-determined, then:

if any determined inference other than the inference X asserts a term that agrees with the assertion of the inference X record an indication that the inference X is non-prevailing, and otherwise record an indication that the inference X is prevailing.

16. The method of claim 15, wherein the inference X is subjected to steps of asserting terms regardless of whether the inference X was enqueued prior to the beginning of stage of the asserting terms or becomes enqueued during the execution of the stage of the asserting terms.

17. The method of claim 15,
wherein the operation of precipitating an inference includes for each assumption T, in reverse assumptional order, de-asserting terms and passing T as the input value, and
wherein the de-asserting of terms is utilized for testing alternate assumptions or for overturning a value of a variable and the de-asserting of terms comprises:
initializing a de-implication pool as empty; the de-implication pool containing the assertions prior to the initializing;
accepting one of the assumptions as an input term;
enqueueing a value of the input term into the de-implication pool;
for each value VAL in the de-implication pool, performing the following:
dequeueing the value VAL;
for every inference XX with a negated phrase which contains a term that disagrees with the value VAL:
if the inference XX is a prevailing determination:
enqueueing the value of the assertion of the inference XX into the de-implication pool,
recording an indication that the inference XX is non-asserting and non-determined,
moving the term which disagrees with the value VAL from a negated phrase of the inference XX into an implicated phrase of the inference XX,
letting a cause phrase of the inference XX be replaced with a union of prevailing cause phrases of the assertions which disagree with the terms (if any) in the negated phrase of the inference XX,
letting a reason phrase of the inference XX be replaced with a union of the prevailing reason phrases for the assertions which disagree with the terms (if any) in the negated phrase of the inference XX as well as those assertions themselves, and
letting a common reason of the inference XX become empty;
if the variable VAL is over-determined:
finding a prevailing inference YY that asserts a term which disagrees with the assertion of the inference XX,
enqueueing the prevailing inference YY into the implication queue, and
recording an indication that the variable VAL is determined;
otherwise:
recording an indication that the variable VAL is free, and
recording a null determinant number for the variable VAL;
letting a prevailing cause and a prevailing reason for the variable VAL both become empty; and
if the variable VAL agrees with the value asserted by an assumption:
if the assumption that agrees with the value VAL is the latest assumption:
finding the assumption W other than the variable VAL which is greatest in the assumptional ordering,
if the assumption W exists:
letting the assumption W become the latest assumption,
otherwise:
deciding that there is no latest assumption,
deleting the inference which asserts the same value as the value VAL, and
recording an indication that the variable of the value VAL is non-assumptive.

18. The method of claim 17, wherein the operation of making assertions of terms halts after encountering an over-determined variable, and all of the assumptions are de-asserted in reverse assumptional order.

19. The method of claim 17, wherein the operation of precipitating an inference comprises:
if there is no latest assumption:
reporting that the expression is unsatisfiable, and
halting all further processing; and
otherwise, if there is a latest assumption:
among the over-determined variables, finding the variables where the union of the prevailing cause phrases for the two values of each variable is least, and among those, selecting any one variable W;
creating a precipitant term and letting it have the complementary value of the prevailing assertion with the greatest determinant number among terms which are in the intersection of the common reasons of the prevailing inferences which assert the two values of W;
creating a phrase PHRASEX which contains union of the values of VV and prevailing reasons for those values, the PHRASEX being called "frame;"
removing values from the phrase PHRASEX that have determinant numbers less than or equal to the determinant number of the precipitant variable;
creating a phrase PHRASEY which contains union of the negated phrases of the prevailing inferences which assert the terms in the phrase PHRASEX, the phrase PHRASEY being called "body;"
removing values from the phrase PHRASEY that have negating assertions with determinant numbers greater than or equal to the determinant number of the latest assumption;
adding the precipitant term to the phrase PHRASEY;
creating a non-determined inference ZZ which has the terms of the phrase PHRASEY in its implicated phrase and has empty cause phrase, reason phrase, common reason phrase and negated phrase;
indexing the non-determined inference ZZ;
if the implicated phrase of the non-determined inference ZZ contains exactly one term enqueueing the non-determined inference ZZ into the implication queue; and
otherwise recording an indication that the non-determined inference ZZ is non-asserting.

20. The method of claim 19, further comprising:
removing values from the phrase PHRASEY that have negating assertions that are unconditional,
wherein the removing of the unconditional assertions makes the body smaller and therefore more efficient to process without changing the meaning of the body.

21. The method of claim 20, further comprising:
altering the assumptional ordering so that the variable of the precipitant term is least and the ordering is otherwise unchanged.

22. The method of claim 10,
wherein different types of orderings are used to make decisions in case a tie occurs;
wherein implicational ordering decides which asserting inference becomes determined before other inferences, wherein the implicational ordering also decides which asserted value is determined before other asserted values, wherein priority ordering decides which assertion is prevailing among all assertions representing similar values or the same value, wherein the priority ordering also decides which inference is prevailing among all inferences that assert terms representing similar values, and wherein a general orderings is an order imposed upon the set of variables and therefore upon phrases that include the terms of those variables.

* * * * *